US006771813B1

(12) United States Patent
Katsuyama

(10) Patent No.: US 6,771,813 B1
(45) Date of Patent: Aug. 3, 2004

(54) IMAGE PROCESSING APPARATUS AND PATTERN EXTRACTION APPARATUS

(75) Inventor: Yutaka Katsuyama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/358,380

(22) Filed: Jul. 21, 1999

(30) Foreign Application Priority Data

Dec. 9, 1998 (JP) .......................................... 10-350342

(51) Int. Cl.[7] .............................................. G06K 9/00
(52) U.S. Cl. ...................... 382/165; 382/194; 345/589
(58) Field of Search ................................ 382/162, 165, 382/193, 194, 270–273; 345/589, 593, 597, 601, 602; 348/453

(56) References Cited

U.S. PATENT DOCUMENTS

| | | | | |
|---|---|---|---|---|
| 5,111,516 A | * | 5/1992 | Nakano et al. ............. | 382/156 |
| 5,130,791 A | * | 7/1992 | Abe ........................... | 358/518 |
| 5,418,862 A | * | 5/1995 | Zheng et al. ............... | 382/199 |
| 5,452,408 A | * | 9/1995 | Westdijk et al. ............ | 345/589 |
| 5,504,846 A | * | 4/1996 | Fisher ....................... | 345/597 |
| 5,742,704 A | * | 4/1998 | Suzuki et al. ............... | 382/176 |
| 5,912,980 A | * | 6/1999 | Hunke ....................... | 382/103 |
| 5,912,994 A | * | 6/1999 | Norton et al. .............. | 382/283 |
| 5,974,171 A | * | 10/1999 | Hayashi et al. ............ | 382/162 |
| 5,974,228 A | * | 10/1999 | Heitsch ..................... | 395/109 |
| 5,982,944 A | * | 11/1999 | Vaidyanathan et al. ..... | 382/271 |
| 6,088,469 A | * | 7/2000 | Fukumura et al. ......... | 382/103 |
| 6,115,494 A | * | 9/2000 | Sonoda et al. ............. | 382/165 |
| 6,115,495 A | * | 9/2000 | Tachikawa et al. ........ | 382/165 |
| 6,124,945 A | * | 9/2000 | Ishihara et al. ............ | 358/1.9 |
| 6,137,903 A | * | 10/2000 | Dichter ..................... | 358/540 |
| 6,188,787 B1 | * | 2/2001 | Ohmae et al. ............. | 382/135 |
| 6,272,238 B1 | * | 8/2001 | Kugai ....................... | 382/165 |
| 6,298,150 B1 | * | 10/2001 | Sonoda et al. ............. | 382/162 |
| 6,343,141 B1 | * | 1/2002 | Okada et al. ............... | 348/587 |
| 6,351,558 B1 | * | 2/2002 | Kuwata ..................... | 382/168 |
| 6,369,916 B1 | * | 4/2002 | Hirooka .................... | 358/462 |
| 6,512,850 B2 | * | 1/2003 | Yaung ....................... | 382/225 |
| 6,529,202 B2 | * | 3/2003 | Wu ........................... | 345/593 |
| 6,546,130 B1 | * | 4/2003 | Inoue et al. ................ | 382/162 |

FOREIGN PATENT DOCUMENTS

JP 5-298443 11/1993

OTHER PUBLICATIONS

S. Senda, et al., "A Method of Extraction of Character Patterns From a Color Image Based on the Uniformity of the Character Color of a String", Technical Report of IEICE (The Institute of Electronics, Information and Communication Engineers), PRU94–29.

K. Matsuo, et al., "Extraction of Character Region From Color Document Images", The Institute of Electronics, Information and Communication Engineers, D–12–19.

K. Matsuo, et al., "Extraction of Characters String From Scene Image by Grayscale and Color Information", Technical Report of IEICE (The Institute of Electronics, Information and Communication Engineers), PRU92–121.

B. Ueba, et al., "The Extraction of Character Images From Color Images Based on Processing of Color Contour Line", Technical Report of IEICE (The Institute of Electronics, Information and Communication Engineers), PRU94–28.

\* cited by examiner

*Primary Examiner*—Amelia M. Au
*Assistant Examiner*—Anand Bhatnagar
(74) *Attorney, Agent, or Firm*—Staas & Halsey LLP.

(57) ABSTRACT

A control unit selects a first labeling for a color image in a small number of colors so that the labeling is performed by clustering a color palette, and selects a second labeling for a color image in a large number of colors so that the labeling is performed by an adjacency expanding method.

30 Claims, 35 Drawing Sheets

EXAMPLE OF R TABLE (SIMILAR TO G AND B TABLES)

| R LUMINANCE VALUE | MAXIMUM VALUE OF LUMINANCE DIFFERENCE BETWEEN ADJACENT PICTURE ELEMENTS | RESOLUTION |
|---|---|---|
| 0 | 2 | 14 |
| 0 | 2 | 15 |
| 0 | 1 | 16 |
| ⋮ | ⋮ | ⋮ |
| 0 | 1 | 35 |
| 1 | 10 | 14 |
| 1 | 8 | 15 |
| 1 | 7 | 16 |
| ⋮ | ⋮ | ⋮ |
| 1 | 2 | 35 |
| ⋮ | ⋮ | ⋮ |
| 255 | 0 | 14 |
| 255 | 0 | 15 |
| ⋮ | ⋮ | ⋮ |
| 255 | 0 | 35 |

FIG. 6

C : TARGET PICTURE ELEMENT.
    VALUE OF COLOR (Rc, Gc, Bc)

1 ~ 8 : 8 PICTURE ELEMENTS AROUND
        TARGET PICTURE ELEMENT

COLOR VALUE (Ri, Gi, Bi) i = 1 ~ 8

FIG. 9

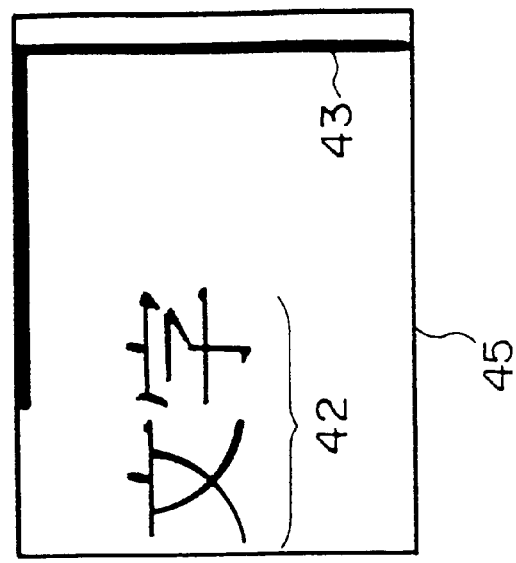
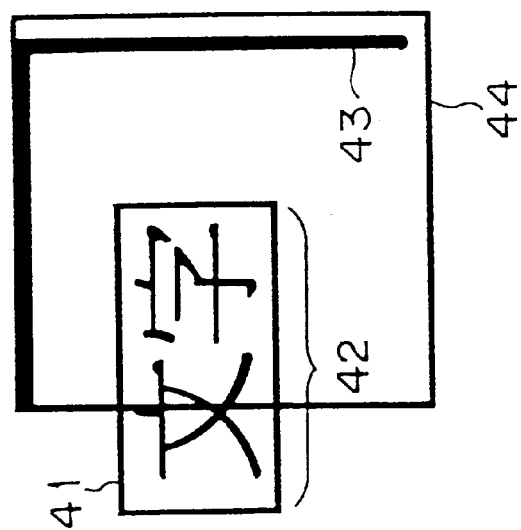
FIG. 10

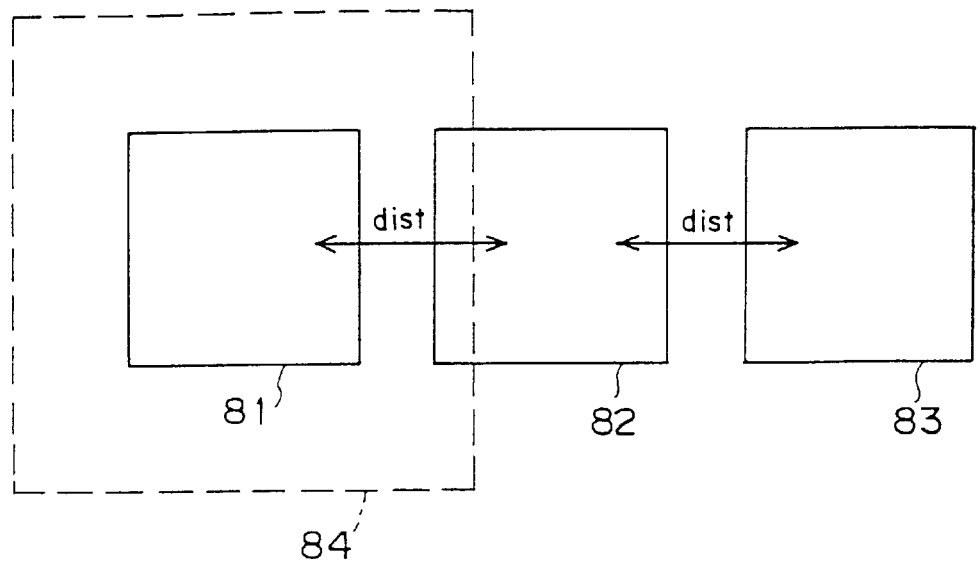
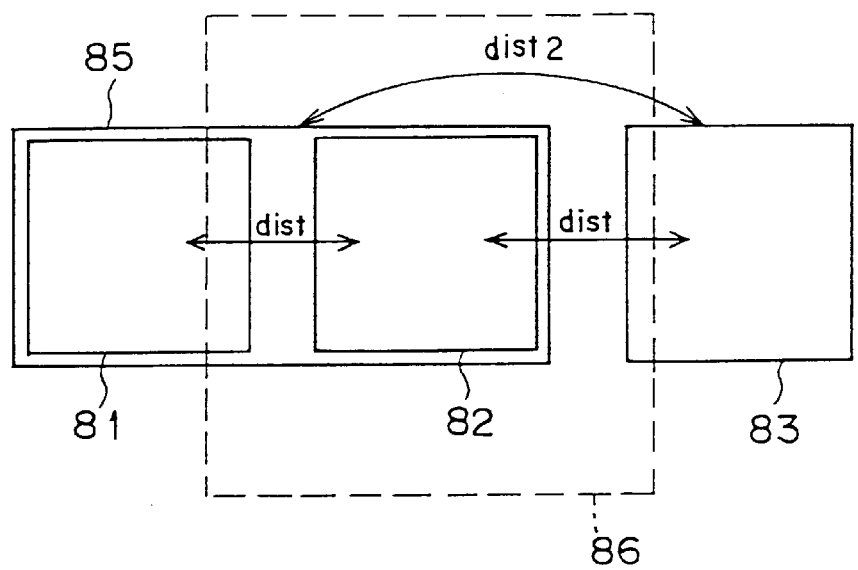
FIG. 14

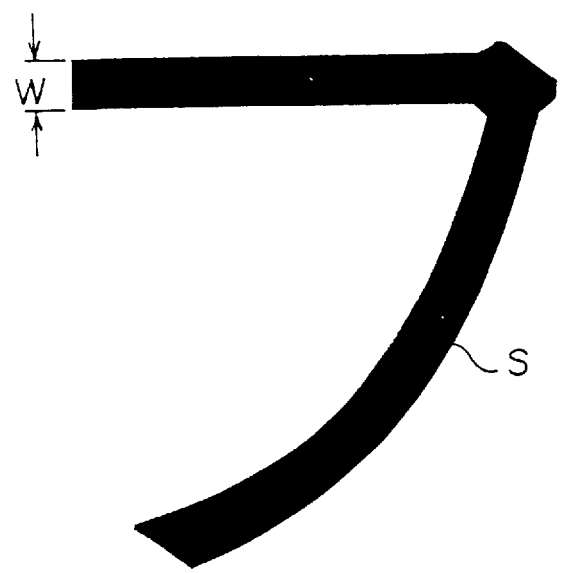
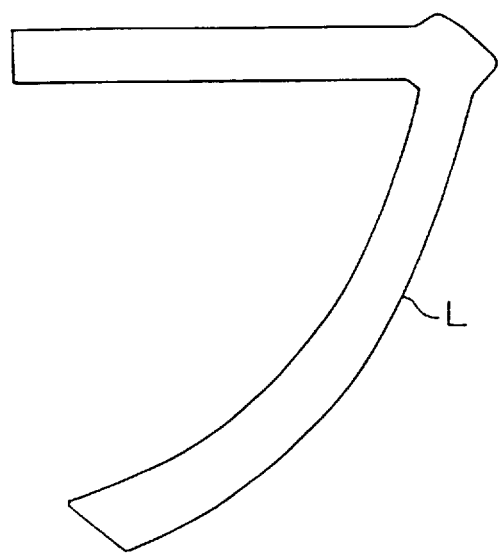
FIG. 15

1 : HORIZONTAL ARRANGEMENT FLAG
2 : VERTICAL ARRANGEMENT FLAG

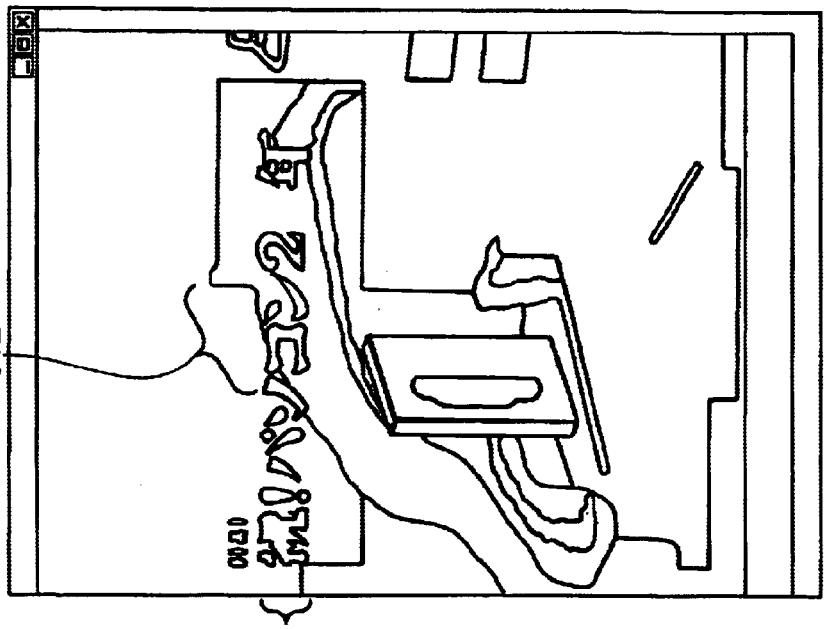
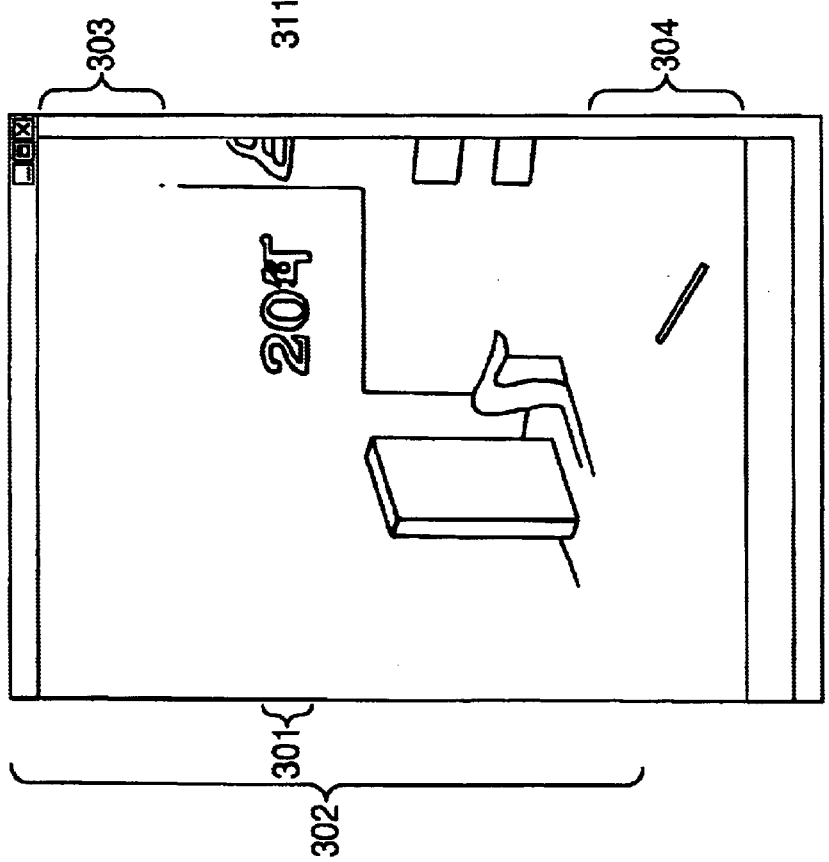

IMAGE PROCESSING APPARATUS AND PATTERN EXTRACTION APPARATUS

BACKGROUND OF THE INVENTION

1. Field of the Invention

The present invention relates to a color image processing apparatus and a pattern extraction apparatus, and is specifically applicable when a character area for a title is extracted from a color image.

2. Description of the Related Art

Recently, computers and various peripheral devices such as color printers, etc. have been developed with their prices set lower, thereby extending the fields in which color images are processed. As a result, the technology of extracting only a specific area from a color image, for example, extracting the same color areas from a color image is demanded.

This technology is requested in many fields, for example, when a color scene image picked up by a CCD camera is used as an input image to be processed to select fruits, monitor a car, check a person for security, etc. through image recognition.

When a color document image is used as an input image, a document name, a keyword, etc. are automatically extracted from an image to be used for retrieval, for example, when books are classified and managed by an automatic system in a library. In addition, the technology is also used to automatically assign a keyword, a file name, etc. based on groupware in which images are stored and shared as a database. The information is used to automatically retrieve a large number of color document images.

The conventional technology of extracting the same color areas in a color image can be a method of generating a color-analyzed image by clustering for each color the picture elements in a color image. There is also a method of extracting the same color areas in a color image using a color labeling result in an adjacency expanding method.

In addition, the technology of extracting a title from a color image can be a method of extracting a character area using a color-analyzed image.

In this method, the following processes are performed.

An enclosing rectangle of connection areas is obtained from a color-analyzed image in one color.

Enclosing rectangles are limited to specific size and shape.

An adjacent rectangle search range is set for each rectangle, and rectangles are searched for in the range. A plurality of the rectangles within the range is extracted as a group.

Rectangles having good linearity in a group are maintained.

An enclosing rectangle of a group is obtained, and a pattern of color similar to that of an area forming the group is extracted inside the enclosing rectangle.

Listed below are the documents describing the conventional technology of extracting a character area from a color document image.

Senda et al. 'Method of Extracting Character Pattern from Color Image based on Unichromatism of Character' published by The Japan Society of Information and Communication Research, PRU94–09, p17–24

Uehane et al. 'Extracting Character Area from Color Image by Isochromatic Line Proce' published by The Japan Society of Information and Communication Research, PRU94–09, p9–16

Matsuo et al. 'Extracting Unicolor Character Area from Color Document Image' published in the 1997 Convention of The Japan Society of Information and Communication Research D-12–19

Matuo et al. 'Extracting Character String from Scenic Image based on Shading and Color Information' published by The Japan Society of Information and Communication Research, PRU92–121, p25–32

However, In the conventional method of extracting the areas of the same color by clustering picture elements by the color of a color image, a large number of picture elements of an entire image are clustered. Therefore, the clustering process takes a long computation time.

In addition, since the clustering process is performed on the picture elements of the entire image, it may not be able to extract areas with high precision. For example, if the first color area is positioned away from the second color area, the first color is similar to the second color, and therefore the first and second colors are classified into the same cluster, then both first and second colors may not be able to be completely covered depending on the third color generated from the cluster. Thus, an extraction result may be output with an incomplete pattern or an unclear outline.

In the conventional method of extracting areas of the same color based on the area expanding method, the colors of adjacent picture elements may indicate values whose difference is larger than a predetermined threshold depending on the definition of the difference in color between the adjacent picture element even if the colors of the adjacent picture elements appear the same to naked eyes. As a result, a hole may appear in the same area or the outline of the same color area may not be correctly extracted.

Furthermore, since only the relationship between adjacent picture elements is checked, a character area can be assigned the same label as the background area when the color around the boundary between the character area and the background area gradually changes.

In addition, in the conventional area expanding method, areas of the same color are extracted by equally applying a predetermined threshold to various color document images. Therefore, for example, when similar colors such as gray, intermediate colors, etc. are used for the character and its background, a character and the background can be frequently assigned the same label, thereby reducing the character pattern extraction precision. Otherwise, an extracted label area can be broken into pieces in a character pattern, thereby reducing the character pattern extraction precision.

On the other hand, if an area expanding method is applied to an image in, for example, 256 colors other than a full color image, a large number of small label areas are generated, thereby causing the problem of low area extraction precision.

Furthermore, in the method of extracting a character area using the conventional color-analyzed image, it is necessary to generate a color-analyzed image for the entire image in the number of colors extracted from the image. It takes a long time to generate such color-analyzed images. In addition, since each color-analyzed image is generated for the entire image, a title extracted from the image is subject to the influence of the color of an area other than the title area when the title is extracted from the image, thereby reducing the title extraction precision. Furthermore, when an enclosing rectangle of connection areas is obtained, it is necessary to process the entire image for each of the extracted color-analyzed images. Therefore, a plurality of images having the same size between length and width (in number of extracted colors) are required. Thus, the process takes a long time.

Furthermore, since enclosing rectangles are grouped for each color-analyzed image generated for the entire image, the process takes a long time, and may cause the problem that characters to be extracted can be lost if they are clustered into different color-analyzed images. In addition, since only the rectangles in a search range are extracted when they are grouped, there is the problem that small portions can slip through a group. When a pattern of a color similar to the color of a group is extracted to collect the portions which have slipped through the group, there arises the problem that the noise similar to the color in the group can be collected.

SUMMARY OF THE INVENTION

The present invention aims at providing an image processing apparatus capable of extracting unicolor areas with high precision from various color images.

To solve the above described problems, according to the present invention, images are processed based on the number of colors of a color image to be processed.

Thus, images can be optimally processed depending on the number of colors of a target color image, thereby improving the precision in the image process and performing the process at a higher speed.

According to an aspect of the present invention, a different labeling method can be selected based on the number of colors of a target color image.

Therefore, even if the color difference in an area of a color image having a smaller number of colors is large to some extent, it can be assumed that the area is in the same color, thereby preventing a unicolor area from being fragmented into very small sections. In addition, a very small color difference can be detected in a color image having a large number of colors so that a different label can be assigned to each of the areas in different colors, thereby discriminating different color patterns with high precision, and extracting only a pattern in a specified color with high precision.

According to another aspect of the present invention, a label is assigned to a color image other than a full-color image after clustering color palettes, while a label is assigned to a full-color image in an adjacency expanding method.

Thus, since color images other than full-color images has a smaller number of colors, they can be processed in a shorter time even when the color palette clustering process is performed. In addition, even if a unicolor area appears uneven in color, the contained colors are classified into the same cluster, thereby preventing the loss of any color. As a result, the unicolor area can be extracted with high precision. As for a full-color image, a unicolor area can be extracted only by comparing the colors of adjacent picture elements without clustering colors, the processing time can be shortened, and a unicolor area can be extracted without an influence of the color of a separate area, thereby improving the extraction precision.

According to a further aspect of the present invention, a labeling threshold is individually set for each image according to the read information about an image to be labeled.

Thus, even if the ranges of the unicolor of images are different from each other, a threshold correctly reflecting the variations of the unicolor of an image can be set. As a result, the unicolor areas can be extracted with high precision for various color images.

According to a further aspect of the present invention, a labeling threshold for an input image to be processed is set by extracting color difference information from a local area of the input image.

Thus, the actual color difference in the unicolor area of an input image can be extracted from the input image from which a unicolor area is to be extracted, and a threshold unique to the input image can be set. Therefore, even if a various color image is input, the unicolor area can be extracted with high precision.

According to a further aspect of the present invention, a color image is sectioned in mesh form. In the mesh area, an area indicating small variance of colors is extracted as a uniform color area of the color image.

Thus, the position of an area indicating the same color can be specified in the color image in which various colors are distributed. The actual color difference of the unicolor area of an input image can be computed by obtaining the variance of the color of the area.

According to a further aspect of the present invention, a labeling threshold is determined based on the standard deviation of the color in a local area for which a color variance value is within a predetermined range.

As a result, the range of the same color can be obtained from an actual image to be processed. Even if similar colors such as gray, intermediate colors, etc. are used for both characters and background, the characters and background in similar colors can be correctly discriminated, and only characters can be extracted with high precision.

According to a further aspect of the present invention, the color is changed according to a color signal such that the resolution of the color difference of the first color recognized with the naked eyes matches the resolution of the color difference of the second color recognized with the naked eyes.

Thus, even if the naked eyes recognize the same color although there is a large color difference in the color space, the areas can be collectively extracted. On the other hand, when the naked eyes recognize different colors even if there is a small color difference in the color space, the areas can be individually extracted. Thus, similar color areas can be extracted depending on the color recognition characteristics of the naked eyes.

According to a further aspect of the present invention, the color difference around the color of low color saturation is reduced, and the color difference around the color of high color saturation is expanded.

As described above, around a color of low color saturation where naked eyes have low color resolution, an area recognized as in uniform color by the naked eyes can be extracted as a uniform color area with high precision by a device. On the other hand, around a color of high color saturation where naked eyes have high color resolution, an area recognized as in different colors by the naked eyes can be extracted as different areas by a device. Thus, areas in the similar color can be extracted with higher precision.

According to a further aspect of the present invention, the colors of a color image are clustered, and the same label is assigned to the areas connected by the colors belonging to the same cluster.

Thus, when a labelling process is performed in the adjacency expanding method, the number of colors of a color image is reduced; and the labelling process is performed without a predetermined labeling threshold, thereby more quickly performing the process with higher extraction precision for a unicolor area.

According to a further aspect of the present invention, a threshold for use in extracting a unicolor area from a color image is set based on the read resolution independently computed for each color component.

Thus, a unicolor area can be extracted with the cases taken into account where the read resolution of a CCD, a scanner, etc. depends of each color component, and where the resolution with the naked eyes depends on the difference in color of a color image. As a result, the extraction precision of a unicolor pattern from a color image can be improved.

According to a further aspect of the present invention, the read resolution corresponding to the matching color difference between adjacent picture elements obtained from the input image is individually obtained for each of the three primary colors from the color difference table which stores the maximum value of the color difference between adjacent picture elements using the luminance value and the read resolution as variables. Based on the read resolution of the three primary colors, the read resolution of the input image can be computed.

Thus, since the difference in read resolution for each color component can be taken into account when the read resolution of an input image is computed, the extraction precision of a unicolor pattern from a color image can be successfully improved.

According to a further aspect of the present invention, the maximum value of the color difference between adjacent picture elements is entered in the color difference table corresponding to the luminance values of all colors of an image.

Thus, the maximum value of the color difference between adjacent picture elements can be obtained directly from the color difference table without an arithmetic operation such as interpolation for any luminance value of the color of an image. As a result, a labeling threshold corresponding to the luminance color of the color of an image can be quickly obtained.

According to a further aspect of the present invention, the length of the outline of a pattern in an image is computed based on the frequency of changes of a label value when the image is scanned in a predetermined direction.

Thus, the outline length computing process can be quickly performed on a pattern whose outline length is to be computed only by once scanning the range of the enclosing rectangle of the pattern.

According to a further aspect of the present invention, the number of picture elements which change in the scanning direction from the label other than the first label to the first label is counted, and the number of picture elements which change from the first label to the label other than the first label is counted after two continuous picture elements having the first label in the scanning direction. Then, among the picture elements assigned the first label, the number of picture elements whose adjacent picture elements in the scanning direction are both assigned the first label, and at least one of whose adjacent picture elements in the scanning or vertical direction is assigned a level other than the first label is counted.

Thus, when the edge of a pattern is detected and the outline length is computed, the edge can be detected as the outline of the pattern continuing in the scanning direction. For a pattern having the width of one picture element, the outline can be prevented from being counted twice, thereby correctly computing in one scanning operation the outline length of a pattern in variable shape.

According to a further aspect of the present invention, it is determined whether or not the area of a unicolor group is a character area based on the character recognition result of patterns belonging to the unicolor group.

Thus, even if a pattern having noise has been extracted as a candidate for a title, the pattern having noise can be removed from the candidates for a title, thereby improving the extraction precision for a title area.

According to a further aspect of the present invention, the patterns in the same group can be classified again based on the range of the thickness of a pattern set on the frequencies of the thicknesses of the patterns in the same group.

Thus, even if patterns of various thicknesses coexist, patterns of the same thickness can be classified into the same group, thereby improving the extraction precision for a title area.

According to a further aspect of the present invention, a first color group and a second color group are integrated based on the shape, size, or positional relation of the enclosing rectangle of the first color group and the second color group.

Thus, if the shape, size, or positional relation of the enclosing rectangles is appropriate for a title area, then the groups can be classified as belonging to the same group. Therefore, even if characters forming a title contain a character in a different color, the title area can be precisely extracted.

According to a further aspect of the present invention, when enclosing rectangles overlapping each other are integrated, a pattern in a specific shape can be removed.

Thus, a pattern not to be extracted can be removed from the patterns to be processed, thereby extracting a unicolor pattern with high precision.

According to a further aspect of the present invention, enclosing rectangles overlapping each other can be integrated after removing the patterns in the L or] shape.

Thus, if a character to be extracted and the background encompassing the character are of the same color, and even if only the corner of the background is extracted as an area having the same color as the character to be extracted, then the corner of the background can be prevented from being integrated into the character to be extracted, thereby precisely extracting the title area.

According to a further aspect of the present invention, enclosing rectangles are grouped by comparing the color information about the patterns in the enclosing rectangles to be grouped with the color information about a group of already grouped enclosing rectangles.

Thus, enclosing rectangles can be grouped in consideration of the entire color of an area to be extracted, and an area which has already been extracted. As a result, even when the colors of the patterns in an enclosing rectangle gradually change, an area having a different color from that of the area to be extracted can be prevented from being classified into the same group.

According to a further aspect of the present invention, a threshold for use in determining whether or not a color is similar to a specific color is set according to the color information about a pattern classified into a unicolor group.

Thus, a threshold for use in determining a unicolor pattern can be obtained from the change of the color of a unicolor pattern to be extracted. Therefore, even if a unicolor range depends on each pattern, a threshold reflecting the color change of a pattern can be set. Therefore, a unicolor area can be extracted with high precision.

According to a further aspect of the present invention, groups can be integrated according to the color information about the patterns classified as a unicolor group.

Thus, even if the color of the pattern in an enclosing rectangle to be grouped has locally changed, the local color change of the pattern can be absorbed in the color of the entire patterns of the area from which the change has already been extracted, thereby extracting totally unicolor patterns with high precision.

BRIEF DESCRIPTION OF THE DRAWINGS

FIG. 6 shows the configuration of the color difference table according to an embodiment of the present invention;

FIG. 9 shows 8 picture elements around a target picture element according to an embodiment of the present invention;

FIG. 10 shows an overlap integration result when an L-shaped pattern exists according to an embodiment of the present invention;

FIG. 14 shows the method of generating a unicolor group according to an embodiment of the present invention;

FIG. 15 shows the method of computing the thickness of character lines according to an embodiment of the present invention;

FIG. 31A shows an original image according to an embodiment of the present invention;

FIG. 31B shows a label image shown in FIG. 31A;

DESCRIPTION OF THE PREFERRED EMBODIMENT

The image processing apparatus according to the embodiments of the present invention is described below by referring to the attached drawings.

Figure 1:
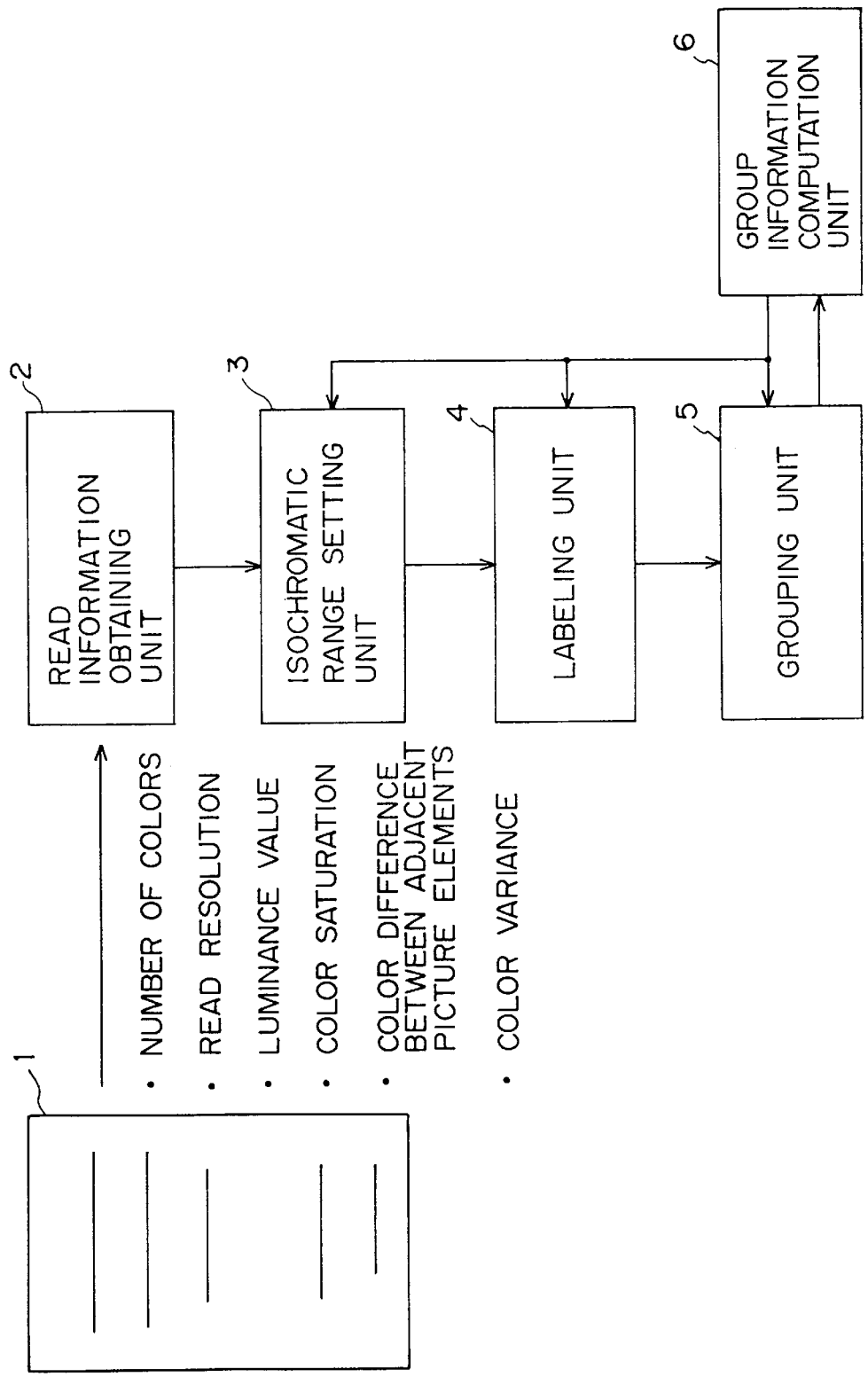
FIG. 1 is a block diagram of the configuration of the image processing apparatus according to the first embodiment of the present invention.

FIG. 1 is a block diagram of the configuration of the image processing apparatus according to the first embodiment of the present invention.

In FIG. 1, if an input image 1 is to be processed, a read information obtaining unit 2 obtains read information about the input image 1. The read information includes the number of colors, the read resolution, the luminance value, the color saturation, the color difference between adjacent picture elements, the variance of color, etc. of the input image 1.

A unicolor range setting unit 3 sets the range of the unicolor of the input image 1 for each input image 1 according to the read information about the input image 1.

A labeling unit 4 labels the input image 1 by assigning the same label to the connection picture elements in the unicolor range set by the unicolor range setting unit 3.

Thus, a threshold of the labeling unique to the input image 1 to be labeled can be obtained. Even when various color images are to be processed, and the unicolor range depends on each color image, the labeling process can be performed using a threshold corresponding to the range of the unicolor of the color image.

A grouping unit 5 groups label patterns generated by the labeling unit 4. That is, the labeling unit 4 assigns different labels to the characters forming the same title if the characters are separate from each other. On the other hand, the grouping unit 5 classifies the characters separate from each other into the same group, and collectively processes them only if the characters form the same title. The grouping unit 5 can group the patterns in a unicolor range area set by the unicolor range setting unit 3 into the same group.

The grouping unit 5 computes image information about a group according to the image information about the patterns classified into the same group.

The image information about a group can be the color information, the rectangle information, etc. about the group. The color information about a group includes, for example, an average value of the colors of the patterns belonging to the same group, the variance of the colors of the patterns belonging to the same group, etc. The rectangle information about a group includes, for example, the size, shape, or position of the enclosing rectangle of all patterns belonging to the same group.

When the image information about a group is obtained, the image information about the group is provided for the unicolor range setting unit 3, the labeling unit 4, and the grouping unit 5.

Upon receipt of the image information about the group, the unicolor range setting unit 3 sets a labeling threshold according to the image information about the group. For example, a change in color of a pattern belonging to the same group is obtained, and the maximum value of luminance differences among the patterns belonging to the same group is defined as a labeling threshold.

Thus, a labeling threshold can be obtained from the patterns to be labeled, and it is not necessary to apply a threshold experimentally obtained from a printing model, etc. uniformly to various patterns for labeling. Therefore, the labeling process can be performed with high precision even if a unicolor range of a background pattern does not match a unicolor range of a character pattern.

Upon receipt of the image information about a group, the labeling unit 4 can start the labeling process according to the image information about the group. For example, when a unicolor pattern is re-extracted, the search range can be limited to an enclosing rectangle encompassing the pattern belonging to the same group.

Thus, when a title pattern is extracted from the input image 1, only a missing pattern can be efficiently extracted even if a part of the pattern forming part of the title has been lost.

Upon receipt of the image information about a group, the grouping unit 5 can group patterns according to the image information about the group. For example, when patterns are grouped, the color of all patterns belonging to the same group is taken into account.

Thus, even if a local color change is detected at a part of a pattern to be grouped, the local color change is absorbed when patterns are grouped, thereby improving the extraction precision of unicolor patterns.

Figure 2:
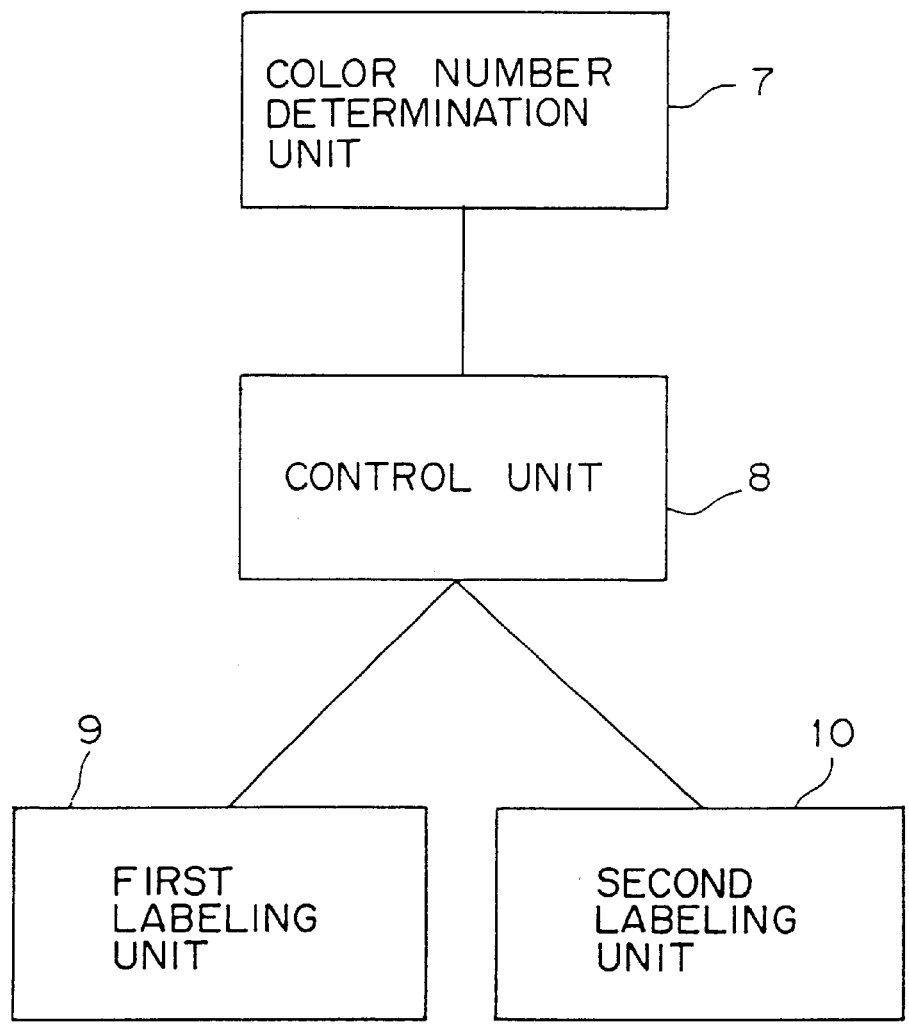
FIG. 2 is a block diagram of the configuration of the image processing apparatus according to the second embodiment of the present invention.

FIG. 2 is a block diagram of the configuration of the image processing apparatus according to the second embodiment of the present invention.

In FIG. 2, a color number determination unit 7 determines the number of colors of a color image. A first labeling unit 9 performs a labeling process in the first labeling method. A second labeling unit 10 performs a labeling process in the second labeling method. A control unit 8 instructs the first labeling unit 9 or the second labeling unit 10 to perform the labeling process based on the number of colors of a color image.

The color number determination unit 7 can determine the number of colors of a color image by checking the number of bits per picture element of a color image.

As the first labeling method, the labeling process can be performed by clustering color palettes. As the second labeling method, the labeling process can be performed using the adjacency expanding method.

The control unit 8 allows a color image having a small number of colors to be labeled by clustering color pallets, and allows a color image having a large number of colors to be labeled in the adjacency expanding method.

Thus, a color image having a small number of colors can be labeled with an area indicating a large color difference assumed to be a unicolor area, thereby preventing a color from being lost in the unicolor area and extracting the unicolor area with high precision. In addition, a small difference in color can be detected in a color image having a large number of colors to assign different labels to areas in different colors. As a result, only characters can be extracted with high precision even if the color of the background of the characters is similar to the color of the characters.

Figure 3:
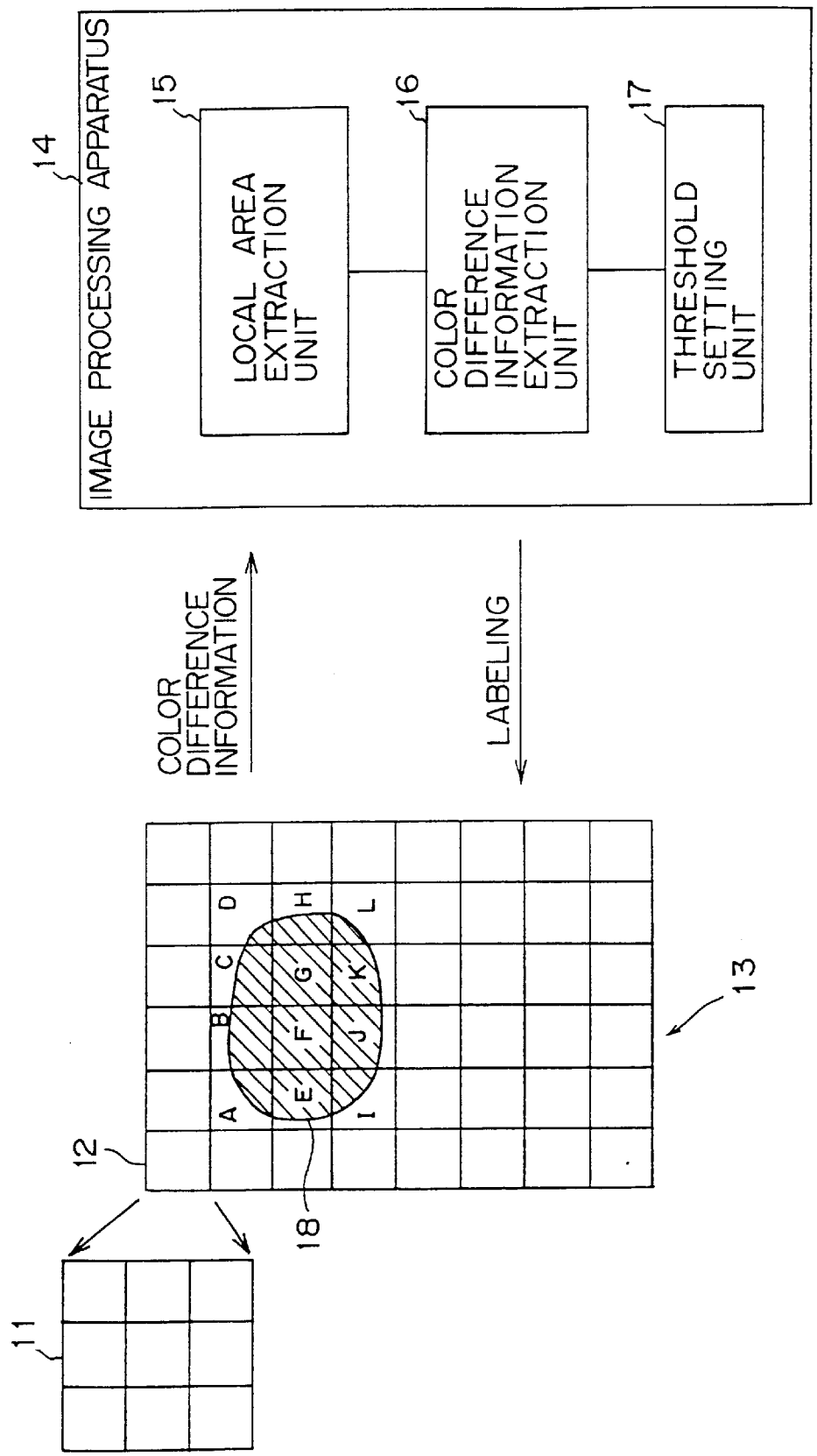
FIG. 3 is a block diagram of the configuration of the image processing apparatus according to the third embodiment of the present invention.

FIG. 3 shows the configuration and the operations of a image processing apparatus 14 according to the third embodiment of the present invention.

In FIG. 3, a local area extraction unit 15 extracts a local area from an input image 13 to be labeled. A color difference information extraction unit 16 extracts actual color difference information about the input image 13 from the local area. A threshold setting unit 17 sets a labeling threshold of the input image 13 according to the color difference information extracted from the input image 13.

The local area extraction unit 15 sections an input image in mesh form, and a mesh area 12 whose color variance is within a predetermined range can be extracted as a local area. In addition, the color difference information extraction unit 16 can compute the standard deviation of the color in the mesh area 12 extracted as a local area as color difference information. Furthermore, the threshold setting unit 17 sets a threshold based on an average value of the standard deviation obtained for each of the mesh areas 12.

For example, a unicolor area 18 can be extracted by checking whether or not the color difference between adjacent picture elements 11 is equal to or smaller than the threshold.

The threshold for use in determining the color difference between the picture elements 11 should be predetermined before the input image 13 is labeled. Therefore, if an experimentally determined value is adopted as a threshold using an experimental color image, all of various color images may not be appropriately processed.

Then, the color difference information extraction unit 16 extracts the color difference information about the unicolor area 18 from the input image 13 to be labeled, and the threshold setting unit 17 sets a labeling threshold for the input image 13 according to the color difference information.

A level color area is extracted from the input image 13 to extract the color difference information about the unicolor area 18 from the input image 13. To extract the level color area, for example, the input image 13 is divided into sections of 3×3 picture elements 11, thus generating the mesh area 12. When the mesh area 12 is generated, the color variance of the picture elements 11 is checked for each of the mesh areas 12 of the input image 13. The mesh area 12 indicating a small color variance in the picture elements 11 is defined as a level color area.

For example, since the mesh areas F and G of the input image 13 are in the unicolor area 18, the color variance of the picture elements 11 of the mesh areas F and G is small. On the other hand, since the unicolor area 18 and other areas coexist in the mesh areas A, B, C, D, E, H, I, J, K, and L, the color variance of the picture elements 11 in the mesh areas A, B, C, D, E, H, I, J, K, and L is large. Therefore, the color variance of the picture elements 11 is checked for each mesh area 12, and only the mesh area 12 in which the color variance of the picture elements 11 is small is extracted so that only the mesh areas F and G can be extracted as a level color area.

When a level color area is extracted, a labeling threshold is set according to the color difference information about a level color area.

For example, when the mesh areas F and G are extracted from the input image 13 as level color areas, a threshold for extraction of the unicolor area 18 is set based on the average value of the standard deviation of each of the mesh areas F and G.

Thus, although the input image 13 contains various colors, an area of a level color exists when each of small areas is checked. Therefore, if the color variance is obtained for each of the divided areas and only areas in which the color variance is small are extracted, a level color area can be extracted from the input image 13.

When a level color area is extracted from the input image 13, a labeling threshold can be set to specify the unicolor area 18 in picture element units by checking the variance of the color in the level color area.

As a result, it can be determined from the actual image to be processed how the color of the range painted in the similar color is actually different from others even when similar colors such as gray, intermediate colors, etc. are used for characters and their background, and these colors cannot be distinguished from each other only using an experimentally obtained threshold. Thus, only the characters can be extracted with high precision from the images in which characters and the background in similar color coexist.

The pattern extraction apparatus according to an embodiment of the present invention is described below by referring to the attached drawings.

Figure 4:
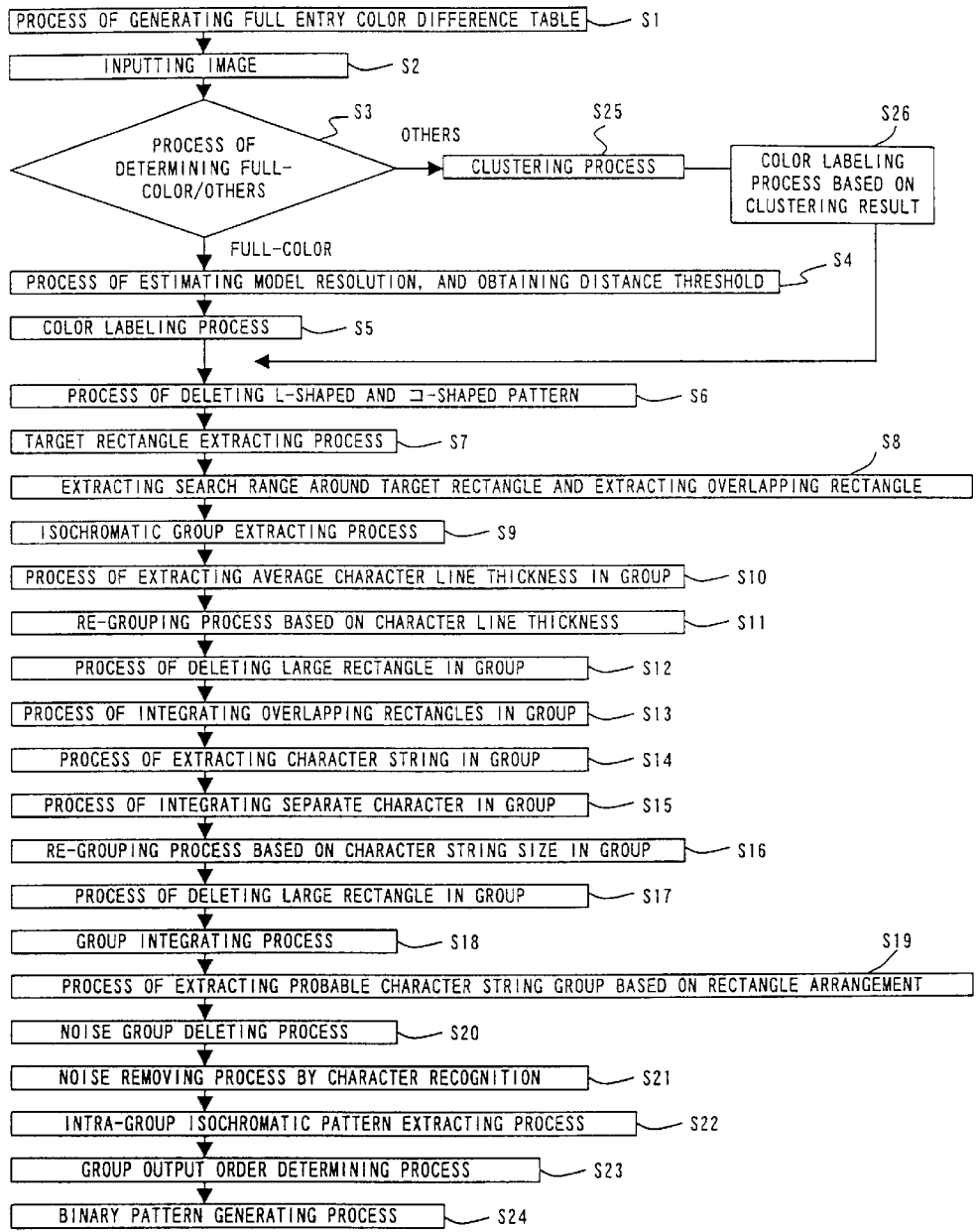
FIG. 4 is a flowchart of the operations of the pattern extraction apparatus according to the fourth embodiment of the present invention.

FIG. 4 is a flowchart of the operations of the pattern extraction apparatus according to the fourth embodiment of the present invention.

First, in FIG. 4, a full-entry color difference table generating process is performed (step S1). The full-entry color difference table stores the maximum value of the luminance difference from adjacent picture elements using each luminance value of the RGB of the input image and a read resolution as variables.

In this example, to obtain the maximum value of the luminance difference from adjacent picture elements, a unicolor area at each luminance value of the RGB is virtually generated on the computer using a printing model which is a simulation of an actual printing method. Then, the maximum value of the luminance difference from adjacent picture elements in the unicolor area virtually generated on the computer is obtained for each read resolution.

Figure 5:
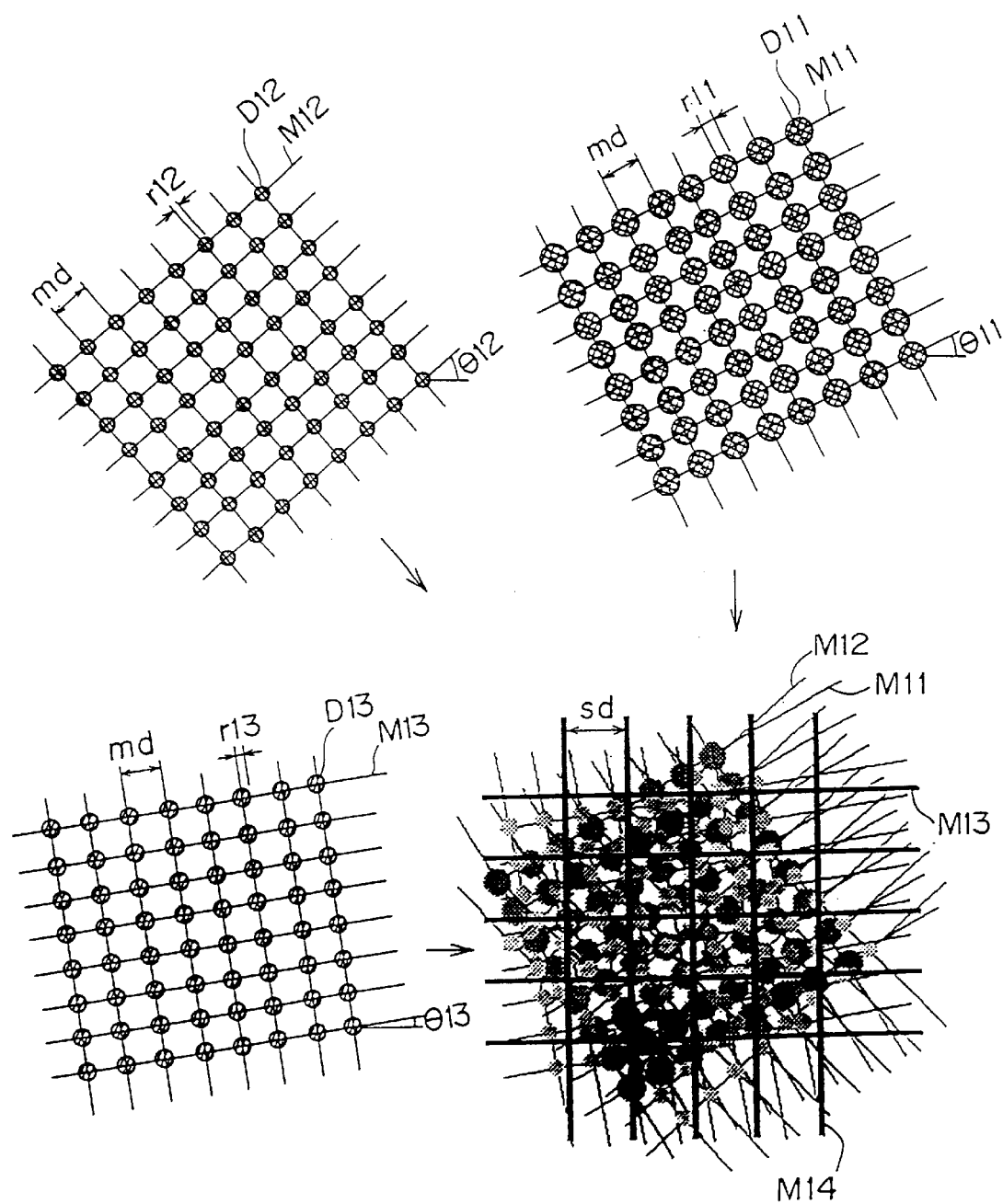
FIG. 5 shows the method of generating a printing model according to an embodiment of the present invention.

FIG. 5 shows the method of generating a printing model in the mesh-point printing method.

In FIG. 5, printing meshes M11, M12, and M13 of cyan, magenta, and yellow respectively are rotated and overlapped as a printing model to virtually represent the colors of a color image. In this example, when the depths of the colors cyan, magenta, and yellow are adjusted, the sizes of painted circles D11, D12, and D13 arranged at respective lattice points of the printing meshes M11, M12, and M13 are adjusted.

At this time, the parameters of a general printing model are:

lattice space md of printing meshes M11, M12, and M13 (where the lattice space md is common among yellow, cyan, and magenta)

angle θ11 from the horizontal line of the yellow mesh M11 angle θ12 from the horizontal line of the magenta mesh M12 angle θ13 from the horizontal line of the cyan mesh M13 radius r11 of the yellow painted circle D11 radius r12 of the magenta painted circle D12 radius r13 of the cyan painted circle D13 However, since all the above described parameters are variable in the present embodiment, the process is too complicated. Therefore, some restrictions are placed as follows.

angle θ11 from the horizontal line of the yellow mesh M11=15 degrees angle θ12 from the horizontal line of the magenta mesh M12=30 degrees angle θ13 from the horizontal line of the cyan mesh M13=45 degrees lattice space md=20 dots Simulation is performed using these printing models, and an average RGB value (Rm, Gm, Bm) which is influenced by the radii r11, r12, and r13 of respectively the yellow, magenta, and cyan painted circles D11, D12, and D13 is obtained.

Practically, in consideration of a unit area much larger than the lattice space md of the printing meshes M11, M12, and M13, the average RGB value (Rm, Gm, Bm) is obtained as follows.

Rm=255− area of cyan in unit area×255/unit area

Gm=255− area of magenta in unit area×255/unit area

Bm=255− area of yellow in unit area×255/unit area

Described below is a scanner read model obtained when an image uniformly printed in one color (Rm, Gm, Bm) is read by a scanner. This corresponds to introducing a read mesh M14 having a space sd independent of the printing meshes M11, M12, and M13, and obtaining each luminance value (=area of each color) of the RGB in the read mesh M14. The space sd of the read mesh M14 corresponds to the scanner read resolution.

Even if an image of the same average color (Rm, Gm, Bm) is read, the RGB luminance difference between the adjacent pixels is large when the scanner read resolution is large. On the other hand, when the scanner read resolution is small, each of the read pixels is similar to an average color (Rm, Gm, Bm). Therefore, the RGB luminance difference between pixels is close to 0.

The practical RGB luminance values (Rc, Gc, Bc) in one read mesh M14 can be obtained as follows.

Rc=255− area of cyan in read mesh area×255/read mesh area

Gc=255− area of magenta in read mesh area×255/read mesh area

Bc=255− area of yellow in read mesh area×255/read mesh area where the space sd of the read mesh M14 is changed when the RGB luminance values (R, Gc, Bc) and the luminance difference of the RGB between adjacent picture elements are obtained. An appropriate value (for example, the maximum value) of the luminance difference corresponding to each RGB luminance value is recorded in the color difference table.

At this time, since a circle drawn and painted at an intersection of a printing mesh has overlapping RGB in an original printing model, and the luminance values of the RGB influence each other, the RGB cannot be defined as independent of each other. However, in the scanner read model, it is assumed that the RGB is independent from each other for simple explanation.

Therefore, the RGB luminance values, the read resolution, and the result of luminance difference between adjacent picture elements can be stored in the RGB independent table.

FIG. 6 shows an example of an R table.

In FIG. 6, for each R luminance value variable from 0 through 255, the maximum value of the luminance difference from adjacent picture elements is stored with the scanner read resolution varied from 14 through 35.

The full-entry color difference table can be generated by simulating a luminance value of 0 through 255, obtaining in a printing model the maximum value of the luminance difference between adjacent picture elements at each luminance value, and each value is stored in the color difference table. The process is performed for each color element of the RGB.

The R table is shown in the example in FIG. 6. The configurations of the G and B tables can be similarly designed.

When the color difference tables of R, G, and B are provided, a threshold for use in detecting a unicolor range can be obtained from an input image by retrieving the maximum value of the luminance difference from adjacent picture elements from the color difference table using the RGB luminance values of the input image and the read resolution as keys.

Thus, an interpolating operation can be omitted by generating in advance a table containing entries of all luminance values, and the processing time required for a parameter estimating process, a color labeling process, etc. can be shortened as compared with the case in which only ten and several entries having discontinuous luminance values are entered, thereby quickly performing the processes.

When a color difference table containing ten and several entries of discontinuous luminance values is used, the maximum value of the luminance difference from adjacent picture elements can be obtained by the following interpolating operation. Assume that the maximum value of the luminance difference from adjacent picture elements to the luminance value Ri entered in the color difference table is Rdi, and the maximum value of the luminance difference from adjacent picture elements to the luminance value Ri+1 entered in the color difference table is Rdi+1. At this time, if the luminance value Rm not entered in the color difference table is represented by the linear interpolation between the luminance value Ri and the luminance value Ri+1, the relationship is applied to the maximum value of the luminance difference from adjacent picture elements, and the estimated maximum value infered_delta of the luminance difference from the adjacent picture elements is obtained. That is, $rl=Ri-Ri+1$ $rm=Rm-Ri$ $rn=Ri+1-Rm$ infered_delta $Rdi*rn/rl+Rdi+1*rm/rl$ Next, an image input process is performed (step S2).

In the image input process, a color image is input using a pickup device such as a CCD camera, a scanner, etc., and the input data is stored in the memory.

Then, a full-color/others determination process is performed (step S3).

In the full-color/others determination process, the number of bits per picture element contained in the header of an input image is checked. An image having 24-bits/picture element is defined as a full-color image, and the process in steps S4 through S24 shown in FIG. 4 is performed. When the number of bits per picture element is smaller than 24, it is assumed that the input image is not a full-color image, and the processes in steps S25, S26, and S6 through S24 are performed.

Next, a model resolution estimating process and a distance threshold obtaining process are performed (step S4). To obtain a labeling threshold using the color difference table, it is necessary to know to which read resolution of a printing model the resolution of an input image corresponds. In the model resolution estimating process, it is estimated to which read resolution of a printing model the resolution of an input image applies. In this process, the input image is divided into mesh form, and the read resolution best matching the maximum value of the luminance difference from adjacent picture elements in each mesh area is obtained from the color difference table.

The labeling threshold entered in the color difference table is computed from a printing model, and it may not be fully applicable to the actual state of the color difference of an input image. Therefore, in the distance threshold obtaining process, a threshold used in the labeling process is obtained from the actual color difference of an input image. In this process, the input image is divided into mesh form, and the color variance of the picture elements in each mesh area is obtained. Thus, a mesh area of a level color can be extracted. Based on the standard deviation of the picture elements in the mesh area of a level color, a threshold for use in the labeling process is obtained.

Described below is the model resolution estimating process.

First, an input image is segmented in an n×n mesh form. The value of (R, G, B) of each picture element in each mesh area is not analyzed for each color element, but the value of (R, G, B) is totally processed so that the resolution of a printing model most applicable to the input image can be obtained. In this case, to obtain the resolution of an input image, an average value is computed from the resolution obtained only from the mesh areas not so different in adaptability to the printing model.

However, in this method, when an actual input image does not match a printing model, there may arise an error in read resolution. For example, an actual input image is often printed in Y (yellow), M (magenta), C (cyan), and K (black). The angle of the mesh of each color (screen angle), the order of printed colors, the influence of dependence among colors when colors are printed as overlapping, the resolution of a mesh, the use of three colors of Y, M, and C or four colors of Y, M, C, and K all depend on each printed matter. On the other hand, the color of a printing model is generated on the fixed conditions of a fixed angle, an independent color, 3 colors of Y, M, and C, and a predetermined range of mesh resolution. Therefore, there arises an error from an actual input image, and it affects the estimation of a read resolution.

As a result, a resolution value somewhat different from an ideal resolution value at which an actually correct pattern can be extracted is estimated. Therefore, in the area to be of the same color actually, a unicolor range which depends on the resolution and the color to be processed is reduced. Accordingly, a unicolor area is divided into small areas, and character patterns normally assigned the same labels are divided into small different areas.

Therefore, according to the present embodiment, an estimated resolution is independently obtained for each element of (R, G, B) from the entire image, and the estimated resolutions independently obtained for respective elements are averaged later.

Figure 7:
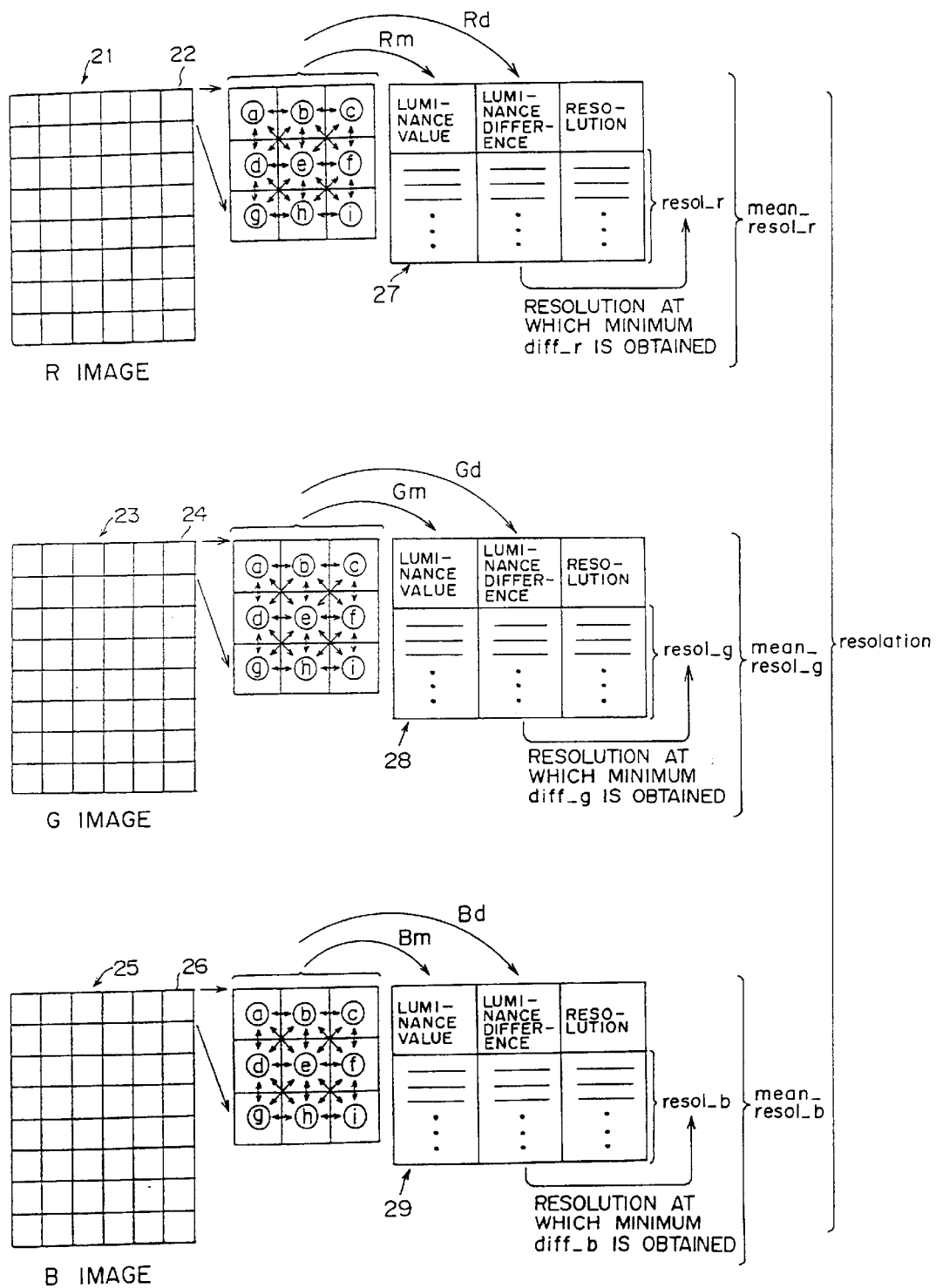
FIG. 7 shows the method of estimating the read resolution according to an embodiment of the present invention.

FIG. 7 shows the model resolution estimating process according to an embodiment of the present invention.

In FIG. 7, an R image 21, a G image 23, and a B image 25 each input image of which is analyzed into RGB elements are divided into mesh areas 22, 24, and 26. Each area comprises 3×3 picture elements a through i. The average RGB luminance (Rm, Gm, Bm) of the 3×3 picture elements a through i in each of the mesh areas 22, 24, and 26, and the maximum value (Rd, Gd, Bd) of the luminance difference between adjacent picture elements are obtained for each of the mesh areas 22, 24, and 26 of the R image 21, G image 23, and B image 25 respectively. Since the number of adjacent directions of the 3×3 picture elements a through i is 20, the 20 luminance differences between adjacent picture elements are obtained, and the maximum value (Rd, Gd, Bd) is adopted from among the luminance differences.

On the other hand, the maximum values of the luminance differences between adjacent picture elements corresponding to respective luminance values are entered in an R table 27, a G table 28, and a B table 29.

Then, the R table 27 is searched using an average R luminance Rm and the maximum luminance difference Rd from adjacent picture elements as key information, and the difference diff_r from the maximum luminance difference Rd between adjacent picture elements obtained from the R image 21 and the maximum luminance difference from adjacent picture elements entered in the R table 27 is obtained. The computation of the difference diff_r is performed on all resolutions entered for the average R luminance Rm, and the resolution resol_r having the minimum difference diff_r is obtained from the R table 27.

The computation of the resolution resol_r is performed on all mesh areas 22 of the R image 21, and the mean value mean_resol_r of each resolution resol_r is computed for each mesh area 22.

Then, the G table 28 is searched using an average G luminance Rm and the maximum luminance difference Gd between adjacent picture elements as key information, and the difference diff_g between the maximum luminance difference Gd between adjacent picture elements obtained from the G image 23 and the maximum luminance difference from adjacent picture elements entered in the G table 28 is obtained. The computation of the difference diff_g is performed on all resolutions entered for the average G luminance Gm, and the resolution resol_g having the minimum difference diff_g is obtained from the G table 28.

The computation of the resolution resol_g is performed on all mesh areas 24 of the G image 23, and the mean value mean_resol_g of each resolution resol_g is computed for each mesh area 24.

Then, the B table 29 is searched using an average B luminance Bm and the maximum luminance difference Bd between adjacent picture elements as key information, and the difference diff_b between the maximum luminance difference Bd between adjacent picture elements obtained from the B image 25 and the maximum luminance difference from adjacent picture elements entered in the B table 29 is obtained. The computation of the difference diff_b is performed on all resolutions entered for the average B luminance Bm, and the resolution resol_b having the minimum difference diff_b is obtained from the B table 29.

The computation of the resolution resol_b is performed on all mesh areas 26 of the B image 25, and the mean value mean_resol_b of each resolution resol_b is computed for each mesh area 26.

When the mean value mean_resol_r, the mean value mean_resol_g, and the mean value mean_resol_b are obtained, the mean value resolution of these values is obtained. The resolution is defined as a read resolution of a printing model of an input image.

The process is described below by referring to equations. When an input image is divided into mesh areas each of which is formed by 3×3 picture elements, the internal average RGB luminance is defined as (Rm, Gm, Bm), and the maximum luminance difference between adjacent picture elements as (Rd, Gd, Bd).

Since the processes are independently performed for the R, G, and B, the case of R is described below as an example.

The resolution is fixed to a specific value, a color difference table is referred to from the Rm, and the estimated maximum luminance difference infered_delta between adjacent picture elements is obtained. The difference diff_r between the estimated maximum luminance difference infered_delta between adjacent picture elements and the Rd obtained from the actual image is obtained as $$\text{diff\_r} = |Rd - \text{infered\_delta}|.$$

The resolution parameter is scanned to obtain the resolution resol_r having the smallest difference diff_r. The resolution resol_r is computed for all mesh areas, and the mean value mean_resol_r of the resolution resol_r is obtained.

The similar processes are performed on the G and the B to obtain the mean value mean_resol_g and the mean value mean resol_b. The mean value resolution of these values is obtained as $$\text{resolution} = (\text{mean\_resol\_r} + \text{mean\_resol\_g} + \text{mean\_resol\_b})/3,$$

and the mean value resolution is used as an estimated resolution of an input image.

Described below is a practical distance threshold obtaining process.

First, to correctly distinguish a character area from its background even when the color boundary between the background and the character area is not clear, the average color of the label areas assigned the same labels (areas determined to be unicolor areas) is computed, and a target picture element is incorporated into the label area if the color difference between the average color and the color of the surrounding target picture elements is within the color difference of a predetermined multiplier of an allowed color difference estimated from the average color of the label area.

In this method, a character area and its background can be distinguished from each other with a substantially correct result.

However, in this method, a value entered in the color difference table as a labeling threshold is similarly applied to various color images. Therefore, if specific colors such as gray, intermediate colors, etc. are contained in a background and a character area, it may be determined that the background and the character belong to the same area. As a result, the color of the background cannot be correctly distinguished from the color of the character of a color image to be labeled.

Then, according to the present embodiment, a local unicolor determination process to be performed on an input image is adopted, a local unicolor area (where no color changes are detected) is obtained from the input image, and a threshold of a distance for use in color labeling is obtained from the local area.

In this method, a character area and its background can be correctly distinguished from each other even if the color boundary between the character area and the background is not clear, thereby precisely separating only a character area from its background, and correctly extracting only the character area.

Practically, an input image is divided into mesh areas each of which is formed by 3×3 picture elements, and the internal average RGB luminance value (Rm, Gm, Bm) and the variance (Rv, Gv, Bv) are obtained. The root of the sum of the squares of respective variances of the RGB is obtained by $$s = \text{sqrt}(Rv \times Rv + Gv \times Gv + Bv \times Bv),$$

and the value s is defined as a variance of a mesh area. The value of s for each mesh area of an input image is obtained and stored. The maximum value s is stored as smax.

If the value s of a mesh area satisfies:

smax×RANGE_LOW<s<smax×RANGE_HIGH, and s>MIN_VARI (for example, RANGE_LOW=0.004, RANGE_HIGH= 0.16, MIN_VALI=10), then the mesh area is defined as a local area for obtaining a labeling threshold.

The smaller the value s is, the more alike the colors of the picture elements in a mesh area become. However, in many cases, the area having the smallest value s is a unicolor background area. Therefore, if a labeling threshold is set based on the color difference of the area having the smallest value s, and a character area is extracted using the threshold, then the threshold may become too small, and may not be appropriate for use in extracting a character area. Therefore, the value s of a mesh area to be used in computing a threshold has a lower limit.

When a mesh area for use in computing a threshold is obtained from an input image, the root of the value s of the mesh area is obtained as a standard deviation. The standard deviation obtained from each target mesh area is multiplied by k (for example, k=_3.0), the mean value TH_dist of which is obtained by the following equation, and the mean value TH dist is defined as a distance threshold.

$$\text{TH\_dist} = \left( \sum_{n}^{i=1} \text{sqrt}(s\,i) \times 3 \right) / n$$

where i indicates the number of a target mesh area, and n indicates the number of target mesh areas.

In the distance threshold obtaining process, the mean RGB value (Rm, Gm, Bm) computed in the model resolution estimating process can be used in computing the variance (Rv, Gv, Bv) by using the same mesh as the mesh used in the model resolution estimating process, thereby quickly performing the process.

Next, a color labeling process is performed (step S5).

In the color labeling process, an area expanding method is adopted. In this area expanding method, the entire image is segmented into unicolor areas by repeating the process of assigning the same label when the colors of adjacent picture elements are similar to each other. In the area expanding method, whether or not the same label is to be assigned depends only on the picture elements around a target picture element. Therefore, the processing time can be shorter than the time required to cluster a color space.

In addition, in the area expanding method, a unicolor pattern indicates a blank portion, an unclear outline, etc. depending on the definition of the similarity between adjacent picture elements. Since only the relationship between adjacent picture elements are checked, a character area and its background area may be assigned the same label when the color gradually changes at the boundary between the character area and the background area.

Therefore, if an average color of the label areas assigned the same labels is computed, and the color difference from the average color and the color of the target picture elements around the average color is within the color difference of a predetermined multiplier of an allowed color difference estimated from the average color of the label areas, then the target picture elements can be incorporated into the label areas, thereby correctly, to some extent, distinguishing the background from the character area even when the boundary between them is not clear.

However, this method cannot be applied to various color document images. That is, in areas of gray, intermediate color, etc. characters and their background can be frequently assigned the same labels. Therefore, a character pattern may not be correctly extracted, or an extracted label area may be divided into small portions in the character pattern.

According to the present embodiment, a threshold obtained in step S4 is used as a labeling threshold in the area expanding method. The threshold obtained in step S4 is set based on the actual color difference of the unicolor area of an input image to be labeled, and the optimum values can be assigned to various color document images. Therefore, a threshold obtained using a printing model, etc. is not uniformly applied to various color document images, but the labeling process is performed with the range of a unicolor area of various color document images individually taken into account, thereby improving the extraction precision of a unicolor area.

Figure 8:
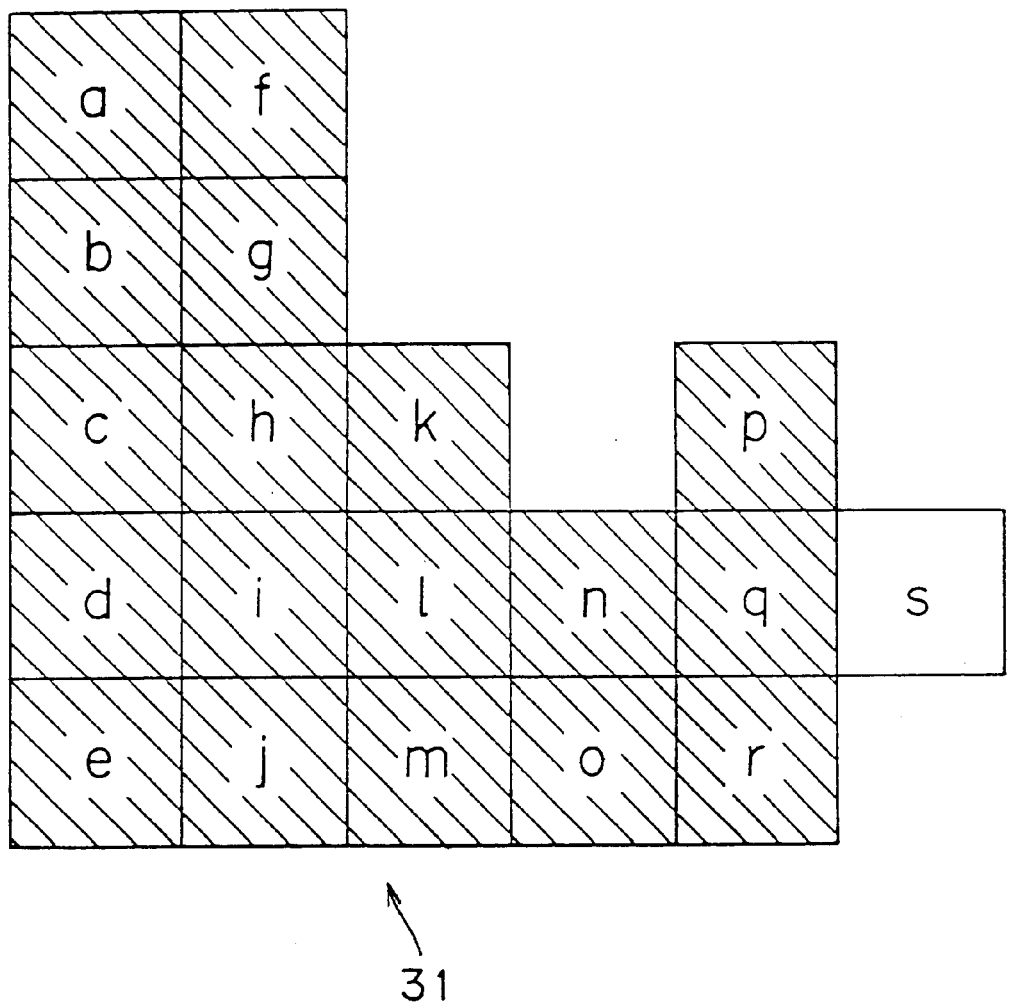
FIG. 8 shows the color labeling process according to an embodiment of the present invention.

FIG. 8 shows the color labeling process according to an embodiment of the present invention.

In FIG. 8, it is assumed that an area (indicated by diagonal lines) formed by picture elements a through r is extracted as a unicolor pattern 31, and the same labels are assigned to picture elements a through r. For example, when a picture element s with no label assigned is detected, it is checked whether or not there have been picture elements already assigned labels around the picture element s. If already labeled picture elements p, q, and r are detected, then it is checked whether or not the color difference between the picture element s and any of the picture elements p, q, and r is equal to or smaller than a predetermined threshold. If the color difference from the picture element s and the picture element p is equal to or smaller than the predetermined threshold, then the color of the picture element s is compared with the average color of the colors of the picture elements a through r assigned the same labels as the picture element p. As a result, if it is determined that the color difference between the picture element s and the average color of the colors of the picture elements a through r assigned the same labels as the picture element p is equal to or smaller than the threshold, then the picture element s is assigned the same label as the picture element p.

The labeling precision can be improved by not obtaining a labeling threshold from a color difference table, but by, for example, extracting an area formed by extracting picture elements c, d, e, h, i, j, k, l, and m as a mesh area, and obtaining the labeling threshold based on the variance of the colors of the picture elements c, d, e, h, i, j, k, l, and m.

Practically, a raster scanning is performed from the upper left corner of an input image, and an unlabeled picture element is checked as a target picture element. The maximum luminance difference from adjacent picture elements is obtained for each color element of R, G, and B by searching the table using the RGB luminance value (R, G, B) of the target picture element and the estimated resolution. When the maximum luminance difference from adjacent picture elements is obtained, it is defined as a labeling threshold (delta_r, delta_g, delta_b).

In the above described embodiment, the process of obtaining a labeling threshold (delta_r, delta_g, delta_b) by searching a table using the same resolution for each element of R, G, and B is described. However, a labeling threshold (delta_r, delta_g, delta_b) can be obtained by individually using the resolution (mean_resol_r, mean_resol_g, mean_resol_b) of each element of R, G, and B, and respectively searching the R, G, and B tables.

If eight picture elements around the target picture element are scanned, there have already been labeled picture elements around the target picture element, and the RGB luminance values (Rs, Gs, Bs) of the surrounding picture elements satisfy the following conditions, then it is determined that the color of the target picture element is similar to the color of the surrounding picture elements.

$|R-Rs| \leq$ delta_r $|G-Gs| \leq$ delta_g $|B-Bs| \leq$ delta_b

When it is determined that the color of the surrounding picture elements is similar to the color of the target picture element, the label of the surrounding picture elements is stored as a current label (region), and 'region' is assigned as a label of the target picture element. In addition, a new average color obtained by adding the color of a target picture element to an average color of the surrounding label areas is obtained as an average color (Rm, Gm, Bm) of label areas.

In other cases, a label value is set as a current label by adding 1 to the latest label value, and the value is assigned to the label of the target picture element. In this case, the RGB value of the target picture element is set as an average color (Rm, Gm, Bm) of the label areas.

In either case, the coordinates of the target picture element are stored in the coordinate array to be processed.

Next, the process of expanding a unicolor area around a target picture elements is performed. From among the coordinate arrays to be processed, the leading coordinates are retrieved, and the picture element corresponding to the coordinates is defined as a target picture element. The table is searched using the RGB luminance value of the target picture element, and the luminance difference between adjacent picture elements of each of the RGB elements is defined as an estimated threshold (delta_r, delta_g, delta_b).

When the eight picture elements around the target picture element are scanned, and the surrounding picture elements are unprocessed, the RGB luminance value (Ri, Gi, Bi) of the surrounding picture elements is obtained and the luminance differences from the RGB luminance value (Rc, Gc, Bc) of the target picture element and from the luminance value of the average color (Rm, Gm, Bm) of the label areas are obtained for each RGB element.

FIG. 9 shows the eight picture elements around the target picture element according to an embodiment of the present invention.

In FIG. 9, there are eight surrounding picture elements around the target picture element C. When the luminance difference from adjacent picture elements is obtained, the eight picture elements are scanned.

When the relationship between the RGB luminance value (Ri, Gi, Bi) of the surrounding picture elements and the RGB luminance value (Rc, Gc, Bc) of the target picture element satisfies:

$|Ri-Rc| \leq$ delta_r;

$|Gi-Gc| \leq$ delta_g; and $|Bi-Bc| \leq$ delta_b, and the distance value of the color difference between the average color (Rm, Gm, Bm) of the label areas and the RGB luminance value (Ri, Gi, Bi) satisfies $|Ri-Rm|+|Gi-Gm|+|Bi-Bm| < TH\_\text{dist}$, then the same label as those of the target picture element is assigned to the surrounding picture elements, and the coordinates of the surrounding picture elements are added to the coordinate array to be processed. The processed target picture element is removed from the coordinate array to be processed. The maximum and minimum x and y values of the process coordinates are obtained, and the values are stored as enclosing rectangles of the label areas. The average color of the label areas is stored as an attribute of the enclosing rectangle.

In this example, TH_dist is used as a threshold for use in determining the color difference between the average color of label images and the surrounding picture elements. If a threshold entered in the table is used as a threshold for use in determining the color difference between the average color of label images and the surrounding picture elements, unicolor picture elements can be prevented from being lost because the threshold entered in the table is the maximum value of the luminance difference from the adjacent picture elements. However, when the boundary between a character and its background is not clear, and the color difference between the character and the background is small, the background is included in the character area. As a result, the boundary of the character cannot be clearly detected.

Since TH_dist is set based on the actual average variance of colors in substantially unicolor local areas, the level color range of the actual image can be detected with high precision. Therefore, even if the boundary between a character and its background is not clear, the color of the background, which can be different from the color of the character, is distinguished from the color of the character.

The above described process is repeated until the contents of the coordinate array to be processed are all processed.

As a result of the labeling process, the areas connected by the same color are assigned the same label value, and a rectangle enclosing the areas having the same labels is obtained. The output information of the labeling process contains the following data.

label image: 4 bytes/1 picture element
enclosing rectangle
  number of rectangles: maxcount
  rectangle information: lbtbl
    label number of included label image: label
    coordinates of upper left vertex: (xmin, ymin)
    coordinates of lower right vertex: (xmax, ymax)
    representative color in rectangle: (r, g, b)
    related group number: string_level
    outline length: contour Next, the L-shaped and ⊐-shaped pattern deleting process is performed (step S6).

In the L-shaped and ⊐-shaped pattern deleting process, L-shaped and ⊐-shaped patterns near character patterns and having the same color as the character patterns are deleted.

These patterns should be deleted because, if there is a background pattern around a character pattern, a part of the background pattern may be extracted as an L-shaped or ⊐-shaped pattern, and the L-shaped or ⊐-shaped patterns are integrated into a character pattern in the overlapping rectangle integrating process. When they are integrated, they are not separated in the subsequent processes, but are processed in the integrated state. As a result, they have no characteristics of characters, and are deleted during the process, or extracted as characters containing patterns of noise other than characters. Therefore, the L-shaped or ⊐-shaped patterns are deleted at an early step of the process to prevent the above described problems.

FIG. 10 shows an overlap integration result when an L-shaped pattern exists according to an embodiment of the present invention.

In FIG. 10A, a 'character' pattern 42 and an L-shaped pattern 43 are extracted. An enclosing rectangle 41 of the 'character' pattern 42, and an enclosing rectangle 44 of the L-shaped pattern 43 are generated. In this example, when the enclosing rectangle 41 and the enclosing rectangle 44 are processed in an overlapping rectangle integrating process, an enclosing rectangle 45 is generated as shown in FIG. 10B. When the enclosing rectangle 45 is generated, the 'character' pattern 42 and the L-shaped pattern 43 are assumed to form a pattern, thereby losing the characteristics of the size and shape of the 'character' pattern 42.

Therefore, deleting the L-shaped pattern 43 prevents the enclosing rectangle 41 from being integrated into the enclosing rectangle 44, and the subsequent processes can be performed with the size and shape of the 'character' pattern 42 maintained.

Practically, the ratio of black picture elements in a pattern in a rectangle (=number of picture elements in a pattern/area of rectangle) is obtained. Then, a pattern which satisfies the following conditions is removed as an L-shaped or ⊐ shaped pattern.

width of rectangle>threshold;
height of rectangle>threshold; and
black picture element ratio<threshold of black picture element ratio
where, for example, a width threshold can be set to 100 dots, a height threshold to 100 dots, a black picture element ratio threshold to 0.4.

Next, a target rectangle extracting process is performed (step S7).

In this target rectangle extracting process, an enclosing rectangle having a size within a predetermined range is extracted as a target rectangle from among enclosing rectangles of all colors.

Practically, an enclosing rectangle which satisfies the following conditions is extracted as a target rectangle.

½ of width of image≧length of enclosing rectangle in×direction≧23 dots (in 100 dpi); and
½ of height of image≧length of enclosing rectangle in y direction≧23 dots (in 100 dpi)

In this target rectangle extracting process, the size of a reference enclosing rectangle for use in grouping enclosing rectangles can be limited. For example, when a title is extracted, enclosing rectangles can be grouped based on the enclosing rectangles applicable in size for title characters, thereby preventing enclosing rectangles from being grouped based on noise and backgrounds, that is, the enclosing rectangles not for titles. As a result, unnecessary processes can be omitted, and the process can be quickly completed.

Next, a search range around a target rectangle and a rectangle related to the range are extracted (step S8).

In the process of extracting a rectangle related to the search range, a specific size of search range is set around a target rectangle, and a rectangle related to the range is extracted.

Figure 11:
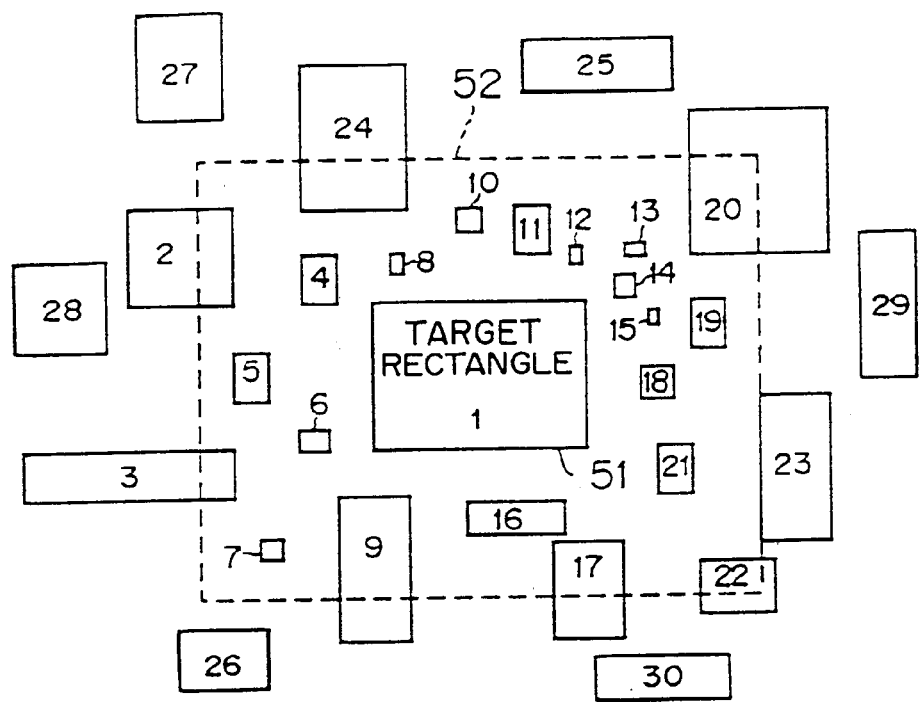
FIG. 11 shows the method of setting the search range around a target rectangle according to an embodiment of the present invention.

FIG. 11 shows the method of setting a search range around a target rectangle according to an embodiment of the present invention.

In FIG. 11, enclosing rectangles having the rectangle numbers 1 through 30 are extracted, and an enclosing rectangle 51 for the rectangle number 1 is defined as a target rectangle. A search range 52 is set around the enclosing rectangle 51. In the process of grouping about the enclosing rectangle 51, only the enclosing rectangles having the rectangle numbers 2 through 24 overlapping the search range 52 are selected, and the enclosing rectangles having the rectangle numbers 25 through 30 not overlapping the search range 52 are removed from the group of the enclosing rectangle 51 to be processed.

As described above, when enclosing rectangles are grouped, only the character strings within a predetermined range can be extracted by limiting the search range of enclosing rectangles to the area around a target rectangle. For example, when a title area is extracted, it is not necessary to consider a character positioned apart from a title area. Therefore, a title area can be efficiently extracted.

Practically, the search range 52 is defined as follows. That is, assuming that the longer side of the enclosing rectangle 51 is len, the len or the length of 35 dots in 100 dpi, whichever is shorter, is defined as the search range length range_size around the target rectangle.

The following method is used to quickly obtain an enclosing rectangle overlapping the range of the range_size of the target rectangle.

Figure 12:
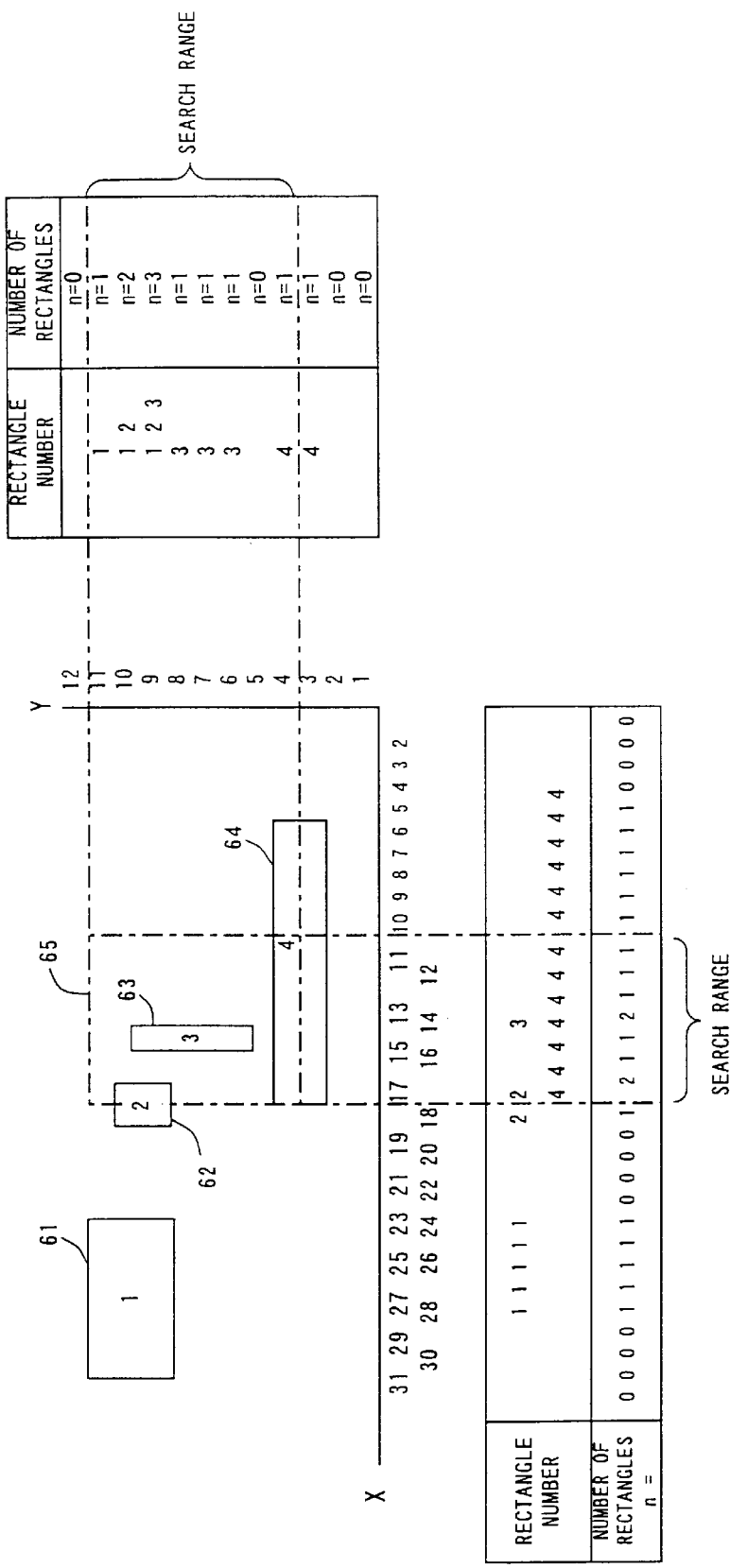
FIG. 12 shows the method of extracting a rectangle within or overlapping the target rectangle according to an embodiment of the present invention.

FIG. 12 shows the method of extracting a rectangle overlapping the search range around the target rectangle according to an embodiment of the present invention.

In FIG. 12, assuming that enclosing rectangles 61 through 64 have been extracted, the numbers and the total number of the rectangles existing at each of the X and Y coordinates are obtained, and the numbers of the rectangles and the total number of the rectangles are entered for each of the X and Y coordinates.

For example, since the enclosing rectangles 61 through 64 do not exist at the positions specified by the X coordinates 1 through 4, the number n of rectangles=0, and the numbers of rectangles=empty are entered. Since the enclosing rectangle 64 having the rectangle number 4 exists at the position specified by the X coordinates 5 through 13, the number n of rectangles=1, and the numbers of rectangles=4 are entered. Since the enclosing rectangle 63 having the rectangle number 3 and the enclosing rectangle 64 having the rectangle number 4 exist at the position specified by the X coordinate 14, the number n of rectangles=2, and the numbers of rectangles=3, 4 are entered. Since the enclosing rectangle 64 having the rectangle number 4 exists at the positions specified by the X coordinates 15 and 16, the number n of rectangles=1, and the numbers of rectangles=4 are entered. Entries are similarly made for the rest of the coordinates.

Next, assuming that the enclosing rectangle 63 having the rectangle number 3 is a target rectangle, and a search range 65 is set around the enclosing rectangle 63, each of the X and Y coordinates contained in the search range 65 is obtained. Then, the rectangle number at each of the X and Y coordinates is obtained, and the rectangle contained in the X and Y coordinates is defined as an enclosing rectangle overlapping the search range 65. For example, the rectangle numbers of the enclosing rectangles containing the X coordinates of the search range 65 are 1 through 4, and the rectangle numbers of the enclosing rectangles contained in the Y coordinates of the search range 65 are 2 through 4. Therefore, the enclosing rectangles contained in the X and Y coordinates are those having the rectangle numbers 2 through 4. As a result, the enclosing rectangles 62 through 64 corresponding to the rectangle numbers 2 through 4 are obtained as enclosing rectangles overlapping the search range 65.

Practically, the following processes a) through d) are performed.

a) The rectangle number is projected to the X and Y axes of the entire image. That is, for each picture element along the X and Y axes of the entire image, a set of the total number of rectangles and the numbers of rectangles belonging to it are entered. For example, assuming that the rectangle having the rectangle number i is within the range of the X axis (x1, x2), the coordinates x1 through x2 of the X axis contain the rectangle having the rectangle number i in a set of rectangle numbers. The similar process is performed on all rectangles for the vertical and horizontal coordinates.

b) The range of range_size is set around the target rectangle.

c) A set of rectangles is extracted after performing a logical OR operation on the types of rectangles for each X coordinate in the range of range_size.

Similarly, rectangles are extracted about the Y axis.

d) A logical AND operation is performed on the set of rectangle numbers obtained from the X axis and the set of rectangle numbers obtained from the Y axis, and a set of rectangles around the target rectangle is determined.

In the method of storing the rectangle numbers shown in FIG. 12, it is required to store for each of the coordinates all rectangle numbers in the entire image, thereby requiring a large storage capacity.

The following method is adopted to quickly obtain the number of rectangles and the numbers of the rectangles as described above with minimal memory requirements.

Figure 13:
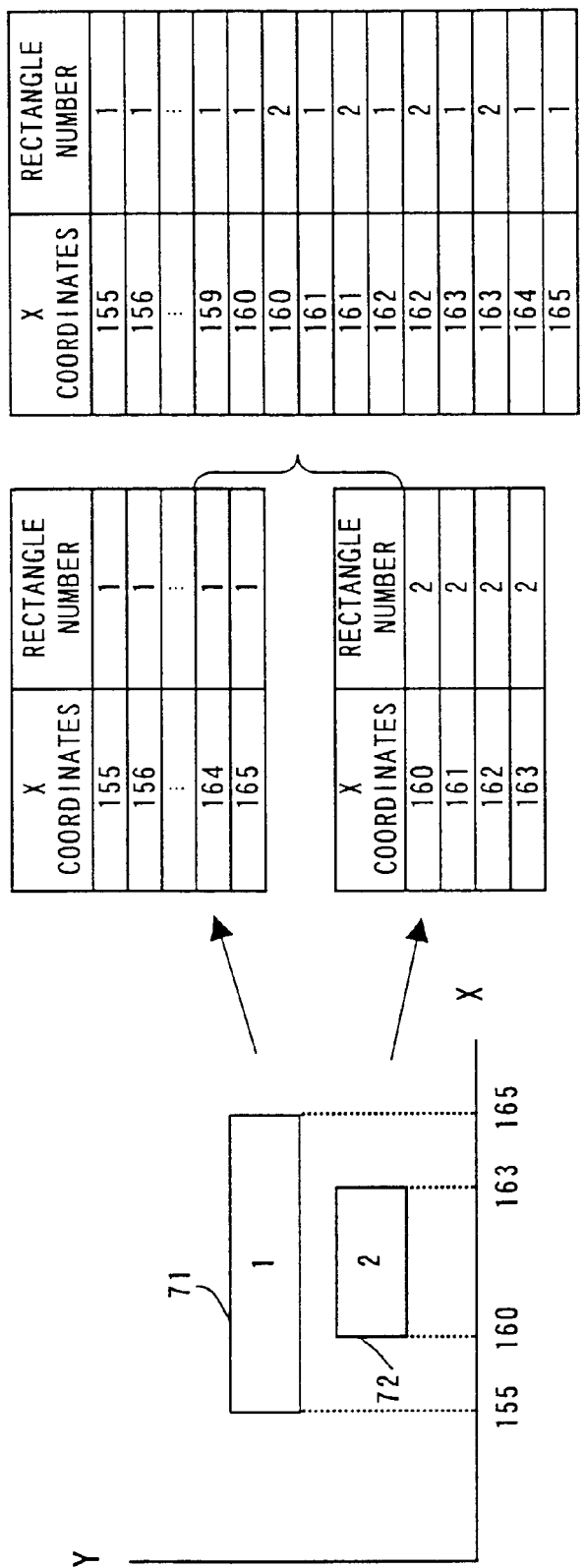
FIG. 13 shows the method of storing the information about rectangles within or overlapping the target rectangle according to an embodiment of the present invention.

FIG. 13 shows the method of storing information about rectangles overlapping the search range around a target rectangle according to an embodiment of the present invention.

In FIG. 13A, it is assumed that enclosing rectangles 71 and 72 having the rectangle numbers 1 and 2 have been extracted, the enclosing rectangle 71 is within the range of the X coordinates of 155 through 165, and the enclosing rectangle 72 is within the range of the X coordinate of 160 through 163. Therefore, as shown in FIG. 13B, the rectangle number 1 is entered for the position of the X coordinates of 155 through 165 for the enclosing rectangle 71, and the rectangle number 2 is entered for the position of the X coordinates of 160 through 163 for the enclosing rectangle 72.

Next, as shown in FIG. 13C, the number of rectangles is obtained for each of the coordinates by rearranging the extracted rectangle numbers 1 and 2 in order of the X coordinates of 155 through 165, and by counting the rectangle numbers having an equal X coordinate.

Practically, the following processes i) through v) are performed.

i) The total width of all rectangles is obtained, and the data structure is prepared with the rectangle numbers and coordinate information for the total width.

ii) The coordinates of the rectangle and the rectangle number are set in the data of the prepared data structure.

iii) The data of the data structure is sorted by the coordinates.

iv) The coordinates of the data is sequentially checked, and the number of equal coordinates is counted for each of the coordinates as the number of rectangles for the corresponding coordinate. The storage area is reserved to store the rectangle numbers for the rectangles of the number for the corresponding coordinate. The sorted data structure is scanned from the beginning, equal coordinates are counted, the count is determined and stored each time the value of a coordinate changes.

v) The rectangle numbers having equal coordinates in the sorted data structure are stored in the reserved area. The sorted data structure is scanned from the beginning, and the rectangle numbers having equal coordinates are set in the storage area.

Next, a unicolor group extracting process is performed (step S9).

The unicolor group extracting process is performed to group patterns of similar colors among patterns having different labels. When a title is extracted in this process, the characters forming the title should be of the same color.

First, when the color of one rectangle (the color of a rectangle refers to the color of a pattern enclosed by the rectangle) is similar to the colors of the surrounding rectangles, these rectangles can be put in the same group.

However, when the color of a rectangle gradually changes in this method, rectangles of actually different colors can be put in the same group.

Therefore, in addition to comparing the color of one rectangle with the colors of the surrounding rectangles, the rectangle is also compared with the color of the group to which it belongs. Only if the color of a rectangle to be added to the group is not so different from the color of the group, the rectangle can be added to the group. The color of the group can be referred to as an average value of the colors of the rectangles belonging to the group.

FIG. 14 shows the method of generating a unicolor group according to an embodiment of the present invention.

In FIG. 14A, it is assumed that enclosing rectangles 81 through 83 have been generated, and the color of the pattern in the enclosing rectangles 81 through 83 has gradually changed. Also assume that the pattern in the enclosing rectangles 81 and 82 is a character, but the pattern in the enclosing rectangle 83 is a part of a scene.

When the enclosing rectangles 81 through 83 are grouped, a search area 84 is first set around the enclosing rectangle 81, and the enclosing rectangle 82 overlapping the search area 84 is extracted. When the enclosing rectangle 82 is extracted, the distance dist in the color space is obtained between the color of the pattern in the enclosing rectangle 81 and the color of the pattern in the enclosing rectangle 82. When the distance dist is equal to or smaller than a predetermined value, the enclosing rectangles 81 and 82 are classified into the same group 85 as shown in FIG. 14B.

Then, a search area 86 is set around the enclosing rectangle 82, and the enclosing rectangle 83 overlapping the search area 86 is extracted. When the enclosing rectangle 83 is extracted, the distance dist in the color space is obtained between the color of the pattern in the enclosing rectangle 82 and the color of the pattern in the enclosing rectangle 83, and it is determined whether or not the distance dist is equal to or smaller than a predetermined value.

If the distance dist is equal to or smaller than a predetermined value, and the enclosing rectangles 82 and 83 are classified into the same group 86, then the pattern of a scene exists in a character group.

Then, an average value of the color of the pattern in the enclosing rectangle 81 and the color of the pattern in the enclosing rectangle 82 is obtained as the color of the group 85, and the distance dist 2 in the color space is obtained between the color of the group 85 and the color of the pattern in the enclosing rectangle 83. When the distance dist 2 is equal to or smaller than a predetermined value, the enclosing rectangle 83 is classified into the same group 85 as the enclosing rectangle 82.

When the color of the pattern in the enclosing rectangles 81 through 83 gradually changes, the distance in the color space between the color of the pattern in the enclosing rectangle 81 and the color of the pattern in the enclosing rectangle 83 becomes longer even if the distance dist in the color space between the color of the pattern in the enclosing rectangle 82 and the color of the pattern in the enclosing rectangle 83 is short.

As a result, the distance dist 2 becomes longer than the distance dist, and it is possibly determined that the color of the pattern in the enclosing rectangle 83 is different from the color of the group 85. Therefore, the enclosing rectangle 83 can be prevented from being classified into the group 85.

Practically, the distance in the RGB space between the color ($Rc, Gc, Bc$) of one target rectangle and the color ($Ri, Gi, Bi$) of one rectangle i in a set of rectangles around the target rectangle is defined as follows.

$$\text{dist} = |Rc-Ri| + |Gc-Gi| + |Bc-Bi|$$

Each luminance difference of the RGB obtained from the color ($Rc, Gc, Bc$) of the target rectangle and the resolution is defined as delta_r, delta_g, delta_b. The color of the group is an average color of the patterns in the rectangles belonging to the group. First, the color of a rectangle is the same as the color of the group.

At this time, the distance dist 2 of the color difference between the color ($Rg, Gg, Bg$) of the group and the color ($Rig, Gig, Big$) of the group to which the surrounding rectangle i belongs is defined as follows.

$$\text{dist 2} = |Rg-Rig| + |Gg-Gig| + |Bg-Big|$$

When the target rectangle ($Rc, Gc, Bc$) and a rectangle i ($Ri, Gi, Bi$) which is one of a set of surrounding rectangles satisfy the following conditions, it is determined that these two rectangles belong to the group of the target rectangle, and the surrounding rectangle i is stored in the group. The rectangle number of the rectangle newly added to the group is stored in a newly added rectangle area.

(dist<TH_RGB or (|Rc-Ri|<delta_r and

|Gc-Gi|<delta_g and

|Bc-Bi|<delta_b)

and dist 2<thr_rgb where thr_rgb =(min (luminance difference obtained from $Rg$, luminance difference obtained from Rig) +(min (luminance difference obtained from $Gg$, luminance difference obtained from Gig)+ (min (luminance difference obtained from $Bg$, luminance difference obtained from Big))/2

In addition, for example, TH_RGB=20.

The number of the leading rectangle in the newly added rectangle area is retrieved, and the computation is performed on the rectangles surrounding the retrieved rectangle as a new target rectangle, and the above described procedure is repeated to obtain rectangles belonging to the group. The procedure is repeated until all rectangles newly added to the group have been processed. The data structure according to the information about an extracted group is described as follows.

Number of rectangles in a group: num

Rectangle number of a group: child

Number of rectangles after overlapping rectangle integration: overlap_num

Rectangle information after overlapping rectangle integration: overlap (data type is rectangle information lbtbl type)

Direction code of a character string in a group: orient

Number of character string in a group: gyou_num

Character string information in a group: gyou (data type is rectangle information lbtbl type)

Next, an intra-group average character line thickness extracting process is performed (step S11).

In this intra-group average character line thickness extracting process, an outline tracing process is performed on a pattern of a label image corresponding to an enclosing rectangle in a group to obtain an outline length. That is, in the range of an enclosing rectangle belonging to the group, the label number of the enclosing rectangle is checked, and the outline tracing process is performed on the label image. When the length of the outline is extracted, the length of the outline is set as an attribute of the outline length of the rectangle. Then, the area of the pattern in the rectangle is divided by the outline length to obtain an average thickness of the character line, and the result is entered in the rectangle information as an attribute of the rectangle.

FIG. 15 shows the method of computing the thickness of a character line according to an embodiment of the present invention.

In FIG. 15A, assuming that, for example, a pattern of 'フ' has been extracted, the area S of the pattern of 'フ' is computed.

Then, as shown in FIG. 15B, the outline of the pattern of 'フ' is extracted, and the outline length L is computed. Then, the area S of the pattern of 'フ' is divided by the outline length L to obtain an average thickness W of the pattern of 'フ'

As an outline length obtaining process, there is a method of clockwise checking the label values of eight picture elements around the picture elements forming the outline, and extracting, as an outline, picture elements whose label values match the label values of the picture elements forming the outline.

However, in this method, the process can be quickly performed only on a character pattern, but it takes a long time to process a complicated pattern extracted from a background because, in the outline tracing method, it is necessary to check one picture element outside the outline of a label image, and check already scanned picture elements many times by searching from one outline point the next outline point.

According to the present embodiment, the edge of one label image is checked, the inside of the enclosing rectangle of the label image is raster-scanned, and the number of points at which a label value changes from a value other than a specific value to the specific value is counted. Thus, during one raster scanning process for an enclosing rectangle of a label image, the outline length of the pattern of the label image can be obtained, and the time taken for the outline length obtaining process can be approximately five times shorter than in the conventional method.

Figure 16:
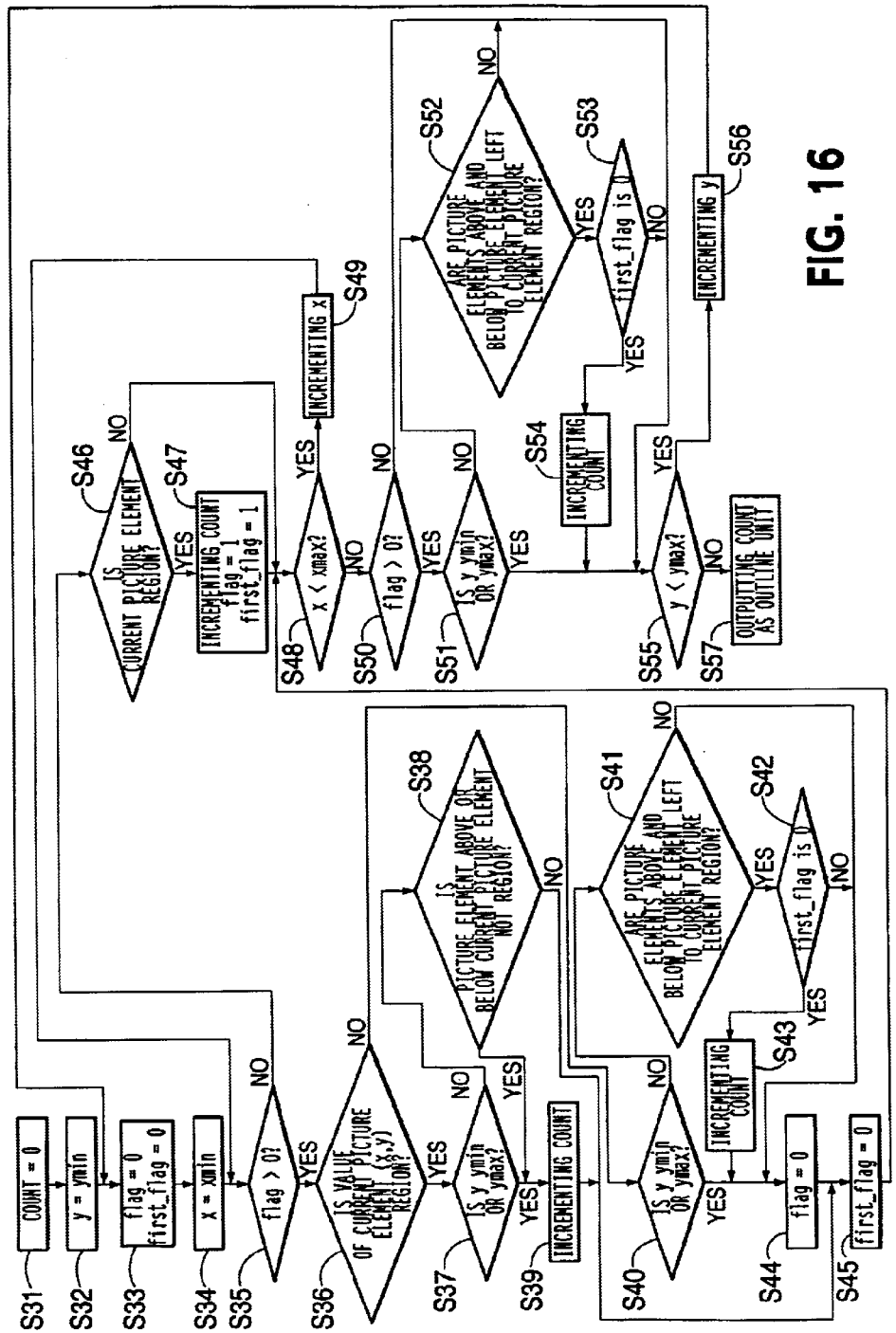
FIG. 16 is a flowchart of the outline length obtaining process according to an embodiment of the present invention.

FIG. 16 is a flowchart showing the outline length obtaining process according to an embodiment of the present invention. Assume that the label value of the label image to be processed is defined as region, the coordinate of the enclosing rectangle of the pattern having the label value as (xmin, ymin)–(xmax, ymax), the outline length as count, the flag indicating whether or not the picture elements of the label image refer to an edge as flag (set to 1 when one picture element before is an picture element having the value of region), and the flag for use in detecting a pattern whose thickness in the vertical direction is one picture element as first_flag (set to 1 when the thickness is 1 picture element in the horizontal direction).

First, in FIG. 16, the initialization is performed (steps S31 through S34), and count=0, y ymin, flag=0, first_flag=0, x=xmin are set.

Then, it is determined whether or not flag>0 (step S35). If flag>0 is not true, it is determined whether or not the label value of the current picture element is region (step S46). If the label value of the current picture element is not region, then it is determined whether or not x<xmax is true (step S48). If x<xmax is true, then x is incremented and control is returned to step S35.

On the other hand, if the label value of the current picture element is region in step S46, then the current picture element forms part of the outline, count is incremented, and flag=1 and first flag=1 are set, thereby transferring control to step S48 (step S47).

On the other hand, if flag>0 is true in step S35, then it is determined whether or not the label value of the current picture element (x, y) is region (step S36). If the label value of the current picture element is region, then it is determined whether or not y is ymin or ymax (step S37). If y is ymin or ymax, then count is incremented (step S39).

If y is not ymin or ymax in step S37, then it is determined whether or not the label value of the picture element above or below the current picture element is region (step S38). Only if the label value of the picture element above or below the current picture element is not region, count is incremented (step S39).

On the other hand, if the label value of the current picture element is not region in step S36, it is determined whether or not y is ymin or ymax (step S40). If y is ymin or y max, then flag=0 is set (step S44).

When y is not ymin or ymax in step S40, count is incremented (step S43) only if the label values of the picture elements above and below the leftmost picture element of the current picture elements is region (step S41), and first_flag is 0 (step S42). Otherwise, control is passed to step S44.

Next, first flat=0 is set (step S45), and the above described process is repeated until x reaches xmax with x incremented by 1 each time.

When x reaches xmax, it is determined whether or not flag>0 is true (step S50). If flag>0 is not true, it is determined whether or not y<ymax (step S55). If y<ymax, then y is incremented, and control is returned to step S33.

On the other hand, if flag>0 in step S50, then it is determined whether or not y is ymin or ymax (step S51). If y is ymin or ymax, then control is passed to step S55.

When y is not ymin or ymax in step S51, count is incremented (step S54) only if the label values of the picture elements above and below the leftmost picture element of the current picture elements is region (step S52), and first_flag is 0 (step S53). Otherwise, control is passed to step S55.

The above described processes are repeated until y reaches ymax with the value of y incremented by 1 each time. When y reaches ymax, count is output as the outline length of the label image whose label value is region.

According to the above described embodiment, the outline length is obtained by raster-scanning an enclosing rectangle in the horizontal direction (x direction). It is obvious that the outline can also be obtained by raster-scanning an enclosing rectangle in the vertical direction (y direction).

Figure 17:
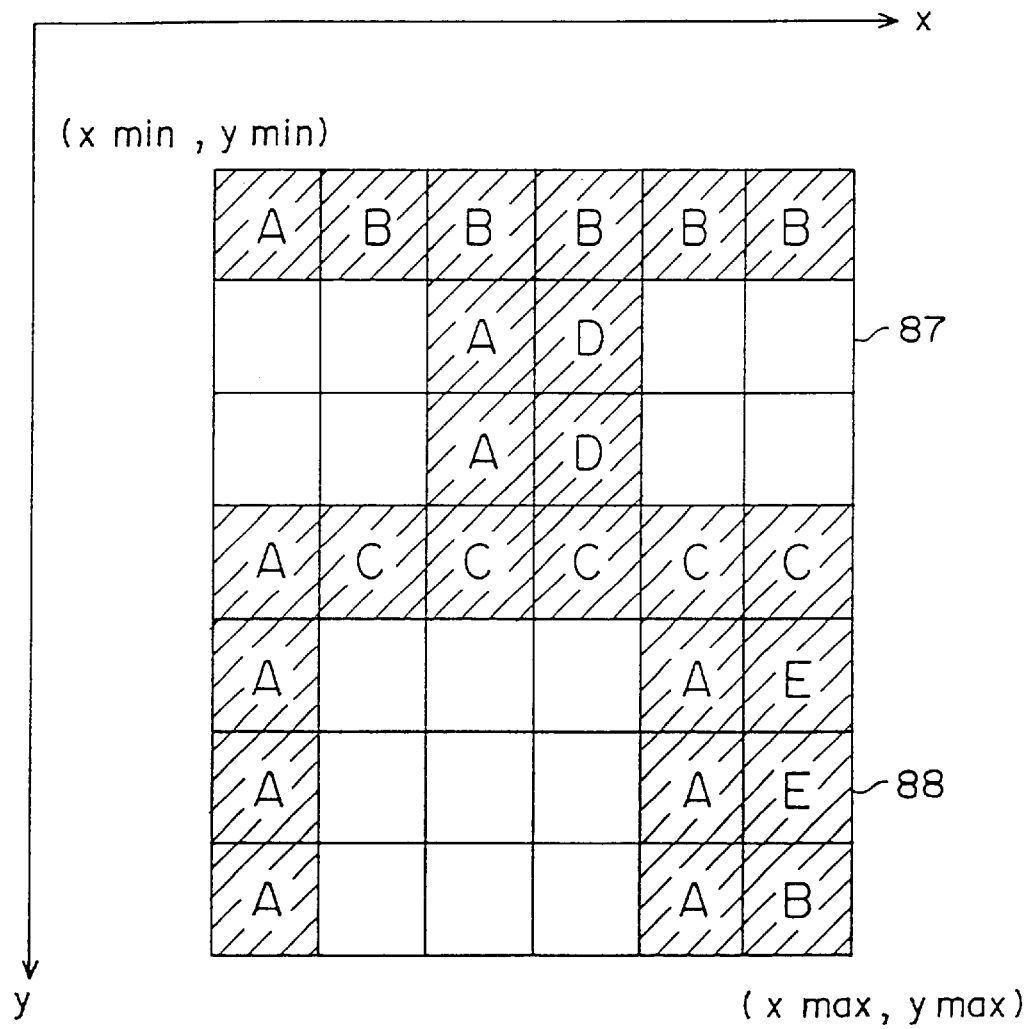
FIG. 17 shows a practical example of a pattern for explanation of the method of obtaining an outline length according to an embodiment of the present invention.

FIG. 17 shows a practical example of a pattern used in the outline length obtaining method according to an embodiment of the present invention.

In FIG. 17, assume that a label image 88 (indicated by diagonal lines) having the same label value is extracted, and an enclosing rectangle 87 of the label image 88 is generated. If the coordinates of the enclosing rectangle is represented by (xmin, ymin)–(xmax, ymax), then the range of the enclosing rectangle is scanned in line units in the x direction from the picture element at the coordinates (xmin, ymin).

The number of picture elements of A is counted in the process from step S46 to step S47 shown in FIG. 16. The number of picture elements of B is counted in the process from step S37 to step S39 shown in FIG. 16. The number of picture elements of C is counted in the process from step S38 to step S39 shown in FIG. 16. The number of picture elements of D is counted in the process from step S42 to step S43 shown in FIG. 16. The number of picture elements of E is counted in the process from step S53 to step S54 shown in FIG. 16.

As a result, the outline of the label image 88 can be obtained by once scanning the range of the enclosing rectangle 87, thereby quickly performing the outline length obtaining process.

Next, a re-grouping process is performed based on the thickness of a character line (step S11).

In the re-grouping process, enclosing rectangles in a group are grouped based on the average thickness of character lines of the enclosing rectangles to generate new group information. That is, the processes in steps S7 through S9 shown in FIG. 4 are repeated on the enclosing rectangles in the group. When the grouping process is performed in step S9, not only the color information used in step S9, but also the estimated thickness of character lines (=20×area of pattern in rectangle/outline length of pattern) is used.

Figure 18:
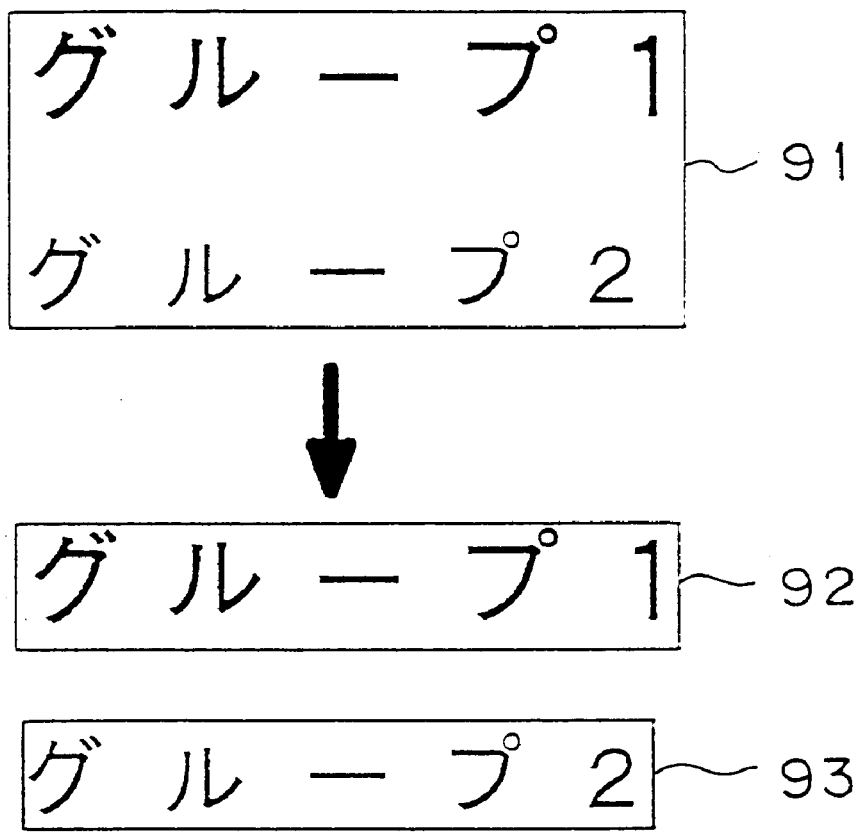
FIG. 18 shows the regrouping process performed based on the thickness of a character line according to an embodiment of the present invention.

FIG. 18 shows the re-grouping process preformed based on the thickness of character lines according to an embodiment of the present invention. In FIG. 18, the character string 'group 1' and the character string 'group 2' are represented in the same color, and arranged close to each other. Therefore, it is assumed that the character string 'group 1' and the character string 'group 2' are grouped into the same group 91.

The thickness of the characters contained in the character string 'group 1' and the thickness of the characters contained in the character string 'group 2' are computed, and the characters in different thicknesses are classified into different groups. As a result, the character string 'group 1' is grouped into a group 92, and the character string 'group 2' is grouped into a group 93.

In this process, even if a character pattern and a background pattern of the same color as the character pattern are arranged close to each other, they can be grouped into different groups. In addition, even if a group contains only character patterns, the characters in different fonts and sizes can be grouped into different groups.

Practically, in the two enclosing rectangles, the ratio thick rate of the thickness of the character line is obtained as follows from the estimated thickness thick 1 of the character line of the first enclosing rectangle and the estimated thickness thick 2 of the character line of the second enclosing rectangle.

$$\text{thick\_rate} = \max(\text{thick } 1, \text{thick } 2) / \min(\text{thick } 1, \text{thick } 2)$$

When the following conditions are satisfied, the two enclosing rectangles are stored as belonging to the same group.

$$\text{thick\_rate} < \text{TH\_THICK\_RATE}$$

and $$(\text{dist} < \text{TH\_RGB}$$

or $$(|RC-Ri| < \text{delta\_r}$$

and $$|Gc-Gi| < \text{delta\_g}$$

and $$|Bc-Bi| < \text{delta\_b}))$$

However, TH_THICK_RATE is, for example, 2.5.

This process is performed on all enclosing rectangles in the group, and a new grouping process is performed in the group. At this time, a group containing only one rectangle is assumed not to form a title, and is deleted.

As another example of a re-grouping process performed based on the thickness of a character line, the distribution of the frequency of the thickness of character lines in a group is generated, and the thickness of the character line is clustered to generate a plurality of clusters of the thickness of character lines. A method of generating a plurality of clusters can be realized by, for example, dividing the thickness of character lines into a plurality of clusters at the valley of the frequency distribution of the thickness of character lines, applying a hierarchical clustering, etc.

Practically, assume that, in the two enclosing rectangles, the estimated thickness of the character line of the first enclosing rectangle is thick 1, the estimated thickness of the character line of the second enclosing rectangle is thick 2, and the two enclosing rectangles are grouped into the same group when the following conditions are satisfied.

thick 1 and thick 2 belong to the clusters of the same thickness of character lines and $$(\text{dist} < \text{TH\_RGB}$$

or $$|Rc-Ri| < \text{delta\_r}$$

and $$|Gc-Gi| < \text{delta\_g}$$

and $$|Bc-Bi| < \text{delta\_b}))$$

This process is performed on all rectangles in the original group, and a new grouping process is performed in the group.

Next, a large rectangle deleting process is performed in a group (step S12).

In this large rectangle deleting process in a group, an average rectangle size in a group is obtained. Based on the size, a very large rectangle is deleted as noise of a scene, etc.

Figure 19:
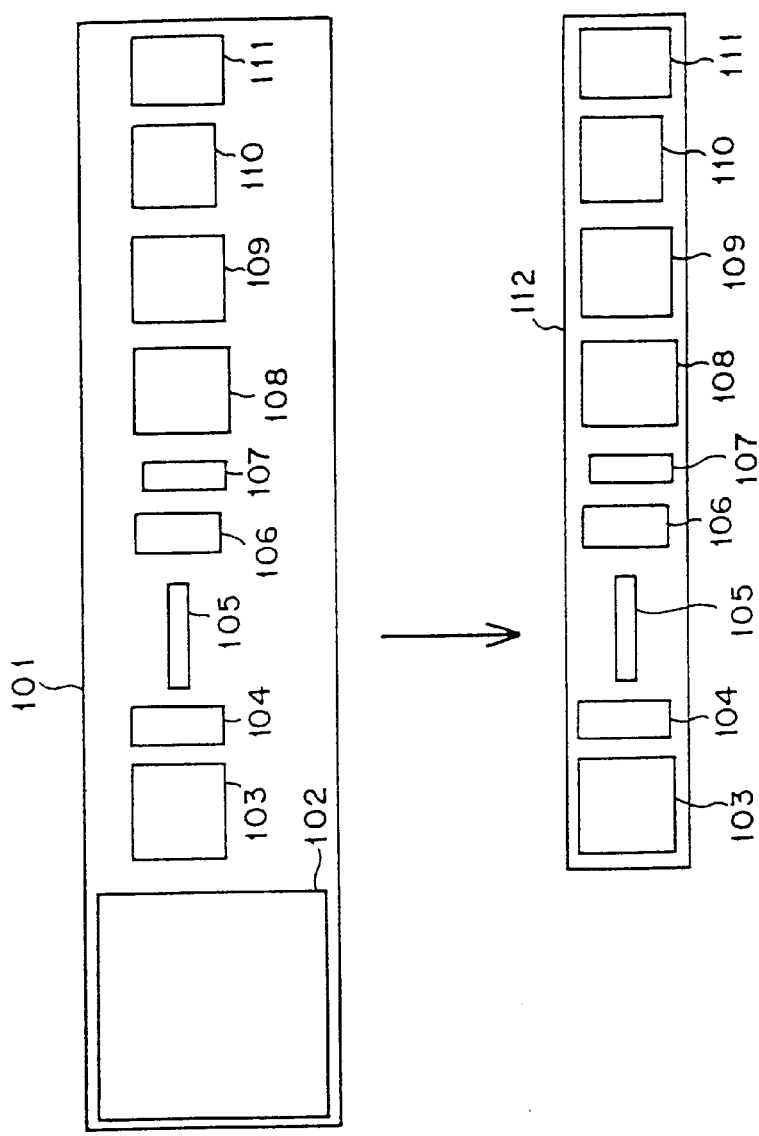
FIG. 19 shows the process of deleting a large rectangle in a group according to an embodiment of the present invention.

FIG. 19 shows the large rectangle deleting process in a group according to an embodiment of the present invention.

In FIG. 19A, assuming that enclosing rectangles 102 through 111 are grouped into a group 101, the size of each of the enclosing rectangles 102 through 111 in the group 101 is obtained. Also assuming that the size of the enclosing rectangle 102 is quite different from the size of other enclosing rectangles 103 through 111, the enclosing rectangle 102 is deleted from the group 101, and a group 112 containing the enclosing rectangles 103 through 111 is generated as shown in FIG. 19B.

Practically, the following processes a) through d) are performed.

a) A histogram of the heights of enclosing rectangles in a group is generated, and the rectangle height freq_ height indicating the maximum frequency is obtained in the following method.
  i) A convolution operation (shift sum) is performed using a shading window for the histogram so that a shading effect can be applied to the histogram. A practical shading window comprises, for example, five picture elements of 11111.
  ii) The minimum height (practically, 23 dots in 100 dpi) is predetermined, and the rectangle height freq_ height indicating the maximum frequency equal to or larger than the minimum height is obtained.

b) When the rectangle height freq_height indicating the maximum frequency is smaller than the minimum height (practically, 23 dots in 100 dpi), the minimum height is set as the rectangle height freq_height indicating the maximum frequency.

c) The threshold th_large indicating a large rectangle is set as, for example, th_large=freq_height*10.

d) Enclosing rectangles having length and width equal to or larger than th_large in a group are deleted as noise from the group.

Next, an intra-group overlapping rectangle integrating process is performed (step S13).

In the intra-group overlapping rectangle integrating process, a rectangle enclosing rectangles overlapping each other in a group is newly generated and newly entered in group information.

That is, enclosing rectangles overlapping each other, slightly or partially, are integrated, and an enclosing rectangle is generated.

Figure 20:
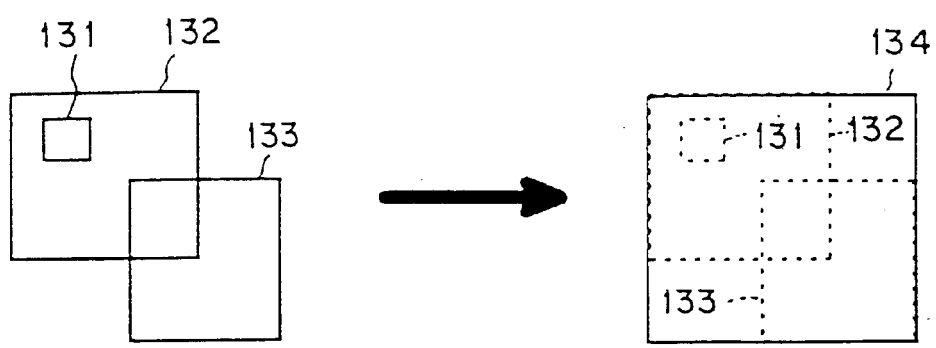
FIG. 20 shows the process of integrating an overlapping rectangle in a group according to an embodiment of the present invention.

FIG. 20 shows the intra-group overlapping rectangle integrating process according to an embodiment of the present invention.

In FIG. 20A, an enclosing rectangle 131 overlaps an enclosing rectangle 132, and the enclosing rectangle 132 partially overlaps an enclosing rectangle 133. In this case, the enclosing rectangles 131 through 133 are integrated to generate an enclosing rectangle 134.

In this process, when one character is formed by a plurality of separate strokes, for example, 7, '7', etc., each of these characters formed by a plurality of separate strokes can be collectively processed, and the subsequent process can be efficiently performed.

In addition, even when background noise exists in a character area, characters can be prevented from being integrated into the background noise by performing the overlapping rectangle integrating process for patterns belonging to the same group, thereby improving the precision in character extraction.

Next, an inter-group character string extracting process is performed (step S14).

In the intra-group character string extracting process, the direction of a character string is predicted in a group, and the character string is extracted in the direction. The information about the direction and coordinates of the extracted character string is stored for each group. When the process is used in extracting a title, each character forming part of a title should be arranged in a vertical or horizontal line.

Figure 21:
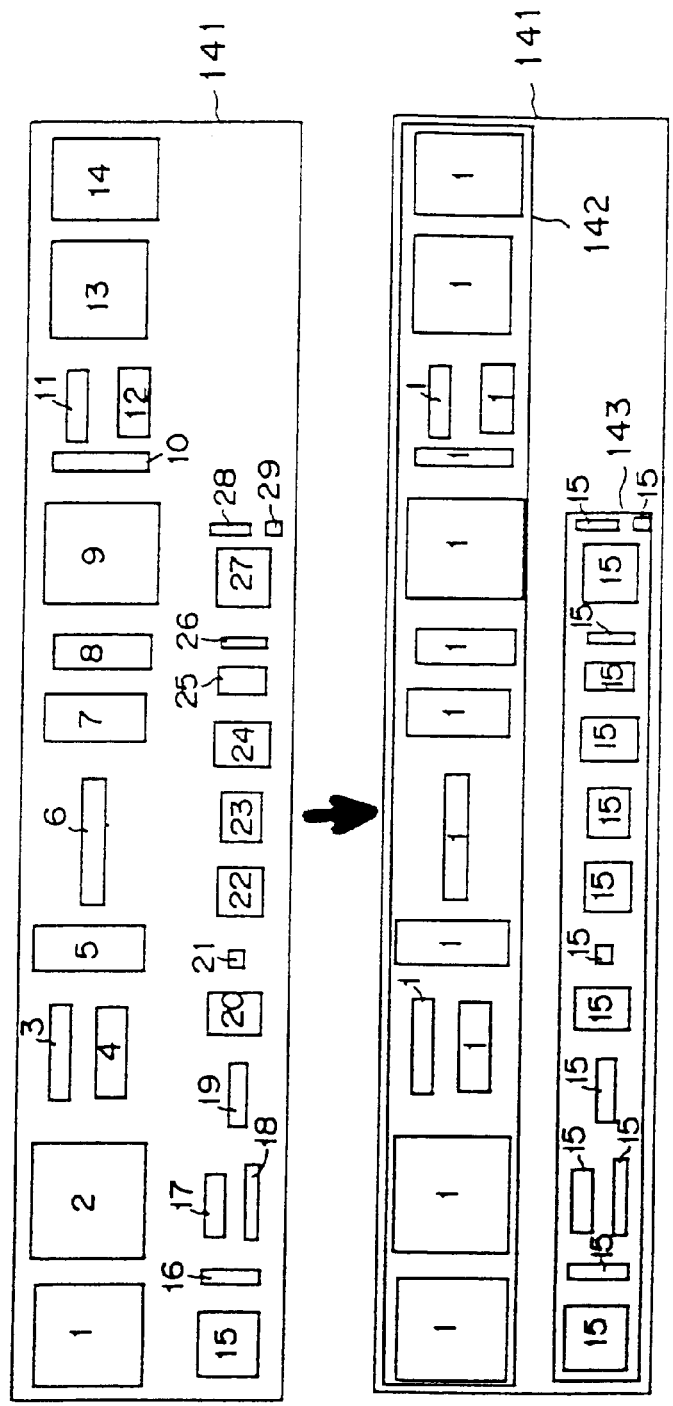
FIG. 21 shows the process of extracting a character string in a group according to an embodiment of the present invention.

FIG. 21 shows the intra-group character string extracting process according to an embodiment of the present invention.

In FIG. 21A, assuming that the enclosing rectangles having the rectangle numbers 1 through 29 are grouped into a group 141, a search is made toward right as to whether or not there is an enclosing rectangle adjacent to the enclosing rectangle having the rectangle number 1. If an enclosing rectangle having the rectangle 2 has been detected as an enclosing rectangle adjacent to the enclosing rectangle having the rectangle number 1, then the rectangle number 1 is propagated to the detected enclosing rectangle, and the rectangle number 2 of the detected enclosing rectangle is changed into the rectangle number 1. Similarly, a search is made as to whether or not there is an adjacent enclosing rectangle toward right. If any adjacent enclosing rectangle is detected, then the rectangle number of the left adjacent enclosing rectangle is propagated to the right enclosing rectangle.

If there are no adjacent enclosing rectangles toward right from the enclosing rectangle having the rectangle number 1, then a search is made toward right from the enclosing rectangle having the rectangle 15 as to whether or not there is an enclosing rectangle adjacent to the enclosing rectangle having the rectangle number 15. If an enclosing rectangle adjacent to the enclosing rectangle having the rectangle number 15 is detected, then the rectangle number 15 is propagated to the detected enclosing rectangle.

In the above described process, the rectangle number 1 is assigned to the enclosing rectangle right adjacent to the enclosing rectangle having the rectangle number 1, and the rectangle number 15 is assigned to the enclosing rectangle right adjacent to the enclosing rectangle having the rectangle number 15 as shown in FIG. 21B. When the rectangle number propagating process is completed, an enclosing rectangle 142 for enclosing the enclosing rectangles assigned the rectangle numbers 1 is generated, and an enclosing rectangle 143 for enclosing the enclosing rectangles assigned the rectangle numbers 15 is generated.

Practically, the following processes a) through e) are performed.

a) The direction of a character string is predicted from the coordinates of the enclosing rectangles in a group.

b) The inward and outward adjacency of an enclosing rectangle closest above, below, to the left or right of a target rectangle is obtained.

c) For a horizontal character string, the rectangle number of the rectangle having no adjacency from the left is set as a starting rectangle number, and the starting rectangle number is propagated to the right rectangle until no right rectangles can be detected. The similar process is performed for a vertical character string.

d) A rectangle having no adjacency from the left, and having adjacency to the left obtains the rectangle number from the left, propagates the number to the right. This process is repeated until there is no adjacency detected any more.

e) After performing the above described processes on all rectangles in the group, rectangles assigned the same rectangle numbers are obtained, and the enclosing rectangle of the rectangles assigned the same rectangle numbers is extracted as a character string rectangle.

Then, an intra-character-string separate character integrating process is performed (step S15).

In this intra-character-string separate character integrating process, a process of integrting a horizontally written characters separated into higher and lower portions (integrating a vertically written characters separated into left and right portions) is applied to a character string rectangle, and the rectangle is replaced with an enclosing rectangle obtained by integrating the separated rectangles. In this example, the rectangles in the extracted character string are integrated in the direction vertical to the character string. For a horizontally written character string, for example, the rectangles respectively enclosing the upper and lower strokes of a character 'こ' are integrated into one rectangle. For a vertically written character string, for example, the rectangles respectively enclosing the right and left strokes of a character 'い' are integrated into one rectangle.

Figure 22:
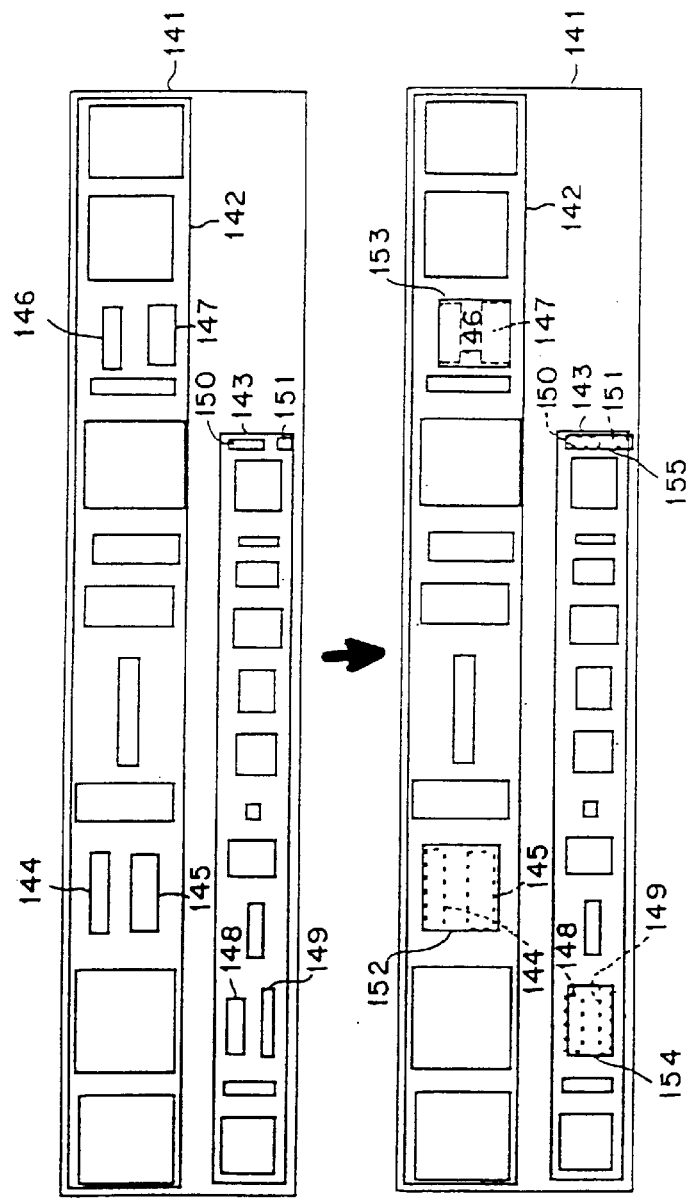
FIG. 22 shows the process of integrating separate characters in a character string according to an embodiment of the present invention.

FIG. 22 shows the intra-character-string separate character integrating process according to an embodiment of the present invention.

In FIG. 22A, enclosing rectangles 142 and 143 enclosing horizontally adjacent enclosing rectangles in the group 141 are generated. In the enclosing rectangle 142, vertically adjacent enclosing rectangles 144 and 145 and vertically adjacent enclosing rectangles 146 and 147 exist. In the enclosing rectangle 143, vertically adjacent enclosing rectangles 148 and 149 and vertically adjacent enclosing rectangles 150 and 151 exist.

In this case, as shown in FIG. 22B, an enclosing rectangle 152 enclosing the enclosing rectangles 144 and 145 is generated to integrate the enclosing rectangles 144 and 145, an enclosing rectangle 153 enclosing the enclosing rectangles 146 and 147 is generated to integrate the enclosing rectangles 146 and 147, an enclosing rectangle 154 enclosing the enclosing rectangles 148 and 149 is generated to integrate the enclosing rectangles 148 and 149, and an enclosing rectangle 155 enclosing the enclosing rectangles 150 and 151 is generated to integrate the enclosing rectangles 150 and 151.

Practically, the following processes a) through c) are performed. In the following example, a horizontally written character string is described. The similar processes can be performed on a vertically written character string.

a) Rectangles in a character string are sorted in an ascending order of x coordinates.

b) Assuming that the first rectangle is a current rectangle, a subsequent rectangle having an x coordinate overlapping the range of the x coordinate of the current rectangle is integrated into the current rectangle, and the range of the x coordinate of the current rectangle is amended according to the integration result. This process is repeated until no rectangles to be integrated are left any more. When there are no rectangles to be integrated any more, the remaining rectangle is stored as a rectangle after the integrating process.

c) When there are no rectangles to be integrated any more, the processes of b) and c) are repeated using the next rectangle as a new current rectangle.

Next, a re-grouping process is performed based on the size of a character string in a group (step S16).

In the re-grouping process based on the size of a character string in a group, the size of a character string in the direction vertical to the character string is checked in the information about a character string in a group, the re-grouping process is performed based on the size, and the result is stored in new group information.

Thus, in a unicolor area, character string in different character sizes can be grouped into different groups, and noise and character strings can be put in different groups.

When the process is performed in extracting a title, the characters forming the title should be in the same size.

Figure 23:
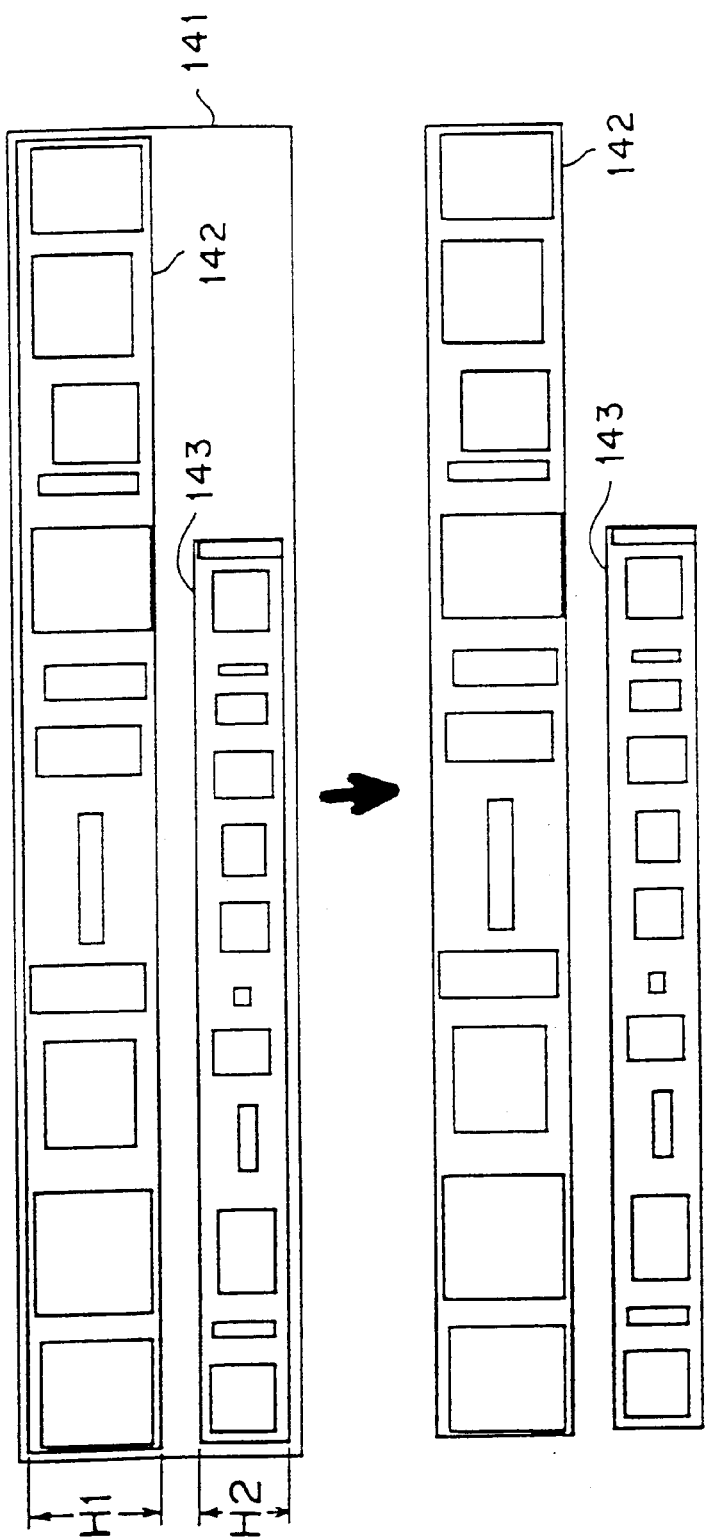
FIG. 23 shows the regrouping process performed based on the character string size in a group according to an embodiment of the present invention.

FIG. 23 shows the re-grouping process performed based on the size of a character string in a group according to an embodiment of the present invention.

In FIG. 23A, assuming that the enclosing rectangles 142 and 143 enclosing the rectangles horizontally adjacent to each other are generated, the height H1 of the enclosing rectangle 142 and the height H2 of the enclosing rectangle 143 are computed. If the difference between the height H1 of the enclosing rectangle 142 and the height H2 of the enclosing rectangle 143 is larger than a threshold, then the enclosing rectangles 142 and 143 are put in different groups.

Practically, when the following conditions are satisfies, these two character string rectangles are assumed to belong to the same group, and are assigned the same group numbers.

The difference in height between two character string rectangles (when the character strings are horizontally written) (the difference in width if character strings are vertically written) is smaller than the threshold;

and (two character string rectangles are overlapping;

or the distance between two character string rectangles is smaller than a threshold).

These processes are performed on all groups.

Next, when character strings have the same group number in a group, they are put in a new group. In this process, the character strings which are put in the same group in step S9 shown in FIG. 3 and contain characters in different sizes are put in different groups.

The process of removing a large rectangle in a group is then performed (step S17).

In the process of removing a large rectangle in a group, an average rectangle size in a group is obtained to remove noise, and a very large rectangle is removed based on the rectangle size. That is, the process in step S12 shown in FIG. 4 is performed again on the group which has changed in the above described processes, and the noise in the group is removed.

Next, a group integrating process is performed (step S18).

In this group integrating process, unicolor groups close to each other in the horizontal and vertical directions are integrated. That is, if two groups are almost the same in color, close to each other, and enclosing rectangles in the group are arranged, then the two enclosing rectangles are integrated as one group. This process is performed to stably determine the character string level of a group based on the arrangement of the character rectangles.

Figure 24:
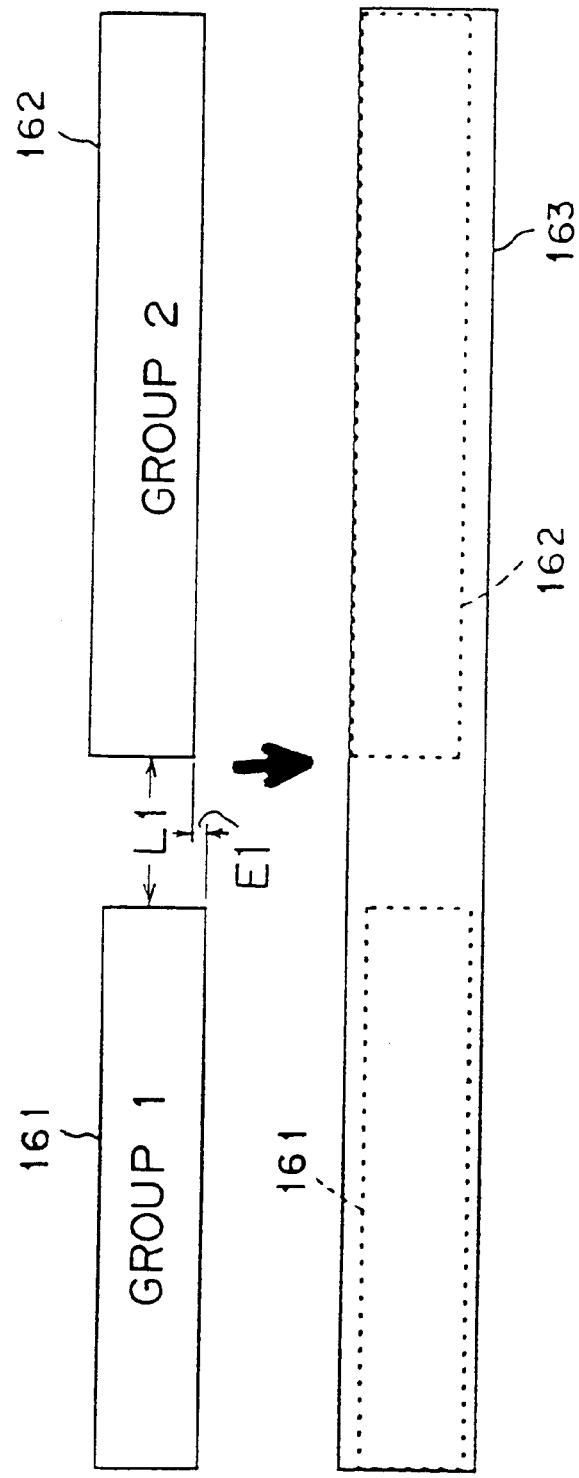
FIG. 24 shows the process of integrating groups according to an embodiment of the present invention.

FIG. 24 shows a group integrating process according to an embodiment of the present invention.

In FIG. 24A, assuming that an enclosing rectangle 161 of the group 1 is horizontally adjacent to an enclosing rectangle 162 of the group 2, the distance L1 between the enclosing rectangles 161 and 162, and the difference E1 between the coordinates of the lower ends of the enclosing rectangles 161 and 162 are obtained. If the distance L1 between the enclosing rectangles 161 and 162, and the difference El between the coordinates of the lower ends of the enclosing rectangles 161 and 162 are smaller than respective thresholds, and the difference between the representative color of the group 1 and the representative color of the group 2 is smaller than a predetermined threshold, then the enclosing rectangles 161 and 162 are integrated, and an enclosing rectangle 163 enclosing the enclosing rectangles 161 and 162 is generated.

Practically, enclosing rectangles in two groups, two character strings which is similar in color and coordinates of the lower end points, and can be integrated into one character string are put in one group. Assuming that the average colors of the two groups are (Rg1, Gg1, Bg1) and (Rg2, Gg2, Bg2), the average value of (Rg1+Rg2, Gg1+Gg2, Bg1+Bg2) of the RGB values is obtained. Then, a table is searched using the average value of the RGB value and the resolution as key information. The respective luminance differences (delta_r, delta_g, delta_b) of the RGB obtained from the table are defined as thresholds of luminance differences when a unicolor is determined. At this time, the integration conditions are as follows.

$|Rg1-Rg2|<$delta_r and $|Gg1-Gg2|<$delta_g and $|Bg1-Bg2|<$delta_b and when character strings are horizontally arranged, the distance in horizontal direction is smaller than a fixed threshold (when character strings are vertically arranged, the distance in vertical direction is smaller than a fixed threshold and when character strings are horizontally arranged, the difference in coordinates at the lower end points between the enclosing rectangles of two groups is smaller than a fixed threshold (when character strings are vertically arranged, the differences in coordinates at the leftmost and rightmost points between the enclosing rectangles of two groups are smaller than respective fixed thresholds)

The process is repeated until there are no more groups to be integrated.

When character strings are horizontally arranged, only the difference in coordinates at the lower end points is considered, but the difference in coordinates at the higher end points is not considered, because upper case characters and lower case characters may not be put in one group when a title is written in alphabet and the title contains upper and lower case characters with the coordinates at the lower end points aligned, but with the coordinates at the higher end points not aligned. For example, when a title contains a character string 'Windows', and the portions 'Wind' and 'ows' are extracted as separate groups, these groups cannot be integrated into one group if the difference in coordinates at the higher end points are considered.

Performed next is a probable character group extracting process based on the arrangements of rectangles (step S19).

In this probable character group extracting process based on the arrangements of rectangles, if the coordinates at either the higher end point or the lower end point are close to an adjacent rectangle in the rectangles in a group which satisfy a predetermined condition on size, shape, etc., then it is determined that the two rectangles are adjacent to each other, and a flag is set. In the rectangles satisfying the predetermined conditions in the group to be processed, the ratio of arranged rectangles is obtained. If the ratio of arranged rectangle is equal to or larger than a predetermined threshold, then a corresponding group is extracted as a character string.

Figure 25:
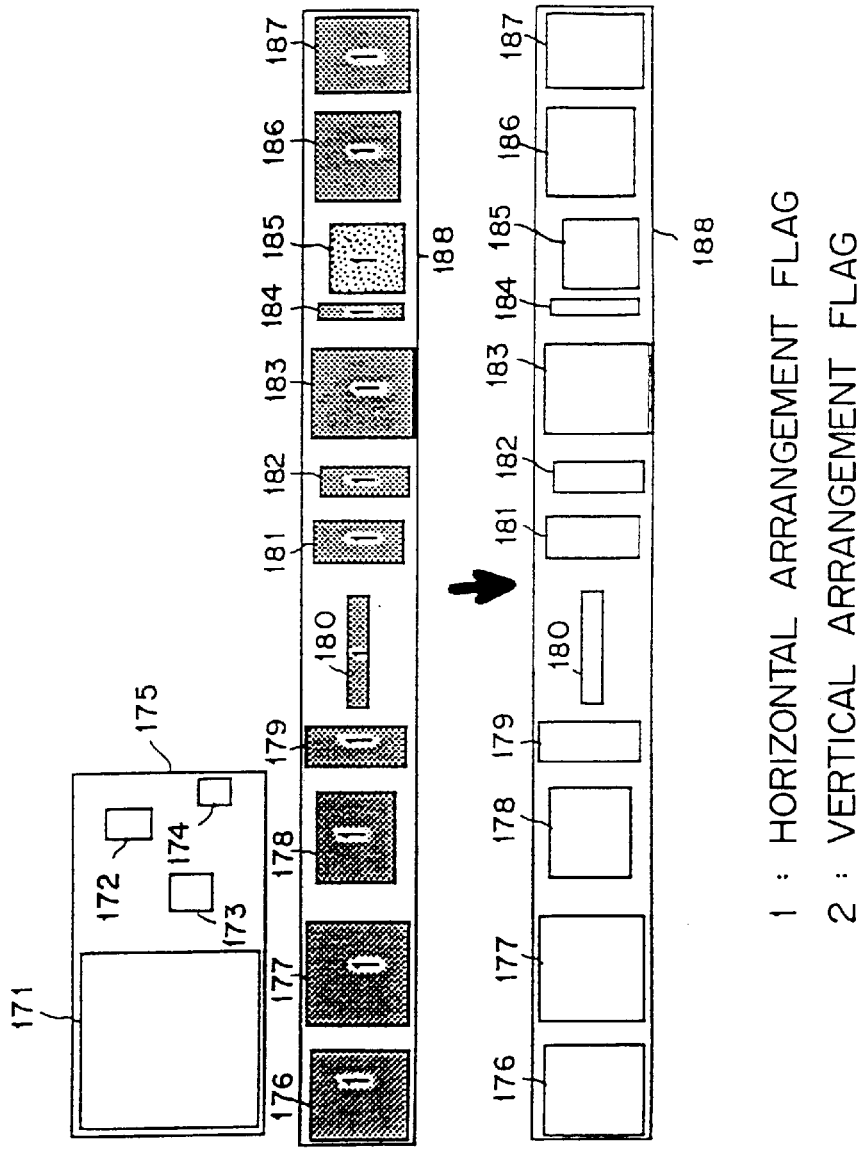
FIG. 25 shows the process of extracting a group of probable character strings based on the arrangement of rectangles according to an embodiment of the present invention.

FIG. 25 shows the probable character group extracting process based on the arrangements of rectangles according to an embodiment of the present invention.

In FIG. 25A, enclosing rectangles 171 through 174 and enclosing rectangles 176 through 187 are generated from an input image, and the enclosing rectangles 171 through 174 are put in one group. As a result, an enclosing rectangle 175 enclosing the rectangles 171 through 174 is generated. In addition, the enclosing rectangles 176 through 187 are put in one group. As a result, an enclosing rectangle 178 enclosing the rectangles 176 through 187 is generated.

Next, the size and relative position of an enclosing rectangle in each group are checked to assign a horizontal arrangement flag 1 to horizontally arranged enclosing rectangles and a vertical arrangement flag 2 to vertically arranged enclosing rectangles. As a result, since the enclosing rectangles 171 through 174 in the enclosing rectangle 175 are arranged at random, the enclosing rectangles 171 through 174 are not assigned the horizontal arrangement flag 1 or the vertical arrangement flag 2. On the other hand, since the enclosing rectangles 176 through 187 in the enclosing rectangle 188 are horizontally arranged in line, the enclosing rectangles 176 through 187 are assigned the horizontal arrangement flag 1.

When a flag process is completed on the enclosing rectangles 171 through 174 and the enclosing rectangles 176 through 187, the ratio of flag-assigned rectangles is computed for each group. A group having a high ratio of flag-assigned rectangles is extracted as a character string, and a group having a low ratio of flag-assigned rectangles is deleted as noise.

As a result, as shown in FIG. 25B, the group containing the enclosing rectangle 175 has no flags assigned to the enclosing rectangles 171 through 174 belonging to the group, and therefore is deleted as noise. On the other hand, the group containing the enclosing rectangle 188 has the horizontal arrangement flag 1 assigned to the enclosing rectangles 176 through 187 belonging to the group, and therefore is extracted as a character string.

Practically, the following processes a) through e) are performed.

a) When the difference in coordinates at either upper end point or lower end point between two adjacent rectangles in a group satisfying predetermined conditions on size or shape is smaller than a threshold (height multiplied by WID_RATE (=0.2)), the two rectangles are assigned a horizontal arrangement flag.

An adjacent rectangle refers to a rectangle existing within a range of the width multiplied by WID_RATE_DIST (=0.5) from the reference rectangle.

b) When the difference in coordinates at either leftmost point or rightmost point between two adjacent rectangles in a group satisfying predetermined conditions on size or shape is smaller than a threshold (width multiplied by WID_RATE), the two rectangles are assigned a vertical arrangement flag.

c) The direction of a larger number of flags assigned to a rectangle in a group, that is, the number of horizontal arrangement flags or vertical arrangement flags whichever is larger, is defined as the direction of a character string, and the number is referred to as the number of rectangles.

d) The ratio of the rectangles arranged in a group is computed as the 'number of arranged rectangles/total number of rectangles in a group satisfying predetermined conditions on size or shape'.

Assuming that the height indicating the highest frequency of the rectangle in a group is obtained, and the large_rect is obtained by multiplying the height by 3, the condition of a target rectangle in a group is that the height of the rectangle is larger than a fixed size (23 dots in 100 dpi) and smaller than large_rect.

e) When the ratio of arranged rectangles is larger than a predetermined threshold NUM_RATE (=0.8), the corresponding group is stored as a probable character string group, and others are deleted as ___noise.

Special symbols such as a dot (·), a hyphen (−), etc. which may be used in a title is entered in advance, and the special symbols can be stored as a pattern forming part of a title even if the conditions of a) through e) are not satisfied.

Next, a noise group deleting process is performed (step S20).

In this noise group deleting process, a probable noise group is detected by judging from the shape and the coordinates of a group comprising only two rectangle. That is, it is determined whether or not the upper and lower end (or leftmost and rightmost) of two rectangles in a group are close to each other, and groups other than those determined to be arranged close to each other are deleted as noise.

Figure 26:
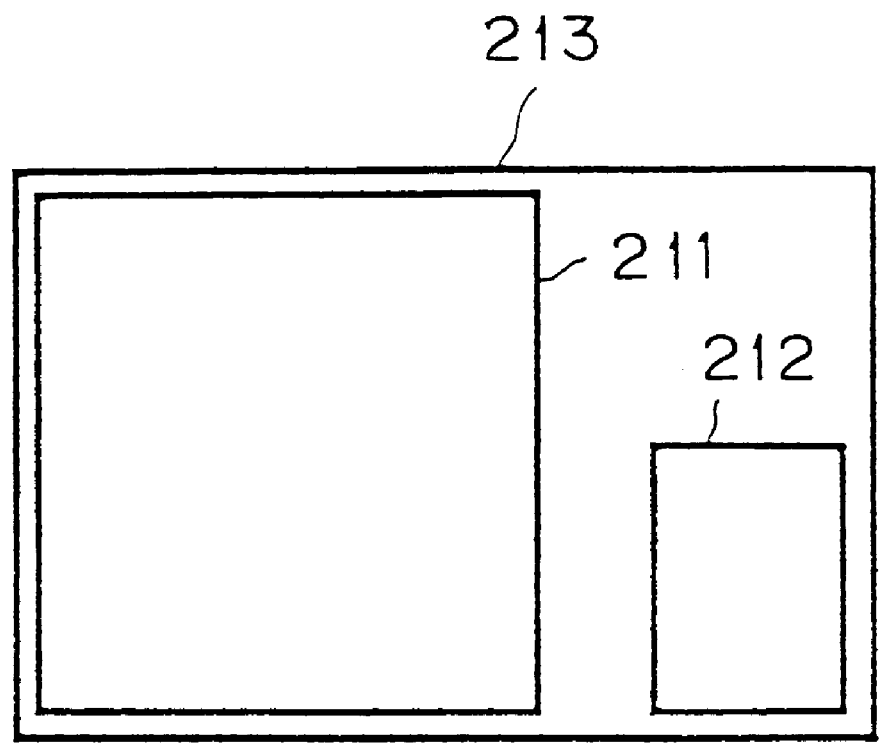
FIG. 26 shows the process of deleting noise groups according to an embodiment of the present invention.

FIG. 26 shows a noise group deleting process according to an embodiment of the present invention.

In FIG. 26, it is assumed that two enclosing rectangles 211 and 212 are extracted as one group, and an enclosing rectangle 213 enclosing the two rectangles 211 and 212 is generated. In this case, since the coordinates at the lower end points of the enclosing rectangles 211 and 212 are aligned, but the coordinates at the upper end points of the enclosing rectangles 211 and 212 are not aligned, these enclosing rectangles 211 and 212 are assumed to be noise, and the groups comprising the enclosing rectangles 211 and 212 are deleted from a probable character string group.

Practically, the following processes are performed.

Assuming that the average height of two rectangles in a group is hei, the average width is wid, and the ratio for use in determining a threshold is DEL_RATE=0.1, (| coordinates of upper end point of first rectangle−
coordinates of upper end point of second rectangle
|<hei×DEL_RATE
and
| coordinates of lower end point of first rectangle−
coordinates of lower end point of second rectangle
|<hei×DEL_RATE)
or
(| coordinates of leftmost point of first rectangle−
coordinates of leftmost point of second rectangle
|<wid×DEL_RATE
and
| coordinates of rightmost point of first rectangle−
coordinates of righttmost point of second rectangle
|<wid×DEL_RATE)

Only the group satisfying the above listed conditions are stored, and all the others are deleted as noise.

Next, a noise removing process is performed based on character recognition (step S21).

If the noise removing process is performed based on character recognition, the pattern in a group is processed in a character recognizing process after removing noise according to position and size information about an enclosing rectangle in a pattern, and an average value is obtained from distance values of respective patterns. When an average value is smaller than a predetermined threshold (for example 1200), it is stored as a probable character group, and all the other groups are deleted.

In this process, it is possible to detect a group having a pattern comprising only the noise extracted from the background portion, and a pattern which apparently cannot be defined as characters can be removed from candidates for a title, thereby improving title extraction precision.

In addition, according to the distance value obtained as a result of the character recognizing process, a pattern in a group can be re-grouped.

Practically, a character recognizing process is performed on patterns in all rectangles in a group, and the distance value of the first candidate is obtained for each rectangle. Then, the frequency distribution of distance values is generated for each rectangle, and the distance values are clustered to generate a plurality of distance value clusters. A method of generating a plurality of clusters can be realized by obtaining a plurality of clusters at the valley of the distance value frequency distribution, applying a hierarchical clustering, etc.

Assuming that the character recognition distance value of a pattern of the first enclosing rectangle of two enclosing rectangles is dist 1, and the character recognition distance value of a pattern of the second enclosing rectangle is dist 2, the two enclosing rectangles are classified into the same group when these distance values belong to the same cluster.

This process is performed on all rectangles in the original group, and a new grouping process is performed in a group.

Then, an intra-group unicolor pattern extracting process is performed (step S22).

In this intra-group unicolor pattern extracting ___process, the representative color of a group is obtained as an average color of the representative colors of the rectangles in the group. In the range corresponding to the portion in a rectangle in a group, an original image is searched, a pattern of a color similar to the representative color of the group, and a pattern other than that extracted as a character pattern is extracted as a binary image. The extracted pattern is labeled for a binary image, and an enclosing rectangle of connection elements is obtained. Only the enclosing rectangles whose sizes are larger than a predetermined value are added as a part of a character pattern to the group.

In this process, a pattern which is not extracted in the processes above, but actually is a part of a character, for example, the portion of in 'クロ−ハル化への3つの成功モデル', which has been lost by character width information, color deviation, etc., can be re-extracted.

When a pattern of a color similar to the representative color of the group is re-extracted from an original image, and it is determined using a fixed threshold whether or not it is a unicolor pattern, a large amount of background noise is picked up and a character may be lost if the background color is similar to the character color, and they are similar to black.

Therefore, when a unicolor pattern is re-extracted from an original image, a unicolor pattern is determined, not using a fixed threshold, but in consideration of color variance in an area already extracted as a character pattern, and using a standard deviation obtained from the variance with a threshold.

Figure 27:
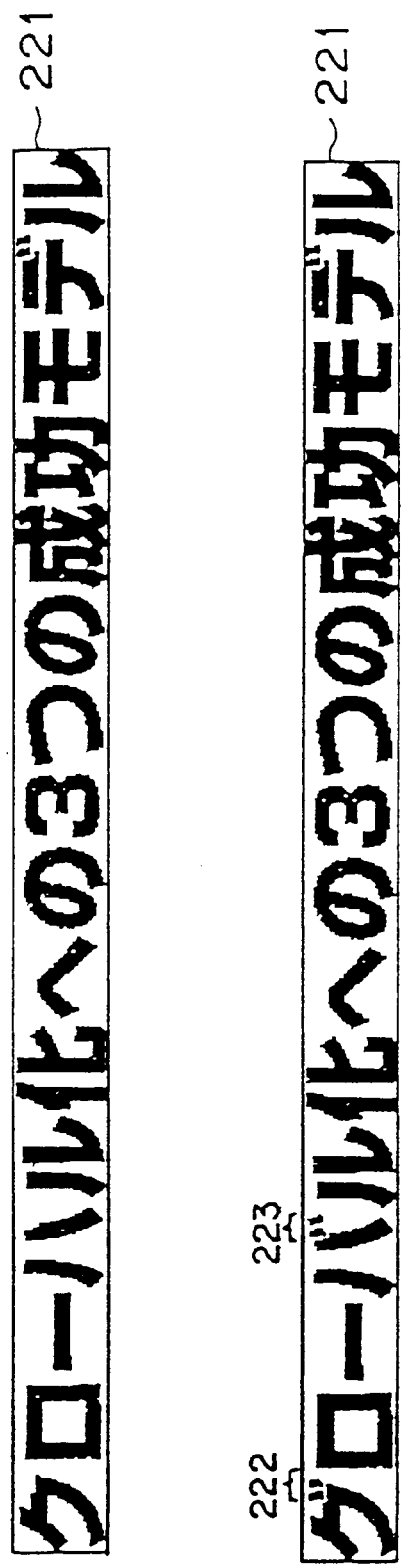
FIG. 27 shows the process of extracting unicolor patterns in a group according to an embodiment of the present invention.

FIG. 27 shows an intra-group unicolor pattern extracting process according to an embodiment of the present invention.

In FIG. 27A, in the processes in steps S1 through S21 shown in FIG. 3, a character string 'クロ−ハル化への3つの成功モデル' is extracted from an input image, and an enclosing rectangle 221 enclosing the character string is generated. In this case, strokes 222 added to the character 'ク' and strokes 223 added to the character ハ shown in FIG. 27B are lost.

In this example, the strokes 222 added to the character ク have been lost because the difference between the color of the strokes 222 added to the character ク and the color of the character ク is not within the range of the threshold, and the strokes 222 added to the character ク and the character ク have been put in different groups.

The strokes 223 added to the character ク has been lost because the difference between the color of the strokes 223 added to the character ハ and the color of the character ハ is not within the range of the threshold, and the strokes 223 added to the character ハ and the character ハ have been put in different groups.

Thus, in the unicolor group extracting process in step S9, the colors of local portions are compared among the character strings to be extracted, and a portion of a character can be lost when the color of a character string to be extracted changes.

When the strokes 222 added to the character ク and the strokes 223 added to the character ハ re-extracted, the already extracted character string 'クローハル化への3つの成功モデル' is considered to obtain the representative color and re-extract a pattern of a color similar to the representative color from the original image. That is, the representative color of the already extracted entire character string is obtained and compared with the color of the pattern to be extracted. Then, the influence of the local color change can be reduced, and the strokes 222 added to the character ク and the strokes 223 added to the character ノ can be extracted.

Furthermore, when a pattern is re-extracted, the search range of the pattern to be re-extracted is limited to the range of the enclosing rectangle 221. By thus limiting the range, a character can be re-extracted by limiting the search range of the character to only the title area when, for example, characters forming a title are extracted from an original image, thereby quickly performing the extracting process.

Furthermore, not a predetermined experimental value, but a value obtained from the color information about the pattern 'クローハル化への3つの成功モデル' already extracted as shown in FIG. 27A is used as a threshold used in determining the similarity of color when a re-extracting process is performed. For example, the color difference in picture elements forming the pattern 'クローハル化への3つの成功モデル' is obtained, and the maximum value of the color difference can be defined as a threshold of the color when a pattern re-extracting process is performed.

As a result, even when the background color and the character color is similar to each other, a small difference between them can be detected, and the strokes 222 added to the character ク and the strokes 223 added to the character ノ can be extracted with the background noise prevented from being extracted even when the background noise similar to the color of the character string 'クローハル化への3つの成功モデル' exists in the range of the enclosing rectangle 221.

When the color of the character string 'クローハル化への3つの成功モデル' is completely the same as the color of the background noise, the noise cannot be prevented from being extracted, it can be reduced by assuming small re-extracted patterns as noise and removing them.

Practically, the following processes are performed.

a) The representative color information stored for the rectangles in a group is averaged about all rectangles in the group, and the representative color (Rm, Gm, Bm) of the group is obtained. Furthermore, the variance (Vr, Vg, Vb) of the RGB in the group is obtained, and the standard deviation of the group is computed from the variance by the following equation.

$$dev = sqrt\ (sqrt\ (Vr*Vr+Vg*Vg+Vb*Vb))$$

b) The highest frequency of the rectangle sizes in a group is obtained as mfw and mfh respectively for width and height. If the width and height are larger than the threshold minsize (=2) of the minimum rectangle size, then they are replaced with minsize.

c) An enclosing rectangle of a group is obtained, and the binary image of the enclosing rectangle of the size is generated. The value of the binary image is all 0.

d) The color of the picture elements of the original image is checked in the range of the group, and the position of the picture element satisfying $$|Rm-R|+|Gm-G|+|Bm-B|<k\times dev\ (k=5)$$

for the relationship between the color (R, G, B) of the picture element of the original image and the representative color (Rm, Gm, Bm) of the group is stored, and the picture element at the position of the binary image is set to 1.

e) A rectangle in a group is formed in the binary image. A pattern already extracted from the rectangle in the group is removed, and the binary image pattern is formed only by patterns whose colors are similar to the representative color of the group, and which have not been extracted in the previous processes.

f) A binary image is labeled to obtain an enclosing rectangle for a connection area.

g) Only a rectangle satisfying $$w>mfw/2\ and\ h>mfh/2$$

for the width w and height h of its enclosing rectangle is reserved, and the other rectangles are deleted.

h) The pattern of the connection element contained in the reserved rectangle is added to the group.

Next, an output order determining process is performed for a group (step S23).

In the group order determining process, when a plurality of groups containing character strings are extracted, the area is computed from the enclosing rectangle of a group, the groups are sorted in order from the largest area, and the sorted result is defined as an output order.

Then, a binary pattern generating process is performed (step S24).

In the binary pattern generating process, a pattern forming part of a group is generated as a binary image for which characters can be recognized.

Practically, the following processes a) through c) are performed.

a) A binary image of the size of the enclosing rectangle in a group is generated, and all values are set to 0.

b) The label number of a rectangle in a group is extracted, a labeled image is searched for in the corresponding rectangle area, the picture element having the label number is extracted, and the picture element at the coordinates in the binary image is set to 1.

c) The process in b) is performed on all rectangles, and the pattern forming a group is generated in the binary image.

On the other hand, in step S3 shown in FIG. 4, when it is determined that an input image is not a full-color image, a clustering process is performed (step S25).

In the clustering process, the picture elements of an RGB image are clustered in the RGB space or the color space (HSV, etc.) other than the RGB space, and an image is generated for each color using the picture elements belonging to one cluster.

At this time, the clustering process is performed on an image other than a full-color image because a number of small areas are generated in a unicolor area if the labeling method adopted for a full-color (for example, 16,670,000 colors) images is adopted for an image (for example, in 256 colors) other than the full-color image, and the after-processing time is much longer than the time required for processing a full-color image, or the character pattern extraction precision is reduced.

The above described problem occurs because a 256 color image is assumed to have lost its colors by the color clustering performed on a full-color image, and an area represented by different colors in a full-color image is represented as a unicolor area in the 256 color image. That is, since it is necessary to distinguish 16,670,000 colors for a full-color image, the range in which similar colors change should be minimized. However, it is necessary only to distinguish 256 colors for a 256 color image, and the range in which similar colors change can be somewhat large.

Therefore, if the labeling method adopted for a full-color image is adopted for a 256 color image, then it is determined that the area represented in the same color in a 256 color image is represented in different colors, and a number of small areas are generated in a unicolor area.

Accordingly, the clustering process is performed on a color palette of an image, and a labeling process is performed using the result of the clustering process.

The distributed colors of the image are clustered, and the labeling process is performed using the result of the clustering process.

In addition, when an image other than a full-color image is labeled, a combined method of the clustering and area expansion labeling processes can also be used.

As a result of the clustering process, the following information can be obtained for one clustering operation.

cluster number number of color palettes contained in a cluster color palette number of an original image contained in a cluster verage color (R, G, B) of a cluster As a clustering method, for example, a hierarchical clustering in which a city block distance between the centers of clusters is used as a distance scale can be applied. The scale of a distance can also be defined by an Euclidean distance, an weighted Euclidean distance, a Mahalanobis distance, etc.

Furthermore, as a method of measuring the distance between clusters, a shortest distance method, a longest distance method, a median method, a center of gravity method, a group average method, a Ward method, etc. can be used.

A clustering termination condition, for example, can be to terminate a clustering process when the minimum value of the distance between the centers of clusters becomes smaller than a threshold.

When distributed colors of an image are clustered, the vector used in the clustering process is the color palette (Ri, Gi, Bi) (i=1 through 255, etc.).

When a hierarchical clustering process is performed using a vector of the color palette, the distance between clusters is obtained as a color distance scale, and clusters at a short distance from each other are integrated.

When the distance dist between two colors (R1, G1, B1) and (R2, G2, B2) is defined by a city block distance, it can be represented by the following equation.

$$dist=|R1-R2|+|G1-G2|+|B1-B2|$$

The ability of a device identifying the difference in color is different from the ability of a person identifying the difference in color. For example, even if the distances indicating the same value in a color space, two colors similar to black (or white) cannot be identified by a person with higher precision as compared with two colors of high color saturation such as red, etc.

That is, two colors similar to black cannot be easily distinguished by a person although the distance values are considerably different in a color space, and the two colors appears the same color to the person.

On the other hand, two colors similar to red can be distinguished by a person although the two colors are similar in distance value in a color space, and the two different red colors can be successfully distinguished from each other.

Before the clustering process, colors are converted to make the distance value between two colors of low color saturation (colors similar to black or white) smaller than the distance value between two colors of high color saturation. By the color conversion, every difference between luminance values from 0 to 255 can be determined based on the same evaluation reference.

Figure 28:
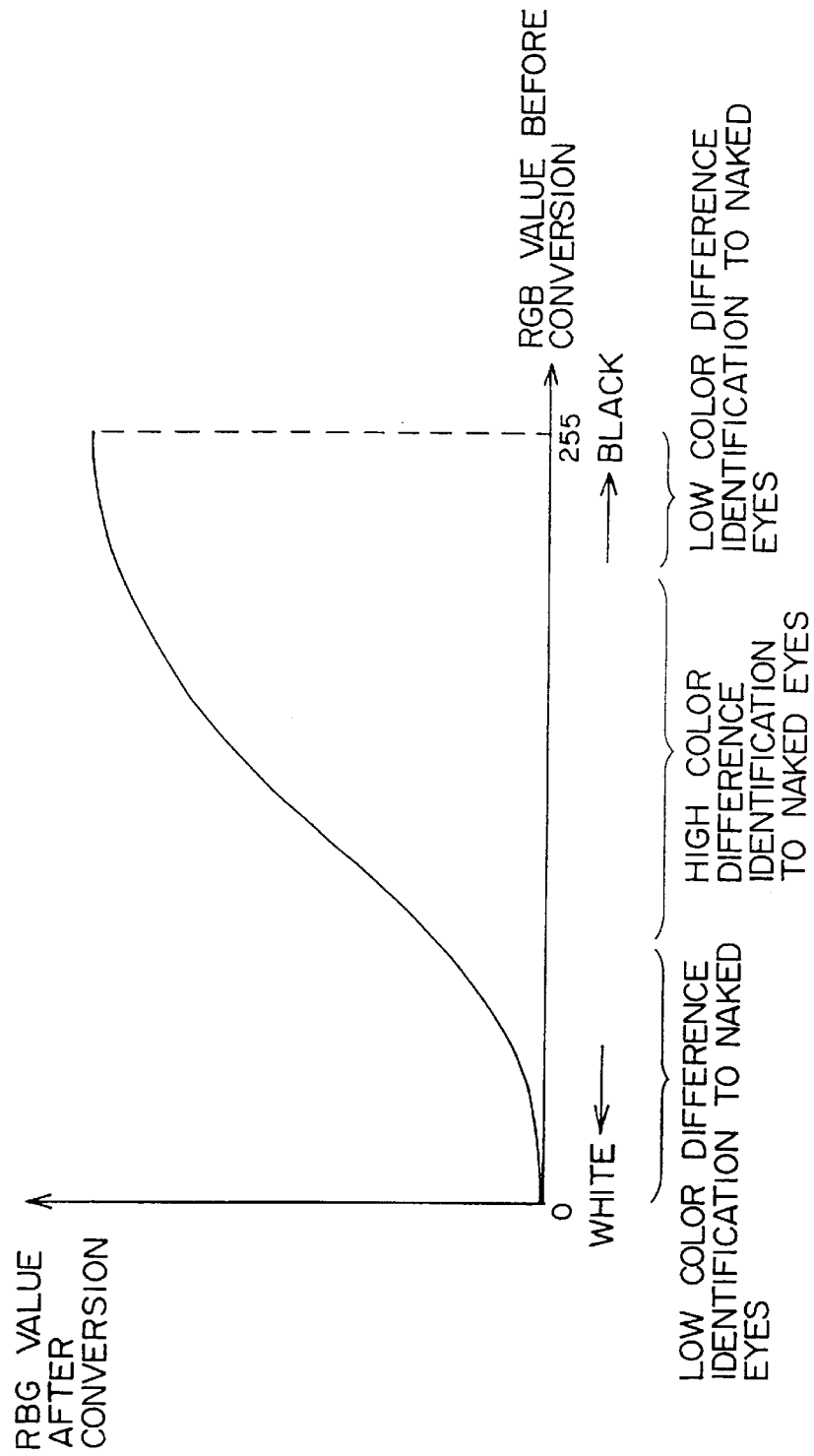
FIG. 28 shows the method of converting a color signal according to an embodiment of the present invention.

FIG. 28 shows the method of converting a color signal according to an embodiment of the present invention.

In FIG. 28, as for colors similar to black or white, the color difference of (R, G, B) in a color space is more clearly identified than the color difference identified by a person.

For example, when a person identifies the difference in color, the color difference (=80) between black (0, 0, 0) and a color (0, 0, 80) similar to black has almost the same sensitivity as the color difference (=10) between red (255, 0, 0) and a color (255, 5, 5). That is, the difference between two reddish colors can be recognized although the color difference between them is only about 10. However, the difference between two blackish colors cannot be recognized until the color difference becomes as large as 80.

Therefore, colors are converted such that the color difference between two colors is compressed when colors are similar to black or white, and the color difference is extended between other colors. The distance of the color difference is equally evaluated for all colors. The clustering result similar to the result obtained by determination of a person can be obtained by clustering the color palettes obtained from the above described color conversion.

When colors are converted through computation, the following equations can be used.

$$Rnew=\{1-\cos(R\times\pi/255)\}\times 255+R\times 4$$

$$Gnew=\{1-\cos(G\times\pi/255)\}\times 255+G\times 4$$

$$Bnew=\{1-\cos(B\times\pi/255)\}\times 255+B\times 4$$

The color conversion corresponding to the identification ability of a person is experimentally obtained, and the experimentally obtained color conversion result can be entered in advance in a conversion table.

Next, a color labeling process is performed based on a clustering result (step S26).

In the color labeling process performed based on a clustering result, a color image is labeled according to the information obtained from a clustering result of a color palette.

That is, the color palettes of images other than full-color images are clustered, and the clustering result is reflected on the labeling process.

On the other hand, it takes a long time to cluster full-color images. When a pseudo-clustering process is performed by dividing a color space into appropriate sections to shorten the processing time, the precision is lowered.

Therefore, the labeling process is not performed on full-color images through the clustering process. The labeling process is performed through the clustering process only on images of a small number of colors such as 256 colors other than full-color images.

Figure 29:
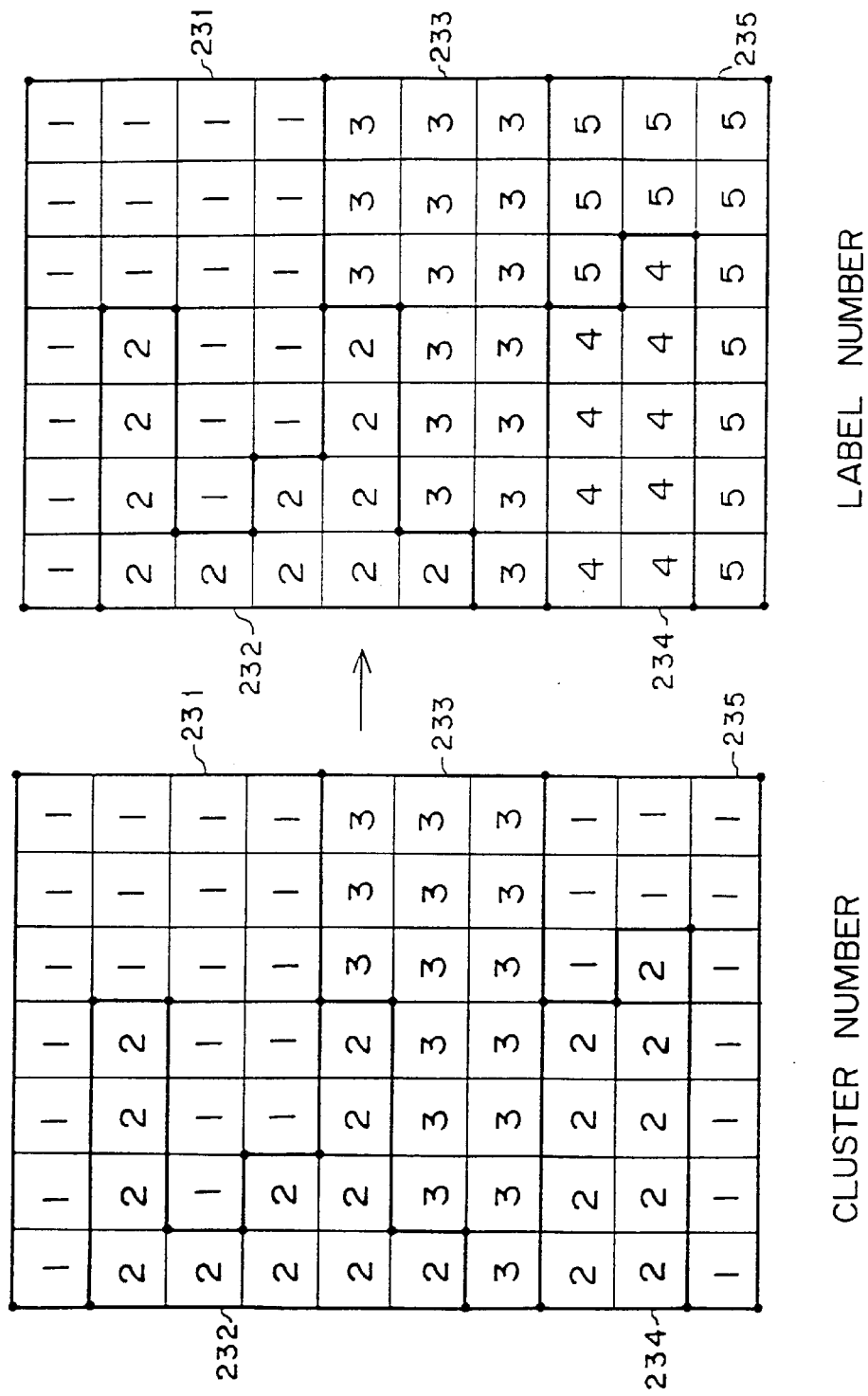
FIG. 29 shows the color-labeling method based on a clustering result according to an embodiment of the present invention.

FIG. 29 shows the method of labeling colors based on a result of the clustering process according to an embodiment of the present invention.

Assume that, in FIG. 29, color palettes of picture elements are clustered, and the number of a cluster to which the color palette of each picture element belongs is assigned to each picture element.

For example, the colors of patterns 231 and 235 are red, the colors of patterns 232 and 234 are blue, and the color of a pattern 233 is yellow. The red color is classified into the cluster having the cluster number 1, the blue color is classified into the cluster having the cluster number 2, and the yellow color is classified into the cluster having the cluster number 3. The cluster number 1 is assigned to each of the picture elements forming the patterns 231 and 235. The cluster number 2 is assigned to each of the picture elements forming the patterns 232 and 234. The cluster number 3 is assigned to each of the picture elements forming the pattern 233.

When a cluster number is assigned to each picture element, the cluster numbers of adjacent picture elements are compared with each other. If the cluster number of the adjacent picture elements match each other, the picture elements are assigned the same label.

For example, since the picture element forming part of the pattern 231 is connected through the picture element having the cluster number 1, the picture elements forming the pattern 231 are assigned the label number 1. On the other hand, although the cluster number of the picture elements forming the pattern 235 is also 1, the pattern 231 is not connected to the pattern 235. Therefore, the picture elements forming the pattern 235 are assigned the label number 5.

Practically, the following process is performed.

First, a conversion table from which a cluster number is obtained in relation to the palette number of a picture element is generated.

Next, a color labeling process is performed based on the cluster number. In the color labeling process, the same label is assigned when the cluster numbers of adjacent picture elements are the same.

That is, a raster scanning process is performed on a reduced image from the upper left, and an unlabeled picture element is checked.

If the eight picture elements around the unprocessed picture element are raster-scanned, labeled picture elements already exist around, and the cluster numbers of the picture elements are the same as the cluster number of target picture element, then the labels of the surrounding picture elements are stored as current labels (region), and the region is assigned as a label of the target picture element.

In addition, a new average color obtained by adding the color of the target picture element to the average color of the surrounding labels is obtained as an average color (Rm, Gm, Bm) of an area.

Otherwise, a label value obtained by adding 1 to the latest label value is set, and the value is also provided for the target picture element. In this case, the RGB value of the target picture element is set based on an average color (Rm, Gm, Bm).

In any case, the coordinates of the target picture element are stored in the coordinate array to be processed.

A unicolor area is extended around the target picture element. From the array to be processed, the leading coordinates are retrieved, and the picture elements at the coordinates are set as target picture elements.

The eight picture elements around the target picture element are scanned. When the picture elements are unprocessed, and the cluster numbers of the target picture elements match the cluster numbers of the surrounding picture elements, the same label is assigned to the target picture elements and the surrounding picture elements, and the coordinates of the surrounding picture elements are added to the array to be processed. The processed target picture elements are deleted from the array to be processed. The maximum and minimum values of the processed x and y coordinates are obtained, and stored as enclosing rectangles of the label area. In addition, the average color of the label area is stored as an attribute of the enclosing rectangle.

The above described process is continued until the contents of the array to be stored have been completely processed.

As a result of the labeling process, an enclosing rectangle of an area having the same label as the label image (the same areas are assigned the same label values) is obtained.

The output information from the labeling process is as follows.

label image: 4 bytes/1 picture element
enclosing rectangle number of rectangles: maxcount
   label number of contained label image: label
   coordinates of upper left of rectangle: (xmin, ymin)
   coordinates of upper right of rectangle: (xmax, ymax)
   representative color in rectangle; (r, g, b)
   associated group number: string_label
   outline length: contour FIG. 30 is a block diagram showing the system configuration of the pattern extraction apparatus according to an embodiment of the present invention.

Figure 30:
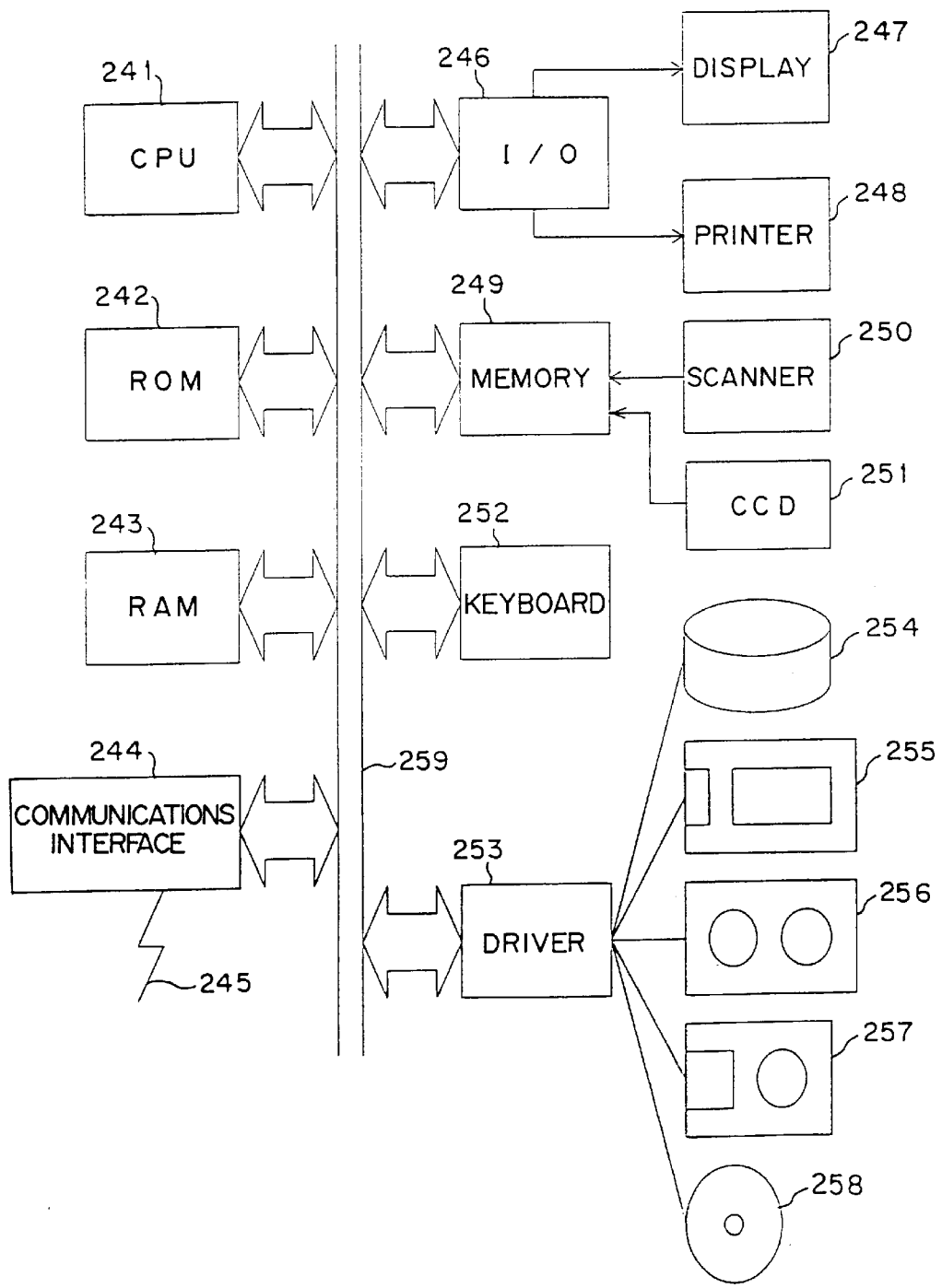
FIG. 30 is a block diagram of the system configuration of the pattern extraction apparatus according to an embodiment of the present invention.

In FIG. 30, a central processing unit (CPU) 241 performs the entire process, 242 is read-only memory (ROM), 243 is random access memory (RAM), 244 is a communications interface, 245 is a communications network, 246 is an input/output interface, a display 247 displays an extraction result such as an input image, a title, etc., a printer 248 prints extraction results such as an input image, title, etc., memory 249 temporarily stores data read from a scanner 250 or a CCD 251, the scanner 250 reads a color image, etc., the CCD 251 reads a color image, etc., 252 is a keyboard, a driver 253 drives a storage medium, 254 is a hard disk, 255 is a IC memory card, 256 is a magnetic tape, 257 is a floppy disk, 258 is an optical disk such as CD-ROM, DVD-ROM, etc., and a 259 is a bus.

A program for performing a pattern extracting process, a program for generating a printing model, a color difference table, etc. are stored in a storage medium such as a hard disk 54, an IC memory card 55, a magnetic tape 56, a floppy disk 57, an optical disk 58, etc. The pattern extracting process can be performed by reading a program for performing a pattern extracting process and a color difference table from these storage media to the RAM 243. In addition, a program for performing a pattern extracting process can also be stored in the ROM 242. A color difference table can be generated by activating a program for generating a printing model.

Furthermore, a program for performing a pattern extracting process and a color difference table can also be retrieved from the communications network 245 through the communications interface 244. The communications network 245 connected to the communications interface 244 can be either a wired or wireless system. For example, the network can be a LAN (local area network), a WAN (wide area network), the Internet, an analog telephone network, a digital telephone network (ISDN, integral service digital network), a PHS (personal handy system), a portable telephone network, a satellite communications network, etc.

The CPU 241 sets a threshold for use in labeling an input image read by the scanner 250 or the CCD 251 when a program for performing a pattern extracting process is activated, and generates a label image from an input image read by the scanner 250 or the CCD 251. When a label image is generated, an enclosing rectangle for each pattern is generated for each label of the pattern of an input image. Then, according to the color information about an area in each enclosing rectangle and the geometric information about an enclosing rectangle, each enclosing rectangle is grouped, and a title area, etc. is extracted in consideration of the arrangement and size of the grouped enclosing rectangle.

When the title area is extracted, the pattern contained in the title area is output to the display 247 and the printer 248 as a title of the input image, the characters of the pattern contained in the title area are recognized, and a document can be automatically classified and retrieved based on the recognition result.

Described below is an actual color image as an example of the above described process. A color image used in explaining the process is a full-color image as an example, but any color image other than a full-color image can also be processed except the case where a different color labeling process is performed.

FIG. 31A shows an example of an input original image.

In FIG. 31A, the original image is formed by 847 ×1167 picture elements, and a character pattern 301 '祝!パソコン20年' is printed in black. Around the character pattern 301, a background pattern 302 whose color gradually changes from black to orange, and from orange to yellow exists. Assume that the character pattern 301 '祝!パソコン20年' is to be extracted from the original image shown in FIG. 31A.

FIG. 31B shows the label image shown in FIG. 31A.

In FIG. 31B, the label image is obtained from the color labeling process in step S5 shown in FIG. 4. In the color labeling process, the same label is assigned to unicolor connection areas, and an enclosing rectangle of patterns assigned the same labels is generated.

The original image shown in FIG. 31A is divided into mesh areas each comprising 3×3 picture elements, and a level color area is extracted from the original image shown in FIG. 31A by selecting an area indicating a small color variance of the picture elements from among the mesh areas. For example, since an upper right area 303 and a lower right area 304 of the original image shown in FIG. 31A are colored in black, these areas 303 and 304 are extracted as level color areas of the original image.

When the level color areas are extracted from the original image, the color variance of the level color areas is obtained, and a labeling threshold is set based on the color variance. Using the threshold in the labeling process performed on the original image shown in FIG. 31A, a label image 311 obtained by correctly tracing the outline of the character pattern 301 '祝!パソコン20年' can be generated by successfully distinguishing the subtle difference in color between the character pattern 301 and the background pattern 302 although the black character pattern 301 is surrounded by the black background pattern 302.

Since the color of the background pattern 302 delicately changes, the labeling process in the adjacency expanding method cannot correspond to the change in color of the background pattern 302, and a number of small background noises 312 are generated.

When a full-color image is processed, the number of enclosing rectangles obtained in the color labeling process is several thousand through several tens of thousand.

Figure 32B:
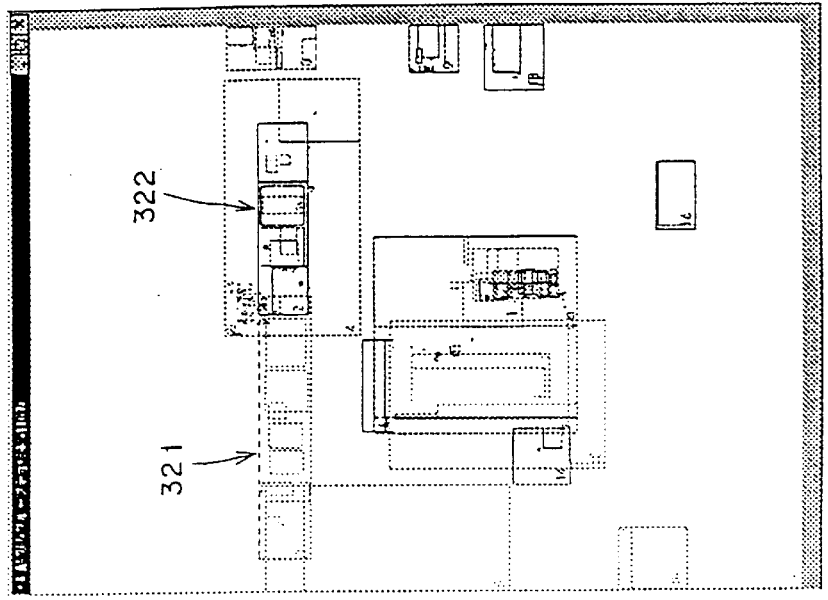
FIG. 32B shows a result of extracting groups.
Figure 32A:
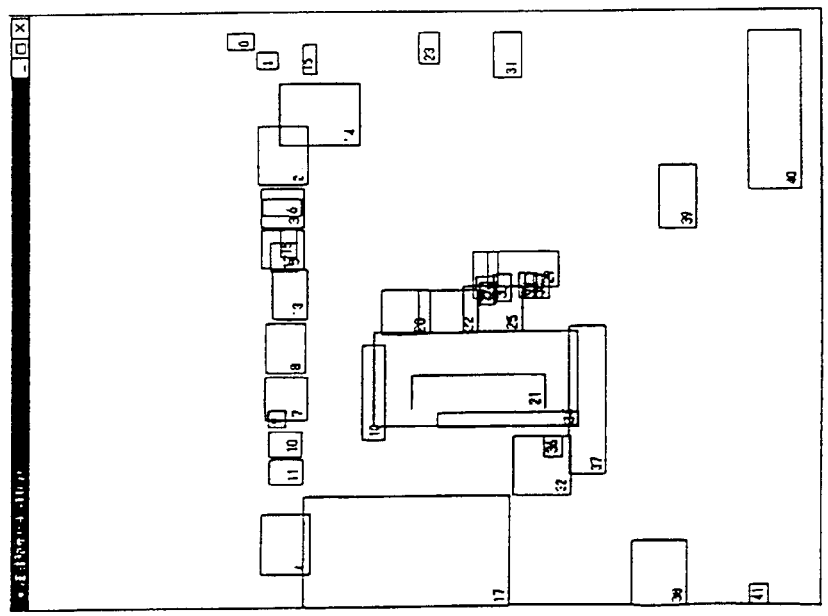
FIG. 32A shows a target rectangle set in the label image shown in FIG. 31B.

FIG. 32A shows a target rectangle obtained from a label image shown in FIG. 31B.

In FIG. 32A, the target rectangle is obtained by the target rectangle extracting process in step S7 shown in FIG. 4. In the target rectangle extracting process, an enclosing rectangle of a size within a predetermined range is defined as a target rectangle among the enclosing rectangles obtained from the label image shown in FIG. 31B. Therefore, the rectangles having the rectangle numbers 1 through 41. are extracted as target rectangles from among the enclosing rectangles obtained in the color labeling process shown in FIG. 31B.

In the target rectangle extracting process, an enclosing rectangle such as small background noise 312 which obviously does not form part of a title can be removed from the enclosing rectangles based on which a search range can be set when a grouping process is performed, thereby performing the process at a high speed. For example, the number of enclosing rectangles, which is several thousand through several tens of thousand in the state shown in FIG. 31B, can be reduced into ten or more.

FIG. 32B shows a result of the group extracting process.

In FIG. 32B, the result of the group extracting process is obtained in the unicolor group extracting process in step S9 shown in FIG. 4. When the labeling process terminates as shown in FIG. 31B, characters forming a title are assigned different labels. Therefore, the unicolor group extracting process is performed to put the characters '祝', '!', 'パ', 'ソ', 'コ', 'ン', '2', '0', and '年' in a single group.

In the unicolor group extracting process, a enclosing rectangle encompassing the enclosing rectangles grouped into the same group is generated.

In the unicolor group extracting process, enclosing rectangles which are obtained from the label image shown in FIG. 31B, positioned within a predetermined range from the target rectangle set as shown in FIG. 32A, and have similar colors are grouped into the same group.

Therefore, when a local color change is detected in each character forming part of a title, characters forming the title may be grouped into different groups. For example, in the character pattern 301 '祝!パソコン20年' shown in FIG. 31A, if the color of the character 'コ' and the color of the character 'ン' are locally variable, then the character 'コ' and the character 'ン' are classified into different groups. Therefore, in FIG. 32B, the pattern '祝!ハソコ' and the pattern '祝!ハソコン20年' are classified into different groups, and an enclosing rectangle 321 of the group corresponding to the pattern '祝!ハソコ', and an enclosing rectangle 322 of the group corresponding to the pattern 'ン20年' are generated.

The group corresponding to the enclosing rectangle 321 comprises the pattern '祝!ハソコ', and a stroke added to 'ン20年' has been lost from the character pattern 301 '祝!パソコン20年'. This is because, in the unicolor group extracting process, the color of a target rectangle extracted as shown in FIG. 32A is compared with the colors of the surrounding rectangles, and when the color difference between the target rectangle and the surrounding rectangles is large, the rectangles are classified into different groups. For example, when the color difference between the pattern 'ハ' and the stroke added to 'ハ' is large, the pattern 'ハ' and the stroke added to 'ハ' are classified into different groups, and the stroke added to 'ハ' is lost from the group of the enclosing rectangle 321.

Furthermore, when a threshold for use in extracting a unicolor group is not appropriate, the stroke added to 'ハ' can be lost from the group corresponding to the enclosing rectangle 321. For example, if the threshold of an assumably unicolor range is set based on the luminance difference between the unicolor patterns obtained from a printing model, then an input image cannot be appropriately processed when input in the method different from the method of the printing model.

When other enclosing rectangles of colors similar to the representative color are not detected from the label image shown in FIG. 31B in a predetermined range from the target rectangle shown in FIG. 32A, the target rectangle does not form a group. As a result, the target rectangle is removed.

Figure 33B:
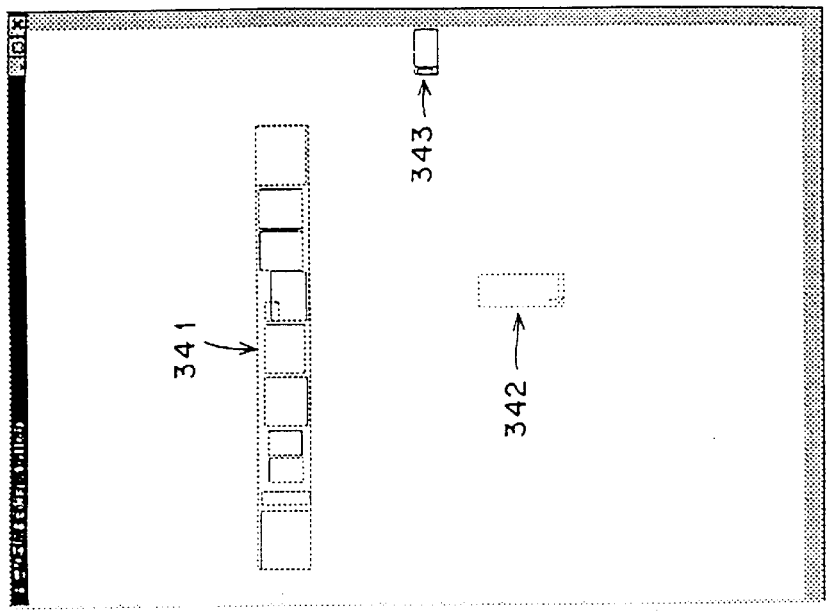
FIG. 33B shows a result of extracting a group of probable character strings from the images shown in FIG. 32A based on the arrangement of rectangles.
Figure 33A:
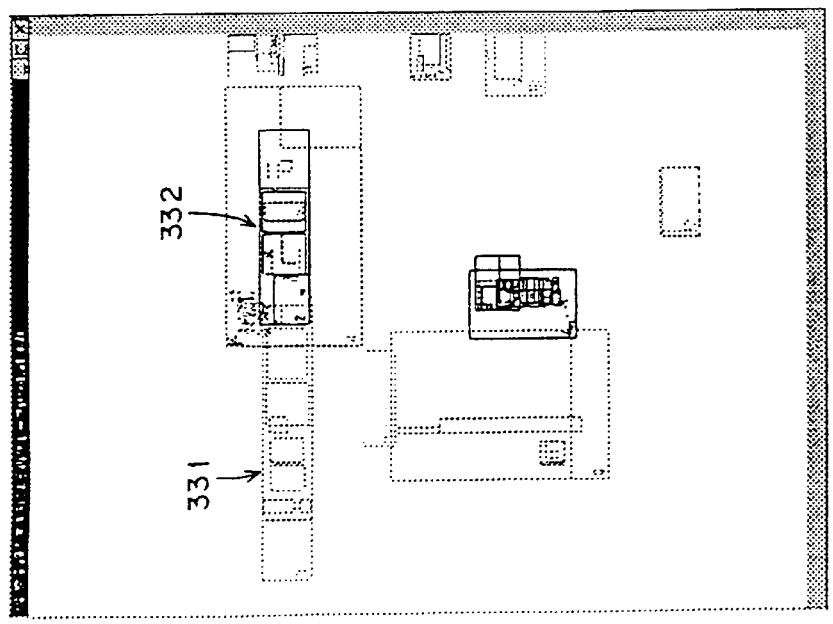
FIG. 33A shows a result of regrouping the result of extracting the groups shown in FIG. 32B based on the thickness of character line.

FIG. 33A shows a result of re-grouping with the thickness of a character line the result of extracting the group shown in FIG. 32B.

In FIG. 33A, the re-grouping result is obtained by re-grouping process with the thickness of a character line in step S11 shown in FIG. 4. The process generates a group of the enclosing rectangles having the rectangle numbers 0 through 12. In the enclosing rectangles shown in FIG. 32B, those which cannot form a group based on the thickness of the line of a pattern are deleted.

FIG. 33B shows the result of extracting a group of probable character strings based on the arrangement of rectangles from the image shown in FIG. 33A.

In FIG. 33B, the group of probable character strings is obtained by extracting a group of probable character strings based on the arrangement of the rectangles in step S19 shown in FIG. 4. In this process, in the groups of the rectangle numbers 0 through 12 shown in FIG. 33A, a group in which rectangles are arranged at random is deleted, and a group in which rectangles are arranged in order in the vertical or horizontal direction can be reserved. As a result, the groups of enclosing rectangles 341 through 343 are extracted.

The group of the enclosing rectangle 341 having the rectangle number 0 as shown in FIG. 33B is obtained by integrating the group of an enclosing rectangle 331 having the rectangle number 3 and the group of an enclosing rectangle 332 having the rectangle number 2. It is obtained because the group integrating process in step S18 shown in FIG. 4 is performed before performing the process in step S19 shown in FIG. 4.

In this group integrating process, it is determined whether or not groups are to be integrated based on an average value of the colors of all patterns belonging to the group. Therefore, characters which belong to the same title but have been grouped into different groups can be integrated into a single group.

For example, in FIG. 32B, the pattern '祝！ハソコ' and the pattern 'ン20年' are classified into different groups, and the enclosing rectangle 321 of the group corresponding to the pattern '祝！ハソコ' and the enclosing rectangle 322 of the group corresponding to the pattern 'ン20年' are generated. Since only the color difference between adjacent rectangles is determined in the unicolor group extracting process shown in FIG. 32B, the character 'コ' and the character 'ン' are classified into different groups if the color of the character 'コ' and the color of the character 'ン' are locally variable in the character pattern 301 '祝！パソコン20年' shown in FIG. 31A.

On the other hand, in the group integrating process in step S18 shown in FIG. 4, the color of the entire pattern '祝！ハソコ' in the enclosing rectangle 321 of the group is compared with the color of the entire pattern 'ン20年' in the enclosing rectangle 322 of the group. When the colors of these groups are similar to each other, they are integrated into a single group. Therefore, even if the color of the character 'コ' and the color of the character 'ン' are locally variable, the change in color of the character 'コ' is absorbed in the color of the entire pattern '祝！ハソコ' to which the character 'コ' belongs, and the change in color of the character 'ン' is absorbed in the color of the entire pattern 'ン20年' to which the character 'ン' belongs. Therefore, the pattern '祝！ハソコ' and the pattern '祝！ハソコン20年' can be integrated into one group.

Figure 34B:
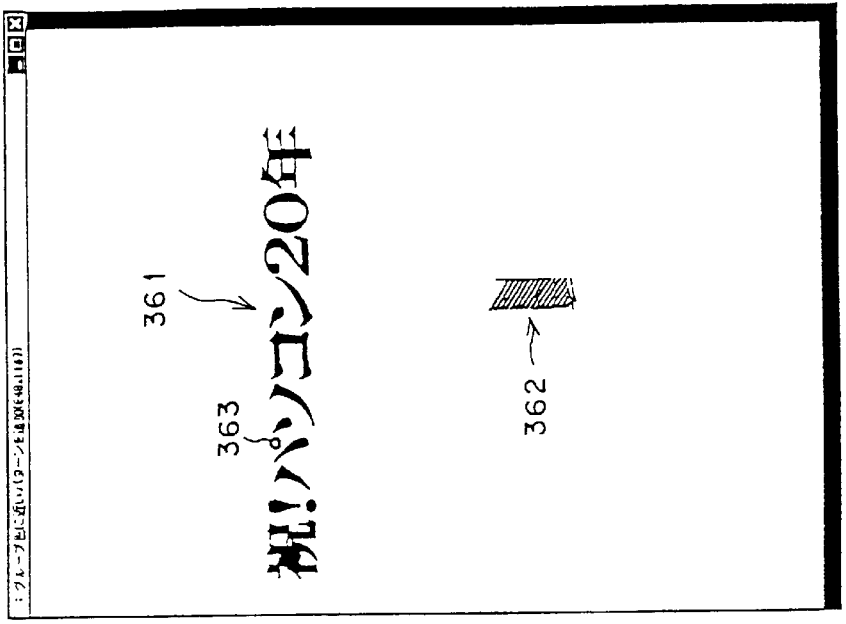
FIG. 34B shows a result of re-extracting the pattern whose color is similar to the group color.
Figure 34A:
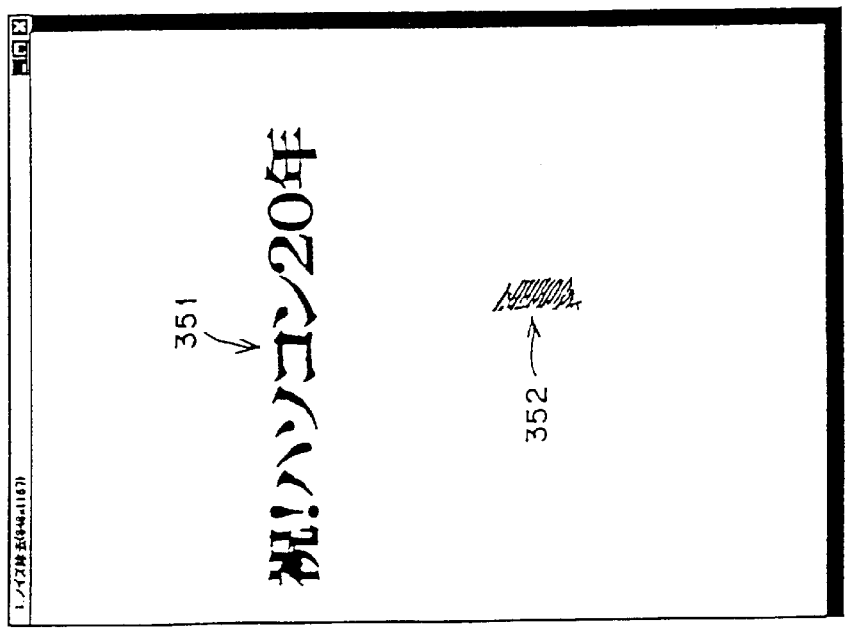
FIG. 34A shows a result of extracting a pattern in the group from the image shown in FIG. 33B.

FIG. 34A shows a result of extracting a pattern in a group from the enclosing rectangle of the group shown in FIG. 33B.

In FIG. 34A, a character pattern 351 '祝！ハソコン20年' 20 '祝！ハソコン20年' and a noise pattern 352 are extracted.

The character pattern 351 '祝！ハソコン20年' is extracted from the enclosing rectangle 341 of the group shown in FIG. 33B, and the noise pattern 352 is extracted from the enclosing rectangle 342 of the group shown in FIG. 33B. The pattern of the enclosing rectangle 343 of the group shown in FIG. 33B has been assumed to be noise and deleted after performing a character recognizing process on the pattern.

In the above described process, the character pattern 351 extracted from the enclosing rectangle 341 shows a character string with the stroke added to 'ハ' lost from the character pattern 301 '祝！パソコン20年'. Therefore, a pattern having the color similar to the color of the group is re-extracted.

FIG. 34B shows a result of re-extracting a pattern having the color similar to the color of the group.

In FIG. 34B, the pattern in the group is obtained by the intra-group unicolor pattern extracting process in step S22 shown in FIG. 4.

In the intra-group unicolor pattern extracting process, the pattern of the original image shown in FIG. 31A in the enclosing rectangle 341 of the group shown in FIG. 33B is searched for the character pattern 351 '祝！ハソコン20年' shown in FIG. 34A.

A unicolor pattern can be re-extracted by comparing the color of the entire character pattern 351 in the enclosing rectangle 341 of the group with the color of the pattern of the original image remaining unextracted in the enclosing rectangle 341 of the group shown in FIG. 33B.

Therefore, it can be determined whether or not the patterns are unicolor by comparing the color of the character pattern 351 '祝！ハソコン20年' with the color of the stroke added to thereby 'ハ' successfully extracting the stroke added to 'ハ' which could not be extracted in the unicolor group extracting process shown in FIG. 31B.

In addition, a threshold of an assumably unicolor range in the unicolor pattern re-extracting process is set based on the variation of the color of the already extracted character pattern 351 '祝！ハソコン20年'.

Therefore, according to the color information about a portion already extracted as a pattern forming a title, the remaining pattern forming the title can be extracted, and a value reflecting the color difference of the pattern to be extracted can be used as a threshold for use in extracting a unicolor pattern, and the stroke added to 'ハ' which could not be extracted in the unicolor group extracting process shown in FIG. 31B can be extracted.

As a result, the stroke added to can be 'ハ' extracted for the character pattern 351 '祝！ハソコン20年' shown in FIG. 34A, and a character pattern 361 corresponding to the character pattern 301 of the original image shown in FIG. 31A can be extracted.

Figure 35:
FIG. 35 shows the first pattern candidate for the title extracted from the image shown in FIG. 31A.

FIG. 35 shows the first candidate for the title extracted from the image shown in FIG. 31A.

In the example shown in FIG. 34B, since two patterns 361 and 362 are extracted as candidates for a title, the areas of the enclosing rectangles 341 and 342 corresponding to the character patterns 361 and 362 are computed. Then, a pattern having a larger area is presented as the first candidate for the title. As a result, as shown in FIG. 35, the character pattern 301 '祝！パソコン20年' extracted from the original image shown in FIG. 31A can be presented as the first candidate for the title.

As described above, according to the present invention, images are processed based on the number of colors of a color image to be processed. Thus, images can be optimally processed depending on the number of colors of a target color image, thereby improving the precision in the image process and performing the process at a higher speed.

According to a further aspect of the present invention, a different labeling method can be used based on the number of colors of a target color image. Therefore, a unicolor area can be prevented from being fragmented into very small sections without lowering the discrimination precision for the colors of a multicolor image.

According to another aspect of the present invention, a label is assigned to a color image other than a full-color image after clustering color palettes, and the unicolor area can be extracted with high precision even if a unicolor area appears uneven in color. In addition, by performing a labeling process in the adjacency expanding method, the processing time can be shortened, and a unicolor area can be extracted without an influence of the color of a separate area, thereby improving the extraction precision.

According to a further aspect of the present invention, a labeling threshold is individually set for each image according to the read information about an image to be labeled. Thus, a threshold correctly reflecting the variations of the colors of an image can be set. As a result, the unicolor areas can be extracted with high precision for various color images.

According to a further aspect of the present invention, a labeling threshold correctly indicating the actual color difference for an input image to be processed is set by extracting color difference information from a local area of the input image, According to a further aspect of the present invention, a labeling threshold for an input image to be processed is set by extracting color difference information from a local area of the input image.

Thus, the actual color difference in the unicolor area of an input image can be extracted from the input image from which a unicolor area is to be extracted, and a threshold unique to the input image can be set. Therefore, even if a various color image is input, the unicolor area can be extracted with high precision.

According to a further aspect of the present invention, a color image is sectioned into a number of small areas. In these small areas, the color variance is checked, thereby successfully extracting a unicolor area from a color image in which various colors are distributed, and computing the actual color difference in the unicolor area.

According to a further aspect of the present invention, a labeling threshold is determined based on the standard deviation of the color in a local area within a range for which a color variance value is predetermined. As a result, even if similar colors such as gray, intermediate colors, etc. are used for both characters and background, the characters and background in similar colors can be correctly discriminated, and only characters can be extracted with high precision.

According to a further aspect of the present invention, similar color areas can be extracted depending on the color recognition characteristics of the naked eyes by converting colors depending on the recognition characteristics of the naked eyes.

According to a further aspect of the present invention, the color difference around the color of low color saturation is reduced. As a result, even if the distance in a color space of the color of low saturation is long, the colors can be extracted as similar colors. In addition, by expanding the color difference between colors of high saturation, the colors can be extracted as different colors even if the distance in a color space of the color of high saturation is short, thereby applying the range of assumingly unicolor color range depending on the recognition characteristics of the naked eyes.

According to a further aspect of the present invention, the colors of a color image are clustered, and the same label is assigned to the areas connected by the colors belonging to the same cluster. Thus, with the number of colors of a color image reduced, the process can be performed more quickly with higher extraction precision for a unicolor area without a predetermined labeling threshold.

According to a further aspect of the present invention, by computing the read resolution independently computed for each color component, a unicolor area can be extracted with the cases taken into account where the read resolution of a CCD, a scanner, etc. depends of each color component, and where the resolution with the naked eyes depends on the difference in color of a color image. As a result, the extraction precision of a unicolor pattern from a color image can be improved.

According to a further aspect of the present invention, the maximum value of the color difference between adjacent picture elements is entered in the color difference table corresponding to the luminance values of all colors of an image. Thus, the maximum value of the color difference between adjacent picture elements can be obtained directly from the color difference table without an arithmetic operation such as interpolation for any luminance value of the color of an image. As a result, a labeling threshold corresponding to the luminance color of the color of an image can be quickly obtained.

According to a further aspect of the present invention, the length of the outline of a pattern in an image is computed based on the frequency of changes of a label value when the image is scanned in a predetermined direction. Thus, the outline length computing process can be quickly performed.

According to a further aspect of the present invention, when the edge of a pattern is detected and the outline length is computed, the edge can be detected as the outline of the pattern continuing in the scanning direction. For a pattern having the width of one picture element, the outline can be prevented from being counted twice, thereby correctly computing in one scanning operation the outline length of a pattern in variable shape.

According to a further aspect of the present invention, a non-character pattern can be removed from a pattern to be extracted by character-recognizing a pattern belonging to a unicolor group, thereby improving the extraction precision for a character area.

According to a further aspect of the present invention, the patterns in the same group can be classified based on the range of the thickness of a pattern set on the frequencies of the thicknesses of the patterns in the same group. Thus, even if patterns of various thicknesses coexist, patterns of the same thickness can be classified into the same group, thereby improving the extraction precision for a title area.

According to a further aspect of the present invention, if the shape, size, or positional relation of the enclosing rectangles is appropriate for a title area, then the groups can be classified as belonging to the same group. Therefore, even if characters forming a title contain a character in a different color, the title area can be precisely extracted.

According to a further aspect of the present invention, a pattern not to be extracted can be removed from the patterns to be processed, thereby extracting a unicolor pattern with high precision.

According to a further aspect of the present invention, the patterns in the L or] shape are removed from patterns to be processed. Thus, even if only the corner of the background is extracted as an area having the same color as the character to be extracted, the corner of the background can be prevented from being integrated into the character to be extracted, thereby precisely extracting the title area.

According to a further aspect of the present invention, enclosing rectangles can be grouped in consideration of the entire color of an area to be and has already been extracted. As a result, even when the colors of the patterns in an enclosing rectangle gradually change, an area having a different color from that of the area to be extracted can be prevented from being classified into the same group.

According to a further aspect of the present invention, even if the chromatic range of a scene pattern is different from the chromatic range of a character pattern in the same image, a threshold reflecting a change in color of a character pattern can be set by setting a threshold for determination as to whether or not a pattern is unicolor according to the color information about an extracted pattern, thereby extracting only a character pattern with high precision.

According to a further aspect of the present invention, if the entire pattern is unicolor even if there is a local color variance, a part of a pattern forming a title can be prevented from being lost by extracting the pattern as a unicolor area although a title is extracted from an unevenly printed image. Thus, the title can be extracted with high precision.

What is claimed is:

1. An image processing apparatus, comprising:
   a read information obtaining unit to obtain read information about an input image, including
      a local area extraction unit to extract a local area from the input image; and
      a color difference information extraction unit to extract color difference information about the input image from the local area;
   a unicolor range setting unit to set a unicolor range of the input image according to the read information about the input image, including a threshold setting unit to set a labeling threshold for the input image according to the color difference information; and
   a labeling unit to label the input image by assigning a same label to a connection picture element in the unicolor range set by said unicolor range setting unit, including
      an average color computation unit to compute an average color of connection areas assigned the same label; and
      a color difference computation unit to compute a color difference between the average color of the connection area and a color of a picture element adjacent to the connection area, said labeling unit assigning the same label of the connection area to the picture element when the color difference is not greater than the labeling threshold.

2. The apparatus according to claim 1, wherein said read information about the input image comprises at least one of a number of colors of the input image, read resolution, luminance value, color saturation, color difference between adjacent picture elements, and color variance.

3. The apparatus according to claim 1, wherein said labeling unit changes a labeling method according to the read information about the input image.

4. The apparatus according to claim 3, wherein said labeling unit performs a labeling process by at least one of an area expanding method and clustering color distribution of an image.

5. The apparatus according to claim 1, wherein said labeling unit further comprises a clustering unit to classify similar colors of a color image into a same cluster, and assigns the same label to picture elements connected by a color belonging to the same cluster.

6. The apparatus according to claim 1,
   wherein said local area extraction unit comprises a mesh area extraction unit to extract a mesh area whose color variance is within a predetermined range among mesh areas obtained by dividing the input image;
   wherein said color difference information extraction unit comprises a standard deviation computation unit to compute a standard deviation of a color in the extracted mesh area; and
   wherein said threshold setting unit sets the labeling threshold based on a mean value of the standard deviations obtained for each mesh area.

7. The apparatus according to claim 1, wherein said unicolor range setting unit comprises a color conversion unit to convert a color of a color signal such that a color difference resolution by naked eyes of a first color with low color saturation matches the color difference resolution by naked eyes of a second color with high color saturation by reducing the color difference between the first color and a third color around the first color and enlarging the color difference between the second color and a fourth color around the second color.

8. The apparatus according to claim 1,
   wherein said read information obtaining unit comprises a resolution computation unit to compute read resolution of a color image for each color element;
   wherein said unicolor range setting unit sets the labeling threshold based on the read resolution of each color element.

9. The apparatus according to claim 1, further comprising a grouping unit to group label patterns generated by said labeling unit.

10. The apparatus according to claim 9, wherein said grouping unit comprises a pattern setting unit to set a pattern of a specific shape, and removes the pattern of the specific shape from patterns to be grouped.

11. The apparatus according to claim 10, wherein said specific shape is an L shape or a ⊐ shape.

12. The apparatus according to claim 9, wherein said grouping unit comprises a search range setting unit to set a search range of patterns to be grouped.

13. The apparatus according to claim 9, wherein said grouping unit groups patterns in a unicolor range set by said unicolor range setting unit into a same group.

14. The apparatus according to claim 13, wherein a color of the patterns has an average value of colors of picture elements assigned the same label.

15. The apparatus according to claim 9, wherein said grouping unit comprises an enclosing rectangle generation unit to generate an enclosing rectangle of patterns assigned the same label, and groups the patterns based on a size, shape, or position of the enclosing rectangle.

16. The apparatus according to claim 9, wherein said grouping unit comprises a thickness computation unit to compute a thickness of the patterns assigned the same label, and groups patterns based on the thickness of the patterns.

17. The apparatus according to claim 16, wherein said thickness computation unit comprises:
   a scanning unit to scan an image in a predetermined direction; and
   an outline length computation unit to compute a length of an outline of a pattern in the image.

18. The apparatus according to claim 9,
   further comprising a group information computation unit to compute image information about a group according to image information about patterns classified into a same group, and wherein said grouping unit groups patterns according to the image information about the group.

19. The apparatus according to claim 18, wherein said group information computation unit comprises a color information computation unit to compute color information about the group according to the color information about patterns classified into the same group.

20. The apparatus according to claim 19, wherein said color information about the group is an average value of colors of the patterns belonging to the same group.

21. The apparatus according to claim 19, wherein said group information computation unit computes a grouping threshold according to the color information about the pattern classified into the same group.

22. The apparatus according to claim 19, wherein said grouping unit groups patterns based on a result of comparing the color information about the group with color information about patterns to be grouped.

23. The apparatus according to claim 19, wherein said grouping unit integrates groups based on a result of comparing color information about the group.

24. The apparatus according to claim 19, wherein said unicolor range setting unit computes the labeling threshold according to color information of patterns classified into the same group.

25. The apparatus according to claim 19, wherein said labeling unit re-extracts patterns belonging to the group based on a result of comparing color information of the group with color information about picture elements in an area of enclosing rectangles of the group.

26. The apparatus according to claim 18,
wherein said group information computation unit comprises:
a group rectangle generation unit to generate an enclosing rectangle of an entire pattern belonging to the same group; and
a geometric information computation unit to compute a shape, size, or position of the enclosing rectangle of the group, and
wherein said grouping unit integrates the groups based on the shape, size, or position of the enclosing rectangle of the group.

27. The apparatus according to claim 18,
wherein said group information computation unit comprises:
a frequency distribution generation unit to generate a frequency distribution of thicknesses of patterns in the same group; and
a same thickness setting unit to set a same pattern thickness range based on the frequency distribution of the thicknesses, and
wherein said grouping unit re-classifies patterns belonging to the same group based on the thickness of a pattern set by said same thickness setting unit.

28. The apparatus according to claim 18,
wherein said group information computation unit comprises a character recognition unit to recognize a character of a pattern belonging to the same group; and
wherein said grouping unit re-classifies patterns belonging to the same group based on a result of character recognition.

29. An image processing apparatus, comprising:
a color difference table for storing a maximum value of a color difference between adjacent picture elements based on a color luminance value and read resolution as variables;
a resolution obtaining unit to obtain a read resolution at which a color difference between adjacent picture elements obtained from an input image matches a color difference stored in said color difference table individually for each of three primary colors;
a resolution computation unit to compute the read resolution of the input image based on the read resolution of the three primary colors;
a color difference obtaining unit to obtain from said color difference table a color difference corresponding to the read resolution of the input image;
a threshold setting unit to set a labeling threshold based on the color difference obtained from said color difference table; and
a labeling unit to label the input image based on the threshold.

30. The apparatus according to claim 29, wherein said color difference table contains a maximum value of a color difference between adjacent picture elements for all luminance values of colors of an image.

* * * * *